United States Patent
Busacca et al.

(10) Patent No.: US 12,500,274 B2
(45) Date of Patent: Dec. 16, 2025

(54) APPARATUS INCLUDING ROTATING ASSEMBLIES TO MOVE WEBS ALONG MERGE PATHS AND RECEIVING MEMBER TO OVERLAY WEBS, AND METHODS FOR THE PRODUCTION OF ELECTRODES ASSEMBLIES

(71) Applicant: Enovix Corporation, Fremont, CA (US)

(72) Inventors: Robert S. Busacca, Oakland, CA (US); Bruno A. Valdes, Sunnyvale, CA (US); Murali Ramasubramanian, Fremont, CA (US); Ashok Lahiri, Danville, CA (US); Gardner Cameron Dales, Los Gatos, CA (US); John F. Varni, Campbell, CA (US); Gunther A. Koblmiller, Sparks, NV (US); Robert F. Kinchen, Fremont, CA (US); Kim L. Fortunati, Pleasonton, CA (US)

(73) Assignee: Enovix Corporation, Fremont, CA (US)

( * ) Notice: Subject to any disclaimer, the term of this patent is extended or adjusted under 35 U.S.C. 154(b) by 645 days.

(21) Appl. No.: 17/864,741

(22) Filed: Jul. 14, 2022

(65) Prior Publication Data
US 2022/0352554 A1    Nov. 3, 2022
US 2023/0268556 A9    Aug. 24, 2023

Related U.S. Application Data

(63) Continuation of application No. 17/545,045, filed on Dec. 8, 2021, now Pat. No. 11,411,253.

(Continued)

(51) Int. Cl.
*H01M 10/0585*    (2010.01)
*H01M 10/0525*    (2010.01)

(52) U.S. Cl.
CPC ... *H01M 10/0585* (2013.01); *H01M 10/0525* (2013.01)

(58) Field of Classification Search
CPC ................ H01M 10/0585; H01M 10/0525
(Continued)

(56) References Cited

U.S. PATENT DOCUMENTS 4,043,454 A    8/1977   Reuland
4,539,275 A    9/1985   Plasse
(Continued)

FOREIGN PATENT DOCUMENTS

CA    2388711 A1    5/2021
CN    1286811 A     3/2001
(Continued)

OTHER PUBLICATIONS

Alliance Rubber Company, Rubber Band Size Chart, retrieved from www.rubberband.com/public/userfiles/sales-collateral/RubberBandChart.pdf (2 pages).
(Continued)

*Primary Examiner* — Sean P Cullen
(74) *Attorney, Agent, or Firm* — Haley Guiliano LLP; Ronit Buller

(57) ABSTRACT

An apparatus for merging webs for the production of an electrode assembly for a secondary battery includes first and second webs of base material wound on a first spool and a second spool, respectively. The apparatus also includes first and second rotating assemblies configured to move the first and second webs of base material along a first web merge path and a second web merge path, respectively. The first and second rotating assemblies are configured to control a tension of the respective web of base material in a down web direction along a portion of the respective web merge path located between the respective spool and rotating assembly.

(Continued)

The apparatus also includes a receiving member configured to receive the first and second webs of base material at first and second web merge locations, respectively, such that the second web of base material overlays the first web of base material.

26 Claims, 39 Drawing Sheets

Related U.S. Application Data

(60) Provisional application No. 63/123,328, filed on Dec. 9, 2020.

(58) Field of Classification Search
USPC .......................................... 429/209; 29/623.3
See application file for complete search history.

(56) References Cited

U.S. PATENT DOCUMENTS

| | | |
|---|---|---|
| 4,587,182 A | 5/1986 | Stiles et al. |
| 4,614,026 A | 9/1986 | Plasse |
| 5,238,759 A | 8/1993 | Plichta et al. |
| 5,294,504 A | 3/1994 | Otagawa et al. |
| 5,709,962 A | 1/1998 | Bailey |
| 6,083,640 A | 7/2000 | Lee et al. |
| 6,090,505 A | 7/2000 | Shimamura et al. |
| 6,235,427 B1 | 5/2001 | Idota et al. |
| 6,287,371 B1 | 9/2001 | Ota et al. |
| 6,355,369 B1 | 3/2002 | Iarochencko et al. |
| 6,383,234 B1 | 5/2002 | Noh |
| 6,432,579 B1 | 8/2002 | Tsuji et al. |
| 6,432,585 B1 | 8/2002 | Kawakami et al. |
| 6,525,391 B1 | 2/2003 | Bertrand et al. |
| 6,679,925 B1 | 1/2004 | Tanizaki et al. |
| 6,726,733 B2 | 4/2004 | Lee et al. |
| 6,791,737 B2 | 9/2004 | Giron |
| 6,855,378 B1 | 2/2005 | Narang |
| 7,066,971 B1 | 6/2006 | Carlson |
| 7,309,548 B2 | 12/2007 | Ota et al. |
| 7,402,829 B2 | 7/2008 | Green |
| 7,722,984 B2 | 5/2010 | Kim et al. |
| 7,824,806 B2 | 11/2010 | Visco et al. |
| 8,101,298 B2 | 1/2012 | Green et al. |
| 8,129,048 B2 | 3/2012 | Hirakawa et al. |
| 8,133,613 B2 | 3/2012 | Ramasubramanian et al. |
| 8,192,788 B1 | 6/2012 | Shah et al. |
| 8,367,244 B2 | 2/2013 | Ramasubramanian et al. |
| 8,475,957 B2 | 7/2013 | Ramasubramanian et al. |
| 8,524,395 B2 | 9/2013 | Ramasubramanian et al. |
| 8,527,395 B2 | 9/2013 | Pylant |
| 8,580,439 B1 | 11/2013 | Kaiser et al. |
| 8,722,226 B2 | 5/2014 | Carter et al. |
| 8,841,030 B2 | 9/2014 | Lahiri et al. |
| 8,865,345 B1 | 10/2014 | Ramasubramanian et al. |
| 8,993,159 B2 | 3/2015 | Chiang et al. |
| 9,105,905 B2 | 8/2015 | Ramasubramanian et al. |
| 9,153,833 B2 | 10/2015 | Chiang et al. |
| 9,343,772 B2 | 5/2016 | Byun |
| 9,356,271 B2 | 5/2016 | Ramasubramanian et al. |
| 9,362,553 B2 | 6/2016 | Lahiri et al. |
| 9,660,292 B2 | 5/2017 | Rust, III et al. |
| 9,692,044 B2 | 6/2017 | Delpuech et al. |
| 9,806,331 B2 | 10/2017 | Lahiri et al. |
| 9,991,490 B2 | 6/2018 | Ramasubramanian et al. |
| 10,020,514 B2 | 7/2018 | Ramasubramanian et al. |
| 10,038,214 B2 | 7/2018 | Rust, III et al. |
| 10,177,400 B2 | 1/2019 | Busacca et al. |
| 10,256,507 B1 | 4/2019 | Busacca et al. |
| 10,283,807 B2 | 5/2019 | Busacca et al. |
| 10,784,477 B2 | 9/2020 | Fischer et al. |
| 11,063,299 B2 | 7/2021 | Busacca et al. |
| 11,081,718 B2 | 8/2021 | Busacca et al. |
| 11,128,020 B2 | 9/2021 | Busacca et al. |
| 11,411,253 B2 | 8/2022 | Busacca et al. |
| 2002/0013986 A1 | 2/2002 | Ahn et al. |
| 2003/0082446 A1 | 5/2003 | Chiang et al. |
| 2003/0175589 A1 | 9/2003 | Kaminaka et al. |
| 2004/0048151 A1 | 3/2004 | Hayashi et al. |
| 2004/0185336 A1 | 9/2004 | Ito et al. |
| 2004/0214085 A1 | 10/2004 | Sheem et al. |
| 2004/0234861 A1 | 11/2004 | Kawase et al. |
| 2004/0241540 A1 | 12/2004 | Tsutsumi et al. |
| 2004/0253512 A1 | 12/2004 | Watanabe et al. |
| 2005/0008939 A1 | 1/2005 | Ota et al. |
| 2005/0095503 A1 | 5/2005 | Adachi et al. |
| 2005/0130383 A1 | 6/2005 | Divakaruni et al. |
| 2005/0208379 A1 | 9/2005 | Musha et al. |
| 2006/0093871 A1 | 5/2006 | Howard et al. |
| 2007/0002523 A1 | 1/2007 | Ando et al. |
| 2007/0031733 A1 | 2/2007 | Kogetsu et al. |
| 2007/0097481 A1 | 5/2007 | Burdis et al. |
| 2007/0172732 A1 | 7/2007 | Jung et al. |
| 2007/0285051 A1 | 12/2007 | Jeon et al. |
| 2008/0003490 A1 | 1/2008 | Christensen et al. |
| 2008/0081256 A1 | 4/2008 | Madou et al. |
| 2008/0081257 A1 | 4/2008 | Yoshida et al. |
| 2008/0233455 A1 | 9/2008 | Deimede et al. |
| 2008/0316582 A1 | 12/2008 | Danner et al. |
| 2009/0023073 A1 | 1/2009 | Okada et al. |
| 2009/0035664 A1 | 2/2009 | Chiang et al. |
| 2009/0068567 A1 | 3/2009 | Konishike et al. |
| 2009/0123847 A1 | 5/2009 | Okada et al. |
| 2009/0142656 A1 | 6/2009 | Nathan et al. |
| 2009/0159311 A1 | 6/2009 | Zheng et al. |
| 2009/0263716 A1 | 10/2009 | Ramasubramanian et al. |
| 2009/0303660 A1 | 12/2009 | Nair et al. |
| 2010/0040951 A1 | 2/2010 | Yamamoto et al. |
| 2010/0051856 A1 | 3/2010 | Kim et al. |
| 2010/0209775 A1 | 8/2010 | Kim et al. |
| 2010/0266907 A1 | 10/2010 | Yazami |
| 2010/0285368 A1 | 11/2010 | Yamamoto et al. |
| 2011/0008656 A1 | 1/2011 | Tanahashi et al. |
| 2011/0014522 A1 | 1/2011 | Visco et al. |
| 2011/0020701 A1 | 1/2011 | Park et al. |
| 2011/0020713 A1 | 1/2011 | Cui et al. |
| 2011/0020719 A1 | 1/2011 | Manabe et al. |
| 2011/0067228 A1 | 3/2011 | Green |
| 2011/0111283 A1 | 5/2011 | Rust, III et al. |
| 2011/0129732 A1 | 6/2011 | Bachrach et al. |
| 2011/0159328 A1 | 6/2011 | Yeo |
| 2011/0171518 A1 | 7/2011 | Dunn et al. |
| 2011/0200862 A1 | 8/2011 | Kurosawa |
| 2011/0294015 A1 | 12/2011 | Pirk et al. |
| 2012/0052341 A1 | 3/2012 | Kim et al. |
| 2012/0100438 A1 | 4/2012 | Fasching et al. |
| 2012/0176093 A1 | 7/2012 | Ramasubramanian et al. |
| 2012/0202113 A1 | 8/2012 | Hodge et al. |
| 2012/0288742 A1 | 11/2012 | Tanaka et al. |
| 2012/0313650 A1* | 12/2012 | Kawaguchi ......... H01M 10/058 324/679 |
| 2013/0078493 A1 | 3/2013 | Chen |
| 2013/0136963 A1 | 5/2013 | Chiba |
| 2013/0143120 A1 | 6/2013 | Ramasubramanian et al. |
| 2013/0189602 A1 | 7/2013 | Lahiri et al. |
| 2013/0202942 A1 | 8/2013 | Sakai et al. |
| 2013/0230751 A1 | 9/2013 | Shaw |
| 2014/0050969 A1 | 2/2014 | Rust, III et al. |
| 2014/0072850 A1 | 3/2014 | Kwon et al. |
| 2014/0272547 A1 | 9/2014 | Ramasubramanian et al. |
| 2014/0335395 A1 | 11/2014 | Ramasubramanian et al. |
| 2015/0007952 A1 | 1/2015 | Moederl et al. |
| 2015/0024253 A1 | 1/2015 | Noh |
| 2015/0033547 A1 | 2/2015 | Yang et al. |
| 2015/0079452 A1 | 3/2015 | Park et al. |
| 2015/0104686 A1 | 4/2015 | Brommer et al. |
| 2015/0135522 A1 | 5/2015 | Seto et al. |
| 2015/0162575 A1 | 6/2015 | Son et al. |
| 2016/0190607 A1 | 6/2016 | Wyser et al. |
| 2018/0040876 A1 | 2/2018 | Lahiri et al. |
| 2018/0079035 A1 | 3/2018 | Watanabe |
| 2018/0145367 A1 | 5/2018 | Busacca et al. |
| 2018/0166735 A1 | 6/2018 | Busacca et al. |

(56) References Cited

U.S. PATENT DOCUMENTS

| | | |
|---|---|---|
| 2019/0207264 A1 | 7/2019 | Busacca et al. |
| 2019/0221878 A1 | 7/2019 | Busacca et al. |
| 2019/0319294 A1 | 10/2019 | Busacca et al. |
| 2019/0350633 A1 | 11/2019 | Ramadhyani et al. |
| 2019/0372150 A1 | 12/2019 | Busacca et al. |
| 2020/0212493 A1 | 7/2020 | Busacca et al. |
| 2020/0313146 A1 | 10/2020 | Busacca et al. |
| 2020/0350633 A1 | 11/2020 | Busacca et al. |
| 2022/0080719 A1* | 3/2022 | Jamadar .......... H01M 6/00 |
| 2022/0093903 A1 | 3/2022 | Rust et al. |
| 2022/0115753 A1 | 4/2022 | Busacca et al. |
| 2022/0123370 A1 | 4/2022 | Busacca et al. |
| 2022/0149423 A1 | 5/2022 | Busacca et al. |
| 2022/0158220 A1 | 5/2022 | Busacca et al. |

FOREIGN PATENT DOCUMENTS

| | | | |
|---|---|---|---|
| CN | 1555588 A | 12/2004 | |
| CN | 101960643 A | 1/2011 | |
| CN | 201732838 U * | 2/2011 | |
| CN | 102007625 A | 4/2011 | |
| CN | 102569758 A | 7/2012 | |
| CN | 104347856 A | 2/2015 | |
| CN | 105428697 A * | 3/2016 | ........ H01M 10/0468 |
| CN | 105518904 A | 4/2016 | |
| CN | 106207270 A * | 12/2016 | .......... H01M 10/058 |
| CN | 108400370 A * | 8/2018 | ........ H01M 10/0409 |
| DE | 102013114489 B3 | 4/2015 | |
| DE | 102018203033 A1 | 9/2019 | |
| EP | 0883199 A1 | 12/1998 | |
| EP | 1028476 A1 | 8/2000 | |
| EP | 1100134 A1 | 5/2001 | |
| EP | 1102340 A2 | 5/2001 | |
| EP | 1270765 A1 | 1/2003 | |
| EP | 1465268 A2 | 10/2004 | |
| EP | 2048262 A1 | 4/2009 | |
| EP | 2248207 B1 | 6/2012 | |
| EP | 2858162 A1 | 4/2015 | |
| EP | 2223367 B1 | 6/2015 | |
| EP | 2277214 B1 | 10/2015 | |
| EP | 3051606 A1 | 8/2016 | |
| EP | 3455898 A1 | 3/2019 | |
| EP | 3295507 B1 | 8/2020 | |
| EP | 4012813 A1 | 6/2022 | |
| JP | H01132064 A | 5/1989 | |
| JP | H06236768 A | 8/1994 | |
| JP | 2001185224 A | 7/2001 | |
| JP | 2003323882 A | 11/2003 | |
| JP | 2004351500 A | 12/2004 | |
| JP | 2005149891 A | 6/2005 | |
| JP | 2006100280 A | 4/2006 | |
| JP | 2006173001 A | 6/2006 | |
| JP | 2006236768 A | 9/2006 | |
| JP | 2006286427 A | 10/2006 | |
| JP | 2007258160 A | 10/2007 | |
| JP | 2008171732 A | 7/2008 | |
| JP | 2009170258 A | 7/2009 | |
| JP | 2010146732 A | 7/2010 | |
| JP | 2010225552 A | 10/2010 | |
| JP | 2010262752 A | 11/2010 | |
| JP | 2011171029 A | 9/2011 | |
| JP | 2012516941 A | 7/2012 | |
| JP | 2012160352 A | 8/2012 | |
| JP | 2015505120 A | 2/2015 | |
| JP | 2015064959 A | 4/2015 | |
| JP | 2015172997 A | 10/2015 | |
| JP | 2015220218 A | 12/2015 | |
| JP | 2019169476 A | 10/2019 | |
| KR | 20030044508 A | 6/2003 | |
| KR | 20060050988 A | 5/2006 | |
| KR | 20070021192 A | 2/2007 | |
| KR | 20130105001 A | 9/2013 | |
| KR | 20150010226 A | 1/2015 | |
| KR | 20150045456 A | 4/2015 | |
| KR | 20170114351 A | 10/2017 | |
| NL | 1015956 C2 | 2/2002 | |
| TW | 201225385 A | 6/2012 | |
| TW | 201414048 A | 4/2014 | |
| WO | 2002043168 A2 | 5/2002 | |
| WO | 2003105258 A1 | 12/2003 | |
| WO | 2005101973 A2 | 11/2005 | |
| WO | 2006064344 A2 | 6/2006 | |
| WO | 2008030215 A2 | 3/2008 | |
| WO | 2008089110 A1 | 7/2008 | |
| WO | 2009109834 A1 | 9/2009 | |
| WO | 2009129490 A1 | 10/2009 | |
| WO | 2009140300 A1 | 11/2009 | |
| WO | 2010090956 A2 | 8/2010 | |
| WO | 2010092059 A1 | 8/2010 | |
| WO | 2010138176 A1 | 12/2010 | |
| WO | 2011154862 A1 | 12/2011 | |
| WO | 2012081331 A1 | 6/2012 | |
| WO | 2013112135 A1 | 8/2013 | |
| WO | 2013112670 A1 | 8/2013 | |
| WO | 2014028230 A1 | 2/2014 | |
| WO | 2014151202 A1 | 9/2014 | |
| WO | 2014024424 A1 | 7/2016 | |
| WO | 2017197233 A1 | 11/2017 | |
| WO | 2019099642 A2 | 5/2019 | |
| WO | 2019099650 A1 | 5/2019 | |
| WO | 2021020480 A1 | 2/2021 | |
| WO | 2022060703 A1 | 3/2022 | |
| WO | 2022125529 A1 | 6/2022 | |

OTHER PUBLICATIONS

Arora et al., "Battery Separators," Chem. Reviews, 104(10): 4419-4462 (2004).
Bourderau et al., "Amorphous Silicon as a Possible Anode Material for Li—Ion Batteries," Journal of Power Sources, 81-82: 233-236 (1999).
Broussely et al., "Li—Ion Batteries and Portable Power Source Prospects for the Next 5-10 Years," Journal of Power Sources, 136(2): 386-394 (2004).
Collins Dictionary Definition of "Fiducial" downloaded from https://www.collinsdictionary.com/us/dictionary/english/fiducial (2022).
Dierks, S., NickelSilicide (Ni2Si) (cas 12059-14-2) MSDS, GuideChem Material safety data sheet, retrieved from www.guidechem.com/cas-120/12059-14-2.html, Sep. 30, 1993, 2 pages.
Golodnitsky et al., "Advanced Materials for the 3D Microbattery," Journal of Power Sources, 153(2): 281-287 (2006).
Google Query Result Page for "Pressure a Rubber Band Can Apply" and "How much pressure does a rubber band have?", 1 page (2021).
Green et al., "Structured Silicon Anodes for Lithium Battery Applications," Electrochemical and Solid State Letters, 6(5): A75-A79 (2003).
Harraz et al., "Different Behavior in Immersion Plating of Nickel on Porous Silicon from Acidic and Alkaline Fluoride Media," J. Electrochemical Society, 150(5): C277-C284 (2003).
Harraz et al., "Immersion Plating of Nickel onto Porous Silicon Layer from Fluoride Solutions," Physica Status Solidi (a), 197(1): 51-56 (2013).
Iaboni et al., "$Li_{15}S_{14}$ Formation in Silicon Thin Film Negative Electrodes," Journal of the Electrochemical Society, 163(2): A255-A261 (2016).
Kasavajjula et al., "Nano- and Bulk-Silicon-Based Insertion Anodes for Lithium-Ion Secondary Cells," Journal of Power Sources, 163(2): 1003-1039 (2007).
Keener Rubber Bands Federal Specifications, retrieved from keener-rubber.com/Federal%2Specifications.html, 1 page (2021).
Li et al., "The Crystal Structural Evolution of Nano—Si Anode Caused by Lithium Insertion and Extraction at Room Temperature," Solid State Ionics, 135(1-4): 181-191 (2000).
Liu, C., Bulk Micromachining and Silicon Anisotropic Etching, Foundations of MEMS, Prentice Hall Inc. Chapter 10, pp. 326-370; Prentice Hall.
Long et al., "Three-Dimensional Battery Architectures" Chemical Reviews, 104(10): 4463-4492 (2004).

(56) References Cited

OTHER PUBLICATIONS

Maranchi et al., "High Capacity, Reversible Silicon Thin-Film Anodes for Lithium-Ion Batteries," Electrochemical and Solid-State Letters, 6(9): A198-A201 (2003).
Mu et al., "Silicon Nanotube Array/Gold Electrode for Direct Electrochemistry of Cytochrome C," J. Phys. Chem. B, 111(6): 1491-1495 (2007).
Obrovac et al., "Reversible Cycling of Crystalline Silicon Powder," Journal of The Electrochemical Society, 154(2): A103-A108 (2007).
Roberts et al., "3D Lithium Ion Batteries-From Fundamentals to Fabrication," Journal of Materials Chemistry, Royal Society of Chemistry, 2011, 21: 9876-9890 (2011).
Shin et al., "Porous Silicon Negative Electrodes for Rechargeable Lithium Batteries," Journal of Power Sources, 139(1-2): 314-320 (2005).
Su et al., "Silicon-Based Nanomaterials for Lithium-Ion Batteries: A Review," Advanced Energy Materials, 4(1): 1-23 (2013).
Vyatkin et al., "Random and Ordered Macropore Formation in p-Type Silicon," J. Electrochemical Society, 149(1): G70-G76 (2002).
Waidmann et al., "Tuning Nickel Silicide Properties Using a Lamp Based RTA, a Heat Conduction Based RTA or a Furnace Anneal," Microelectronic Engineering 83(11-12): 2282-2286 (2006).
Whitehead et al., "Current Collectors for Positive Electrodes of Lithium-Based Batteries," Journal of the Electrochemical Society, 152(11): A5105-A2113 (2005).
Xu et al., "Nickel Displacement Deposition of Porous Silicon with Ultrahigh Aspect Ratio," Journal of The Electrochemical Society, 154(3): 170-174 (2007).
Xu et al., "Theoretical Studies of Displacement Deposition of Nickel into Porous Silicon with Ultrahigh Aspect Ratio," Electrochimica Acta, 52(12): 3901-3909 (2007).
Zhang et al., "High Aspect Ratio Nickel Structures Fabricated by Electrochemical Replication of Hydrofluoric Acid Etched Silicon," Electrochemical and Solid-State Letters, 9(9): C150-C152 (2006).
European Extended Search Report for Application No. 12866772.2; EP2807698, dated Sep. 28, 2015 (3 pages).
European Extended Search Report for Application No. 13740825.8; EP2807694, dated Jul. 31, 2015 (9 pages).
European Extended Search Report for Application No. 13829954.0; EP2885830, dated Feb. 11, 2016 (2 pages).
European Extended Search Report for Application No. 14768734.7; EP2973785, dated Jul. 15, 2016 (10 pages).
European Extended Search Report for Application No. 16793359.0.7; EP3295507, dated Aug. 15, 2018 (7 pages).
European Extended Search Report for Application No. 17872332.6; EP3542410, Aug. 21, 2020 (7 pages).
European Extended Search Report for Application No. 20191612.9; EP3800730, dated Jan. 28, 2021 (7 pages).
European Extended Search Report for Application No. 17796914.4; EP3455898, dated Nov. 7, 2019 (10 pages).
European Search Report for Application No. 19197127.4; EP3641030, dated Jan. 10, 2020 (3 pages).
International Search Report and Written Opinion issued for PCT/US2021/050208, dated Mar. 3, 2022 (19 pages).
International Search Report and Written Opinion issued for PCT/US2021/062175, dated Mar. 22, 2022 (15 pages).
International Search Report/Written Opinion issued for PCT/US2021/059597, dated Feb. 28, 2022.
International Search Report issued for PCT/US2009/041012, dated Sep. 8, 2009 (4 pages).
International Search Report issued for PCT/US2013/053235, dated Jan. 28, 2014 (5 pages).
International Search Report issued for PCT/US2016/032255, dated Aug. 25, 2017 (4 pages).
International Search Report issued for PCT/US2016/032284, dated Aug. 26, 2016 (4 pages).
International Search Report issued for PCT/US2017/032355, dated Aug. 25, 2017 (4 pages).
International Search Report issued for PCT/US2017/061892, dated Mar. 27, 2018 (6 pages).
International Search Report issued for PCT/US2018/061245, dated May 7, 2019 (10 pages).
International Search Report issued for PCT/US2018/061254, dated Mar. 7, 2019 (5 pages).
International Search Report issued for PCT/US2013/022868, dated May 15, 2013 (3 pages).
International Search Report issued for PCT/US2014/025200, dated Jul. 29, 2014 (4 pages).
International Search Report issued for PCT/US2012/022393, dated Oct. 10, 2012 (4 pages).
Great Britain Combined Search and Examination Report issued for GB1215424.1, dated Dec. 17, 2012 (4 pages).
Taiwanese Search Report issued for Application No. 102129550, dated Sep. 9, 2016 (1 page).
U.S. Appl. No. 17/471,499, filed Sep. 10, 2021.
U.S. Appl. No. 17/562,228, filed Dec. 27, 2021.
U.S. Appl. No. 17/582,451, filed Jan. 24, 2022.
U.S. Appl. No. 17/335,725, filed Jun. 1, 2021.
European Search Report for Application No. 21213514.9 dated Mar. 24, 2022 (8 pages).

* cited by examiner

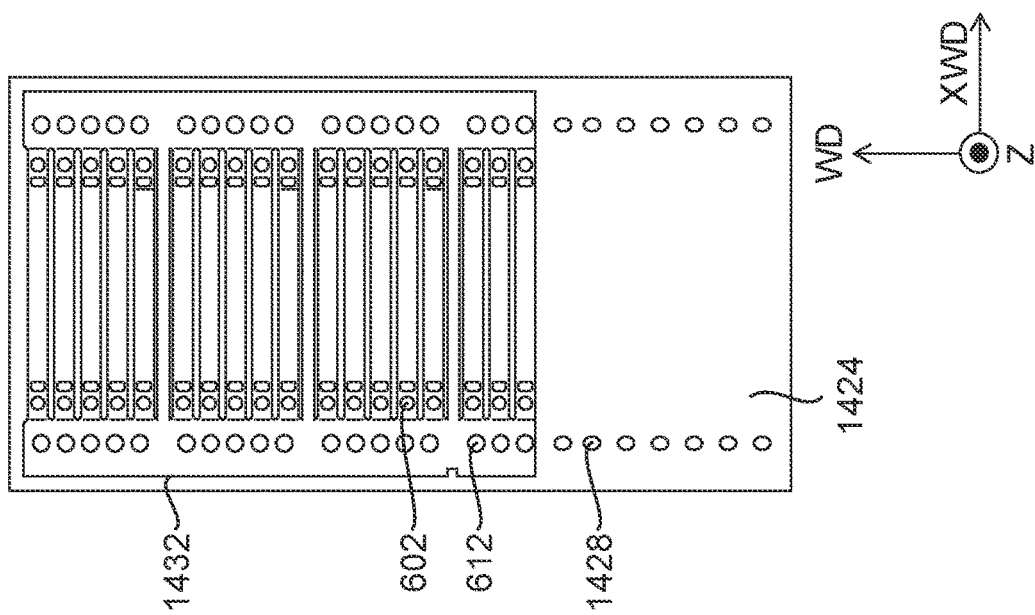
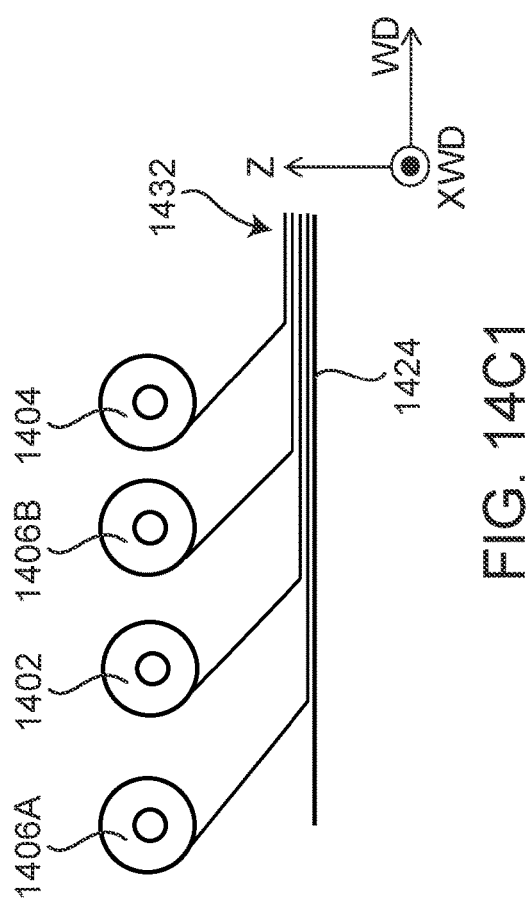
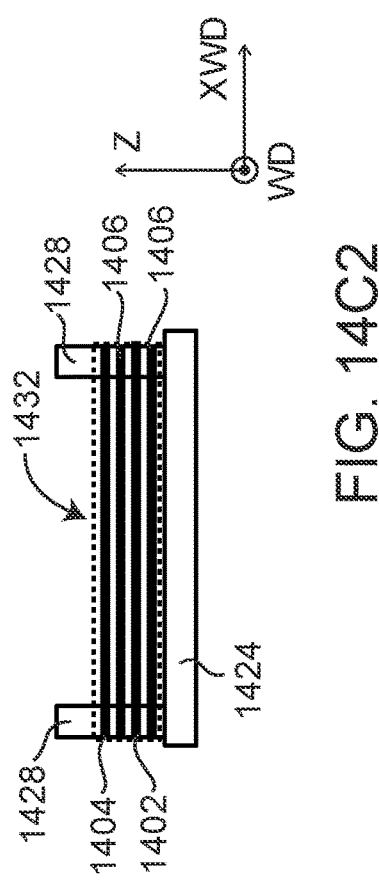

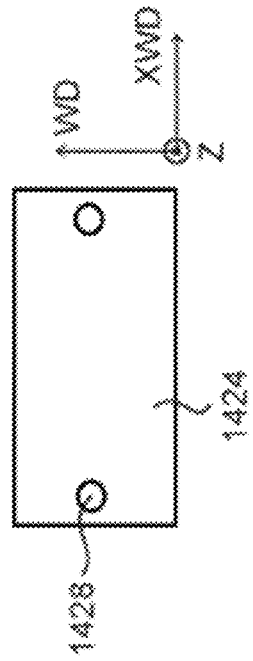
FIG. 14E3
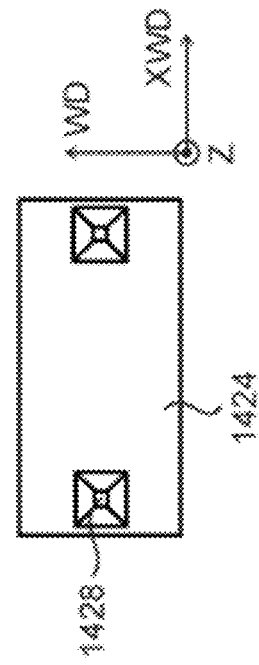
FIG. 14E4
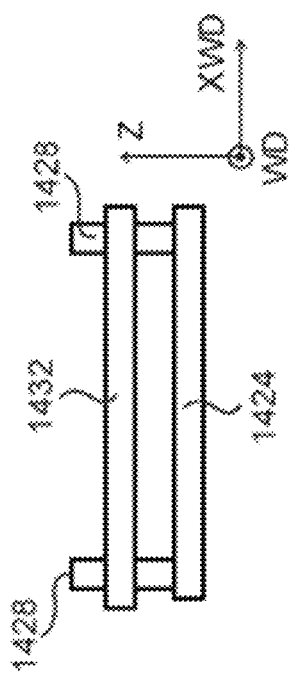
FIG. 14E1
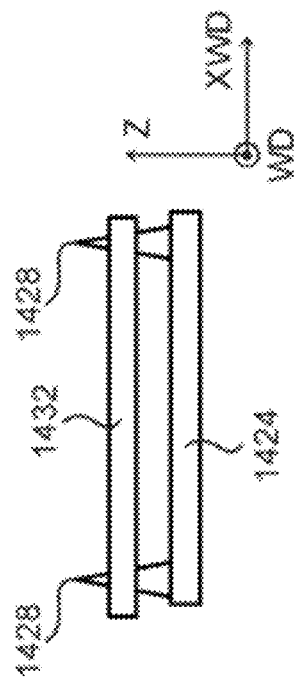
FIG. 14E2

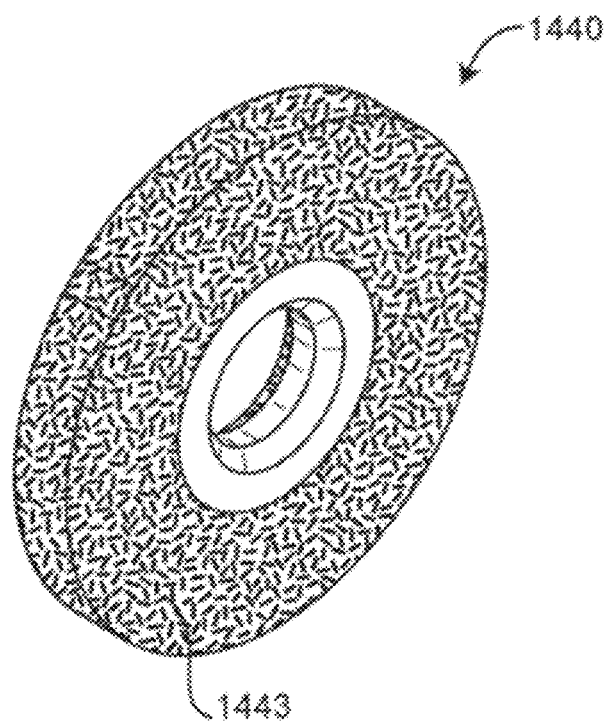
FIG. 14F1
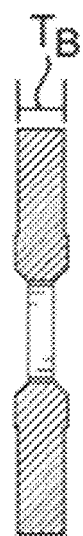
FIG. 14F2
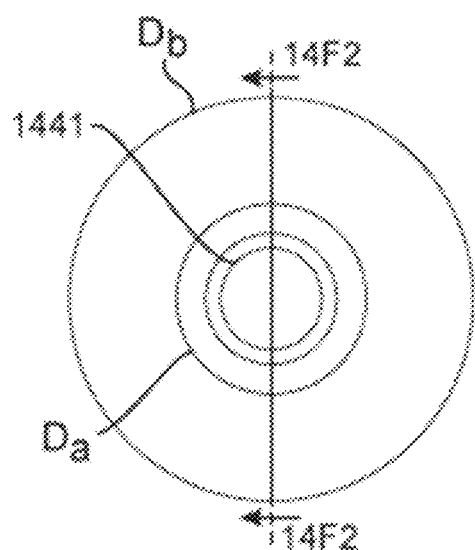
FIG. 14F3

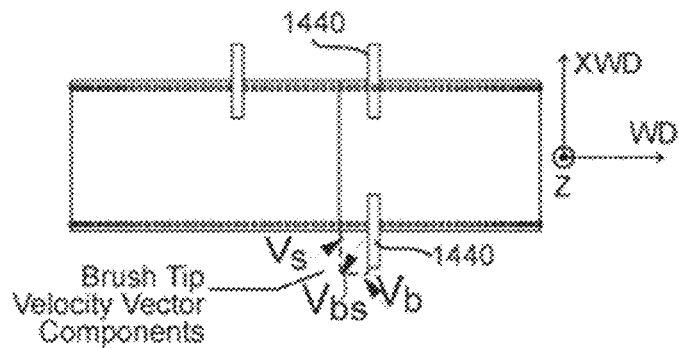
FIG. 14H1
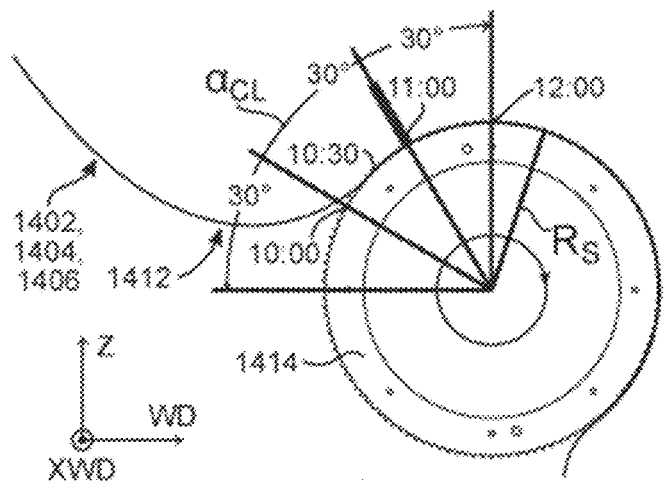
FIG. 14H2
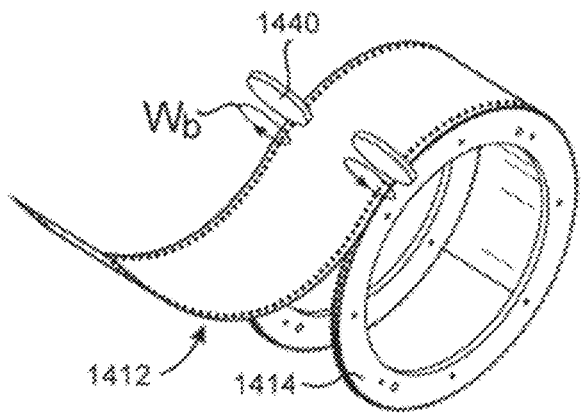
FIG. 14H3

APPARATUS INCLUDING ROTATING ASSEMBLIES TO MOVE WEBS ALONG MERGE PATHS AND RECEIVING MEMBER TO OVERLAY WEBS, AND METHODS FOR THE PRODUCTION OF ELECTRODES ASSEMBLIES

CROSS-REFERENCE TO RELATED APPLICATIONS

This application is a continuation of U.S. patent application Ser. No. 17/545,045, filed Dec. 8, 2021, which claims priority to U.S. Provisional Patent Application No. 63/123,328, filed Dec. 9, 2020, the disclosure of each is hereby incorporated by reference in its entirety.

Reference is made to U.S. Provisional Patent Application No. 63/115,266, filed Nov. 18, 2020; 63/080,345, filed Sep. 18, 2020; and 63/081,686, filed Sep. 22, 2020, U.S. patent application Ser. No. 16/533,082, filed on Aug. 6, 2019, which claims priority to U.S. Provisional Patent Application No. 62/715,233, filed Aug. 6, 2018, and International Patent Application No. PCT/US2018/061245, filed Nov. 15, 2018, which claims priority to U.S. Provisional Applications Nos. 62/586,737, filed Nov. 15, 2017, and 62/715,233, filed Aug. 6, 2018, the content of each of these applications is hereby incorporated by reference in its entirety.

FIELD

The field of the disclosure relates generally to energy storage technology, such as battery technology. More specifically, the field of the disclosure relates to systems and methods for the assembly of energy storage systems, such as electrodes for use in secondary batteries, including lithium based batteries.

BACKGROUND

Lithium based secondary batteries have become desirable energy sources due to their comparatively high energy density, power and shelf life. Examples of lithium secondary batteries include non-aqueous batteries such as lithium-ion and lithium-polymer batteries.

Known energy storage devices, such as batteries, fuel cells and electrochemical capacitors, typically have two-dimensional laminar architectures, such as planar or spirally wound (i.e., jellyroll) laminate structures, where a surface area of each laminate is approximately equal to its geometric footprint (ignoring porosity and surface roughness).

FIG. 1 illustrates a cross-sectional view of a known laminar type secondary battery, indicated generally at 10. The battery 10 includes a positive electrode current collector 15 in contact with a positive electrode 20. A negative electrode 25 is separated from the positive electrode 20 by a separator layer 30. The negative electrode 25 is in contact with a negative electrode current collector 35. As shown in FIG. 1, the battery 10 is formed in a stack. The stack is sometimes covered with another separator layer (not shown) above the negative electrode current collector 35, and then rolled and placed into a can (not shown) to assemble the battery 10. During a charging process, a carrier ion (typically, lithium) leaves the positive electrode 20 and travels through separator layer 30 into the negative electrode 25. Depending upon the anode material used, the carrier ion either intercalates (e.g., sits in a matrix of negative electrode material without forming an alloy) or forms an alloy with the negative electrode material. During a discharge process, the carrier ion leaves the negative electrode 25 and travels back through the separator layer 30 and back into the positive electrode 20.

Three-dimensional secondary batteries may provide increased capacity and longevity compared to laminar secondary batteries. The production of such three-dimensional secondary batteries, however, presents manufacturing and cost challenges. Precision manufacturing techniques used, to-date, can yield secondary batteries having improved cycle life but at the expense of productivity and cost of manufacturing. When known manufacturing techniques are sped up, however, an increased number of defects, loss of capacity and reduced longevity of the batteries can result.

Thus, it would be desirable to produce three-dimensional batteries while addressing the issues in the known art.

BRIEF DESCRIPTION

One embodiment is a process for merging webs for the production of an electrode assembly for a secondary battery, the process comprising: moving a first web of base material along a first web merge path, the first web of base material comprising (i) a population of first components for electrode sub-units, the first components delineated by corresponding weakened patterns, and (ii) a population of first conveying features; moving a second web of base material along a second web merge path, the second web of base material comprising (iii) a population of second components for the electrode sub-units, the second components delineated by corresponding weakened patterns, and (iv) a population of second conveying features; conveying a receiving member in a web merge direction adjacent the first web merge path and the second web merge path, the receiving member comprising a plurality of projections configured to engage with the first conveying features of the first web of base material and the second conveying features of the second web of base material; receiving, at a first web merge location, the first web of base material on the receiving member such that the conveying features of the first web of base material are engaged by at least some of the plurality of projections on the belt; and overlaying, at a second web merge location, the second web of base material on the first web of base material on the receiving member such that the first components are substantially aligned with the second components and the conveying features of the second web of base material are engaged by at least some of the plurality of projections on the belt, the second web merge location being spaced in a down web direction from the first web merge location.

Another embodiment is, a process for merging webs for the production of an electrode assembly for a secondary battery, the process comprising: moving a first web of base material along a first web merge path, the first web of base material comprising (i) a population of first electrode components for electrode sub-units, the first electrode components delineated by corresponding weakened patterns, and (ii) a population of first conveying features, the first web of base material comprising a web of electrode material; moving a second web of base material along a second web merge path, the second web of base material comprising (iii) a population of separator components delineated by corresponding weakened patterns and (iv) a population of second conveying features, the second web of base material comprising a web of separator material; conveying a receiving member in a web merge direction adjacent the first web merge path and the second web merge path, the receiving member comprising a plurality of projections configured to engage with the first conveying features of the web of electrode material and the second conveying features of the web of separator material; receiving, at a first web merge location, one of the web of the electrode material and the web of separator material on the belt such that the respective conveying features of the web of electrode material or the web of separator material are engaged by at least some of the plurality of projections on the belt; and overlaying, at a second web merge location, the other one of the web of the electrode material and the web of separator material on the received one of the web of the electrode material and the web of separator material such that the respective conveying features of the other one of the web of electrode material or the web of separator material are engaged by at least some of the plurality of projections on the belt and the separator structures substantially align with the first electrode structures, the second web merge location being spaced in a down web direction from the first web merge location.

Another embodiment is a process for separating an electrode sub-unit from a population of electrode sub-units in a layered arrangement of stacked webs, each electrode sub-unit delineated within the stacked webs by corresponding weakened patterns, the process comprising: positioning the electrode sub-unit of the layered arrangement of stacked webs in a punching position between a receiving unit and a punch head, the receiving unit comprising a base, alignment pins, and a moveable platform, positioning the alignment pins of the receiving unit through fiducial features of the electrode sub-unit, positioning the moveable platform at a predetermined position between a lower surface of the electrode sub-unit and the base of the receiving unit, applying a force to the electrode sub-unit using the punch head, the force having sufficient magnitude to separate the electrode sub-unit from the array of stacked webs along the weakened pattern.

Yet another embodiment is a system for separating an electrode sub-unit from a population of electrode sub-units in an array of stacked webs, the electrode sub-units delineated by corresponding weakened patterns, the system comprising: a receiving unit having at least two alignment pins extending therefrom, the alignment pins being positioned to engage with corresponding fiducial features of the electrode sub-units and facing a first surface of the electrode sub-units; a movable punch head including at least two punch head holes, the punch head holes sized and positioned to accept a corresponding one of the alignment pins, the punch head positioned to face an opposing surface of the electrode sub-units; and a controller configured to cause the punch head to apply a force to the opposing surface of the electrode sub-unit sufficient to separate the electrode sub-unit from the array of stacked webs along the weakened pattern.

Yet still another embodiment is a system for separating an electrode sub-unit from a population of electrode sub-units in an array of stacked webs, the electrode sub-units delineated by corresponding weakened patterns, the system comprising: a receiving unit having a base and a moveable platform, the moveable platform being selectively positionable at a predetermined position between the array of stacked webs and the base; a movable punch head positioned to face an opposing surface of the electrode sub-units; and a controller configured to cause the punch head to apply a force to the opposing surface of the electrode sub-unit sufficient to separate the electrode sub-unit from the array of stacked webs along the weakened pattern, the moveable platform of the receiving unit being selectively positioned to receive the electrode sub-unit separated from the array of stacked webs.

Yet still even another embodiment is a system for merging webs for the production of an electrode assembly for a secondary battery, the system comprising: a first merging zone configured to move a first web of base material along a first web merge path, the first web of base material comprising a population of first components for electrode sub-units, the first components delineated by corresponding weakened patterns, and a population of first conveying features; a second merging zone configured to move a second web of base material along a second web merge path, the second web of base material comprising a population of second components for the electrode sub-units, the second components delineated by corresponding weakened patterns, and a population of second conveying features; and a receiving member comprising a plurality of projections, the receiving member being disposed adjacent the first web merge path and the second web merge path, the plurality of projections being configured to engage with the first conveying features of the first web of base material and the second conveying features of the second web of base material; the first merging zone being adapted to transfer the first web of base material onto the receiving member at a first web merge location such that the conveying features of the first web of base material are engaged by at least some of the plurality of projections on the belt; and the second merging zone being adapted to transfer the second web of base material onto the receiving member at a second web merge location such that the second components are substantially aligned with the first components and the conveying features of the second web of base material are engaged by at least some of the plurality of projections on the belt, the second merging zone being spaced in a down web direction from the first merging zone.

Yet still another embodiment is an apparatus for merging webs for the production of an electrode assembly for a secondary battery, the apparatus comprising: a first web of base material wound on a first spool, the first web of base material comprising a population of first components for electrode sub-units, each of the first components being delineated by corresponding weakened patterns; a second web of base material wound on a second spool, the second web of base material comprising a population of second components for the electrode sub-units, each of the second components being delineated by corresponding weakened patterns; a first rotating assembly configured to move the first web of base material along a first web merge path and thereby unwind the first web of base material from the first spool, the first rotating assembly being configured to control a tension of the first web of base material in a down web direction along a first portion of the first web merge path located between the first spool and the first rotating assembly; a second rotating assembly configured to move the second web of base material along a second web merge path and thereby unwind the second web of base material from the second spool, the second rotating assembly being configured to control a tension of the second web of base material in a down web direction along a first portion of the second web merge path located between the second spool and the second rotating assembly; and a receiving member configured to receive the first web of base material along the first web merge path at a first web merge location and the second web of base material along the second web merge path at a second web merge location downstream from the first web merge location such that the second web of base material overlays the first web of base material.

Yet still another embodiment is an apparatus for merging webs for the production of an electrode assembly for a secondary battery, the apparatus comprising: a first web of base material wound on a first spool, the first web of base material comprising a population of first components for electrode sub-units, each of the first components being delineated by corresponding weakened patterns; a second web of base material wound on a second spool, the second web of base material comprising a population of second components for the electrode sub-units, each of the second components being delineated by corresponding weakened patterns; a first rotating assembly configured to move the first web of base material along a first web merge path and thereby unwind the first web of base material from the first spool, the first rotating assembly being configured to control a tension of the first web of base material in a down web direction along a first portion of the first web merge path located between the first spool and the first rotating assembly; a second rotating assembly configured to move the second web of base material along a second web merge path and thereby unwind the second web of base material from the second spool, the second rotating assembly being configured to control a tension of the second web of base material in a down web direction along a first portion of the second web merge path located between the second spool and the second rotating assembly; and a receiving member configured to receive the first web of base material along the first web merge path at a first web merge location and the second web of base material along the second web merge path at a second web merge location downstream from the first web merge location such that the second web of base material overlays the first web of base material, the receiving member being spaced from the first rotating assembly to define a first nip that forms a second portion of the first web merge path located between the first rotating assembly and the receiving member, the receiving member being spaced from the second rotating assembly to define a second nip that forms a second portion of the second web merge path located between the second rotating assembly and the receiving member, the second nip having a greater spacing than the first nip.

Yet still another embodiment is an apparatus for merging webs for the production of an electrode assembly for a secondary battery, the apparatus comprising: a first web of base material wound on a first spool, the first web of base material comprising a population of first components for electrode sub-units, each of the first components being delineated by corresponding weakened patterns, and a population of first tractor holes; a second web of base material wound on a second spool, the second web of base material comprising a population of second components for the electrode sub-units, each of the second components being delineated by corresponding weakened patterns, and a population of second tractor holes; a first rotating assembly comprising a first merge sprocket having teeth for engaging the first tractor holes on the first web of base material, the first rotating assembly configured to move the first web of base material along a first web merge path and thereby unwind the first web of base material from the first spool, the teeth of the first merge sprocket being sized and shaped to control a tension of the first web of base material in a cross-web direction, the first rotating assembly being configured to control a tension of the first web of base material in a down web direction along a first portion of the first web merge path located between the first spool and the first rotating assembly; a second rotating assembly comprising a second merge sprocket having teeth for engaging the second tractor holes on the second web of base material, the second rotating assembly configured to move the second web of base material along a second web merge path and thereby unwind the second web of base material from the second spool, the teeth of the second merge sprocket being sized and shaped to control a tension of the second web of base material in a cross-web direction, the second rotating assembly being configured to control a tension of the second web of base material in a down web direction along a first portion of the second web merge path located between the second spool and the second rotating assembly; and a receiving member comprising a plurality of projections, the receiving member being disposed adjacent the first web merge path and the second web merge path, the plurality of projections being configured to engage with the first tractor holes of the first web of base material at a first web merge location and the second tractor holes of the second web of base material at a second web merge location downstream from the first web merge location such that the second web of base material overlays the first web of base material.

BRIEF DESCRIPTION OF THE DRAWINGS

FIG. 14C1 illustrates a side view of the merging arrangement according to the present disclosure.

FIG. 14C2 illustrates a front view of the merging arrangement according to the present disclosure.

FIG. 14C3 illustrates a top view of the merging arrangement according to the present disclosure.

FIG. 14E1 illustrates a side view of an untapered projection according to an embodiment of the disclosure.

FIG. 14E2 illustrates a side view of a tapered projection according to an embodiment of the disclosure.

FIG. 14E3 illustrates a top view of an untapered projection according to an embodiment of the disclosure.

FIG. 14E4 illustrates a top view of a tapered projection according to an embodiment of the disclosure.

FIG. 14F1 shows an isometric view of counter rotating brushes according to an embodiment of the present disclosure.

FIG. 14F2 shows a top sectional view of counter rotating brushes according to an embodiment of the present disclosure taken along line 14F2-14F2 in FIG. 14F3.

FIG. 14F3 shows a side view of counter rotating brushes according to an embodiment of the present disclosure.

FIG. 14H1 shows a top view of a web interacting with a merge sprocket according to an embodiment of the present disclosure.

FIG. 14H2 shows a side view of a web interacting with a merge sprocket according to an embodiment of the present disclosure.

FIG. 14H3 shows an isometric view of a web interacting with a merge sprocket according to an embodiment of the present disclosure.

DEFINITIONS

Figure 1:
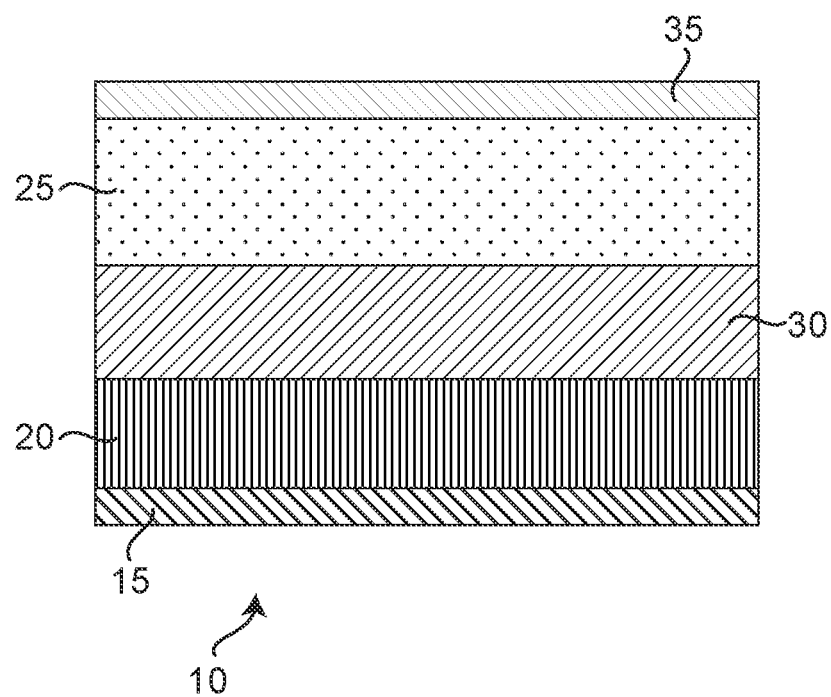
FIG. 1 is a cross-section of an existing (prior art) laminar battery.

"A," "an," and "the" (i.e., singular forms) as used herein refer to plural referents unless the context clearly dictates otherwise. For example, in one instance, reference to "an electrode" includes both a single electrode and a plurality of similar electrodes.

"About" and "approximately" as used herein refers to plus or minus 10%, 5%, or 1% of the value stated. For example, in one instance, about 250 μm would include 225 μm to 275 μm. By way of further example, in one instance, about 1,000 μm would include 900 μm to 1,100 μm. Unless otherwise indicated, all numbers expressing quantities (e.g., measurements, and the like) and so forth used in the specification and claims are to be understood as being modified in all instances by the term "about." Accordingly, unless indicated to the contrary, the numerical parameters set forth in the following specification and attached claims are approximations. Each numerical parameter should at least be construed in light of the number of reported significant digits and by applying ordinary rounding techniques.

"Anode" as used herein in the context of a secondary battery refers to the negative electrode in the secondary battery "Anode material" or "Anodically active" as used herein means material suitable for use as the negative electrode of a secondary battery "Cathode" as used herein in the context of a secondary battery refers to the positive electrode in the secondary battery "Cathode material" or "Cathodically active" as used herein means material suitable for use as the positive electrode of a secondary battery "Cycle" as used herein in the context of cycling of a secondary battery between charged and discharged states refers to charging and/or discharging a battery to move the battery in a cycle from a first state that is either a charged or discharged state, to a second state that is the opposite of the first state (i.e., a charged state if the first state was discharged, or a discharged state if the first state was charged), and then moving the battery back to the first state to complete the cycle. For example, a single cycle of the secondary battery between charged and discharged states can include, as in a charge cycle, charging the battery from a discharged state to a charged state, and then discharging back to the discharged state, to complete the cycle. The single cycle can also include, as in a discharge cycle, discharging the battery from the charged state to the discharged state, and then charging back to a charged state, to complete the cycle.

"Electrochemically active material" as used herein means anodically active or cathodically active material.

"Electrode" as used herein may refer to the negative or positive electrode of a secondary battery unless the context clearly indicates otherwise.

"Electrode current collector layer" as used herein may refer to an anode (e.g., negative) current collector layer or a cathode (e.g., positive) current collector layer.

"Electrode material" as used herein may refer to anode material or cathode material unless the context clearly indicates otherwise.

"Electrode structure" as used herein may refer to an anode structure (e.g., negative electrode structure) or a cathode structure (e.g., positive electrode structure) adapted for use in a battery unless the context clearly indicates otherwise.

"Longitudinal axis," "transverse axis," and "vertical axis," as used herein refer to mutually perpendicular axes (i.e., each are orthogonal to one another). For example, the "longitudinal axis," "transverse axis," and the "vertical axis" as used herein are akin to a Cartesian coordinate system used to define three-dimensional aspects or orientations. As such, the descriptions of elements of the disclosed subject matter herein are not limited to the particular axis or axes used to describe three-dimensional orientations of the elements. Alternatively stated, the axes may be interchangeable when referring to three-dimensional aspects of the disclosed subject matter.

"Weakened region" refers to a portion of the web that has undergone a processing operation such as scoring, cutting, perforation or the like such that the local rupture strength of the weakened region is lower than the rupture strength of a non-weakened region.

DETAILED DESCRIPTION

Embodiments of the present disclosure relate to apparatuses, systems and methods for the production of electrode components for batteries, such as three-dimensional secondary batteries that improve the speed of manufacture of the battery components, while retaining or improving battery capacity and battery longevity, and reducing the occurrences of defects during the manufacturing process.

An exemplary system for the production of electrode components, including electrodes and separators, for use in batteries will be described with reference to FIG. 2. The electrode production (or manufacturing) system, indicated generally at 100, includes a number of discrete stations, systems, components, or apparatuses that function to enable the efficient production of precision electrodes for use in batteries. The production system 100 is described first generally, with respect to FIG. 2, and subsequently additional detail of each component is then further described after the broader production system 100 is introduced.

In the illustrated exemplary embodiment, the production system 100 includes a base unwind roller 102 for holding and unwinding a web of base material 104. The web of base material 104 may be a web of electrode material (i.e., a web of anode material or a web of cathode material), separator material or the like suitable for the production of an electrode assembly for a secondary battery. The web of base material 104 is a thin sheet of material that has been wound into the form of a roll, having a center through hole sized for placement on the base unwind roller 102. In some embodiments, the web of base material 104 is a multi-layer material including, for example, an electrode current collector layer (i.e., an anode current collector layer or a cathode current collector layer), and an electrochemically active material layer (i.e., a layer of anodically active material or a layer of cathodically active material) on at least one major surface thereof, and in other embodiments the web of base material may be a single layer (e.g., a web of separator material). The base unwind roller 102 may be formed from metal, metal alloy, composite, plastic or any other material that allows the production system 100 to function as described herein. In one embodiment, the unwind roller 102 is made of stainless steel and has a diameter of 3 inches (76.2 mm).

Figure 2:
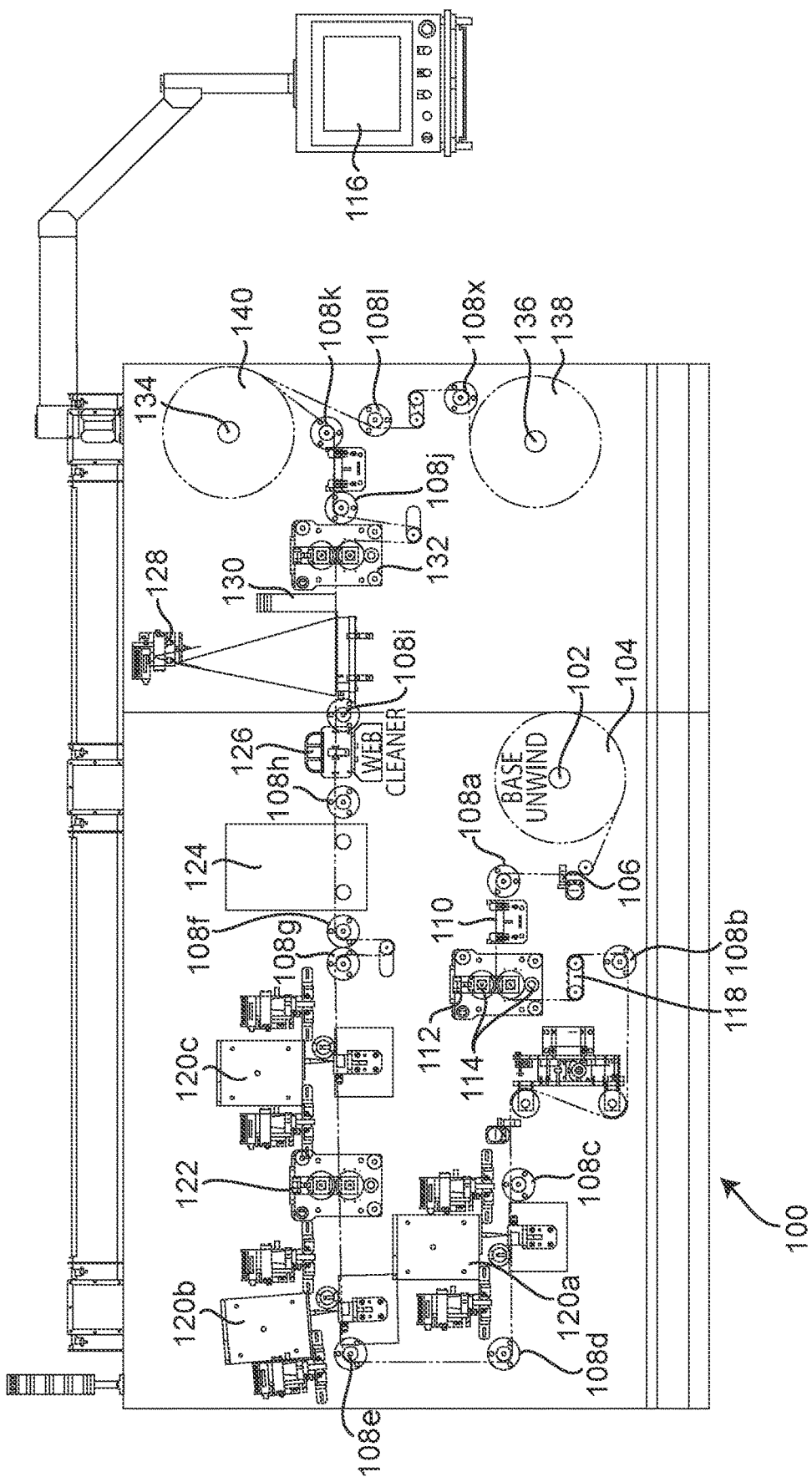
FIG. 2 is a schematic diagram of one suitable embodiment of an electrode manufacturing system according to the present disclosure.

As seen in the embodiment of FIG. 2, the web of base material 104 is passed across an edge guide 106, to facilitate unwinding of the web of base material 104. In one embodiment, the edge guide 106 uses a through-beam type optical sensor to detect the position of one edge of the web of base material 104 relative to a fixed reference point. Feedback is sent from the edge guide 106 to a "web steering" roller, generally the unwind roller 102, which will move in a direction perpendicular to the direction of travel of the web of base material 104. In this embodiment, the web of base material 104 then passes around an idler 108a and into a splicing station 110. The idler 108a (also may be referred to as an idle roller) facilitates maintaining proper positioning and tension of the web of base material 104, as well as to change the direction of the web of base material 104. In the embodiment shown in FIG. 2, the idler 108a receives the web of base material 104 in a vertical direction, and is partially wrapped around the idler 108a such that the web of base material 104 leaves the idler 108a in an output direction substantially ninety degrees from the input direction. However, it should be appreciated that the input and output directions may vary without departing from the scope of this disclosure. In some embodiments, the production system 100 may use multiple idlers 108a-108x to change the direction of the web of base material one or more times as it is conveyed through the production system 100. The idlers 108a-108x may be formed from metal, metal alloy, composite, plastic, rubber or any other material that allows the production system 100 to function as described herein. In one embodiment, the idlers 108a-108x are made of stainless steel and have dimensions of 1 inch (25.4 mm) diameter×18 inches (457.2 mm) length.

The splicing station 110 is configured to facilitate splicing two separate webs together. In one suitable embodiment, as a first web of base material 104 is unwound, such that a trailing edge (not shown) of the web of base material 104 is stopped within the splicing station 110, a leading edge (not shown) of a second web of base material 104 is unwound into the splicing station 110 such that the trailing edge of the first web and the leading edge of the second web are adjacent one another. The user may then apply an adhesive, such as an adhesive tape, to join the leading edge of the second web to the trailing edge of the first web to form a seam between the two webs and create a continuous web of base material. Such process may be repeated for numerous webs of base material 104, as dictated by a user. Thus, the splicing station 110 allows for the possibility of having multiple webs of base material being spliced together to form one continuous web. It should be appreciated that in other embodiments, a user may splice webs of the same, or different, materials together if desired.

In one suitable embodiment, upon exiting the splicing station 110, the web of base material 104 is then conveyed in the down-web direction WD such that it may enter a nip roller 112. The nip roller 112 is configured to facilitate controlling the speed at which the web of base material 104 is conveyed through the production system 100. In one embodiment, the nip roller 112 includes at least two adjacent rollers having a space therebetween defining a nip. The nip is sized such that the web of base material 104 is pressed against each of the two adjacent rollers 114 (also referred to as "nip rollers"), with enough pressure to allow friction of the rollers to move the web of base material 104, but a low enough pressure to avoid any significant deformation or damage to the web of base material 104. In some suitable embodiments, the pressure exerted against the web of base material 104 by nip rollers 114 is set between 0 to 210 pounds of force across the cross-web span of the web $S_w$ (i.e., the edge to edge distance of the web in the cross-web direction XWD) (FIGS. 6, 8A) of base material 104 in the cross web direction XWD, such as 0 lb, 5 lb, 10 lb, 15 lb, 20 lb, 25 lb, 30 lb, 35 lb, 40 lb, 45 lb, 50 lb, 55 lb, 60 lb, 65 lb, 70 lb, 75 lb, 80 lb, 85 lb, 90 lb, 95 lb, 100 lb, 110 lb, 120 lb, 130 lb, 140 lb, 150 lb, 160 lb, 170 lb, 180 lb, 190 lb, 200 lb, or 210 lb of force.

In one suitable embodiment, at least one of the adjacent rollers 114 is a compliant roller which may be a high friction roller driven by an electric motor, and another of the adjacent rollers is a low friction passive roller. The compliant roller may have at least an exterior surface made from rubber or polymer capable of providing sufficient grip on the web of base material 104 to provide a pushing or pulling force on the web of base material 104 to convey it through the production system 100. In one embodiment, at least one of the adjacent rollers 114 is a steel roller having a diameter of about 3.863 inches (98.12 mm). In another embodiment, at least one of the adjacent rollers 114 is a rubber roller having a diameter of about 2.54 inches (64.51 mm). In yet another embodiment, one or more of the adjacent rollers 114 include a rubber ring placed thereon which may be adjusted for placement at any location along the width of the roller, each ring having an outer diameter of about 3.90 inches (99.06 mm). In one embodiment, one or more rubber rings are placed on the rollers to contact the web of base material 104 at a continuous outer edge thereof to drive the web of base material 104 in the down-web direction WD. Accordingly, the speed of the web of base material 104 is controlled by controlling the rate of rotation of the high friction roller via a user interface 116. In embodiments, the speed of the web in the web direction is controlled to be from 0.001 m/s to 10 m/s. In embodiments, the maximum speed of the web in the web direction WD is dictated by the inertia of the web and system components, such that the web maintains proper alignment, flatness and tensioning as further described herein. In other embodiments, each of the adjacent rollers 114 may be made from any high friction or low friction material, that allows the production system 100 to function as described herein. It should be appreciated that either or both of the adjacent rollers 114 may be connected to a motor (not shown) for controlling the speed of the web of base material 104 passing through the nip. The production system 100 may include one or more additional nip rollers 122, 132 to facilitate control of the speed of the web of base material 104 conveyed through the production system 100, which may be controlled via the user interface 116. When multiple nip rollers are used, each of the nip rollers may be set via the user interface 116 to the same speed such that the web of base material 104 is conveyed smoothly through production system 100. In embodiments, the speed of the web of base material 104 in the web direction WD is controlled to be from 0.001 m/s to 10 m/s.

The production system 100 may also include a dancer 118. As seen in FIG. 2, the illustrated dancer 118 includes a pair of rollers spaced apart from one another, but connected about a central axis between the pair of rollers of the dancer 118. The pair of rollers of the dancer 118 may rotate about the central axis, thereby passively adjusting the tension on the web of base material 104. For example, if the tension on the web of base material 104 exceeds a predetermined threshold, the pair of rollers of the dancer 118 rotate about the central axis to reduce the tension on the web. Accordingly, the dancer 118 may use the mass of the dancer alone (e.g., the mass of one or more of the pair of rollers), a spring, torsion rod or other biasing/tensioning device which may be user adjustable or controllable via user interface 116, to ensure a proper tension is consistently maintained on the web of base material. In one embodiment, the mass of the dancer 118 and inertia of the dancer are reduced or minimized to allow for web tension at or below 500 gram force, for example by using hollow rollers made of aluminum. In other embodiments, the rollers of the dancer 118 are made of other lightweight materials such as carbon fiber, aluminum alloys, magnesium, other lightweight metals and metal alloys, fiberglass or any other suitable material that allows for a mass low enough to provide a web tension at or below 500 gram force. In yet another embodiment, the rollers of the dancer 118 are counterbalanced to allow a tension in the web of base material 104 of 250 gram force or less.

Figure 3:
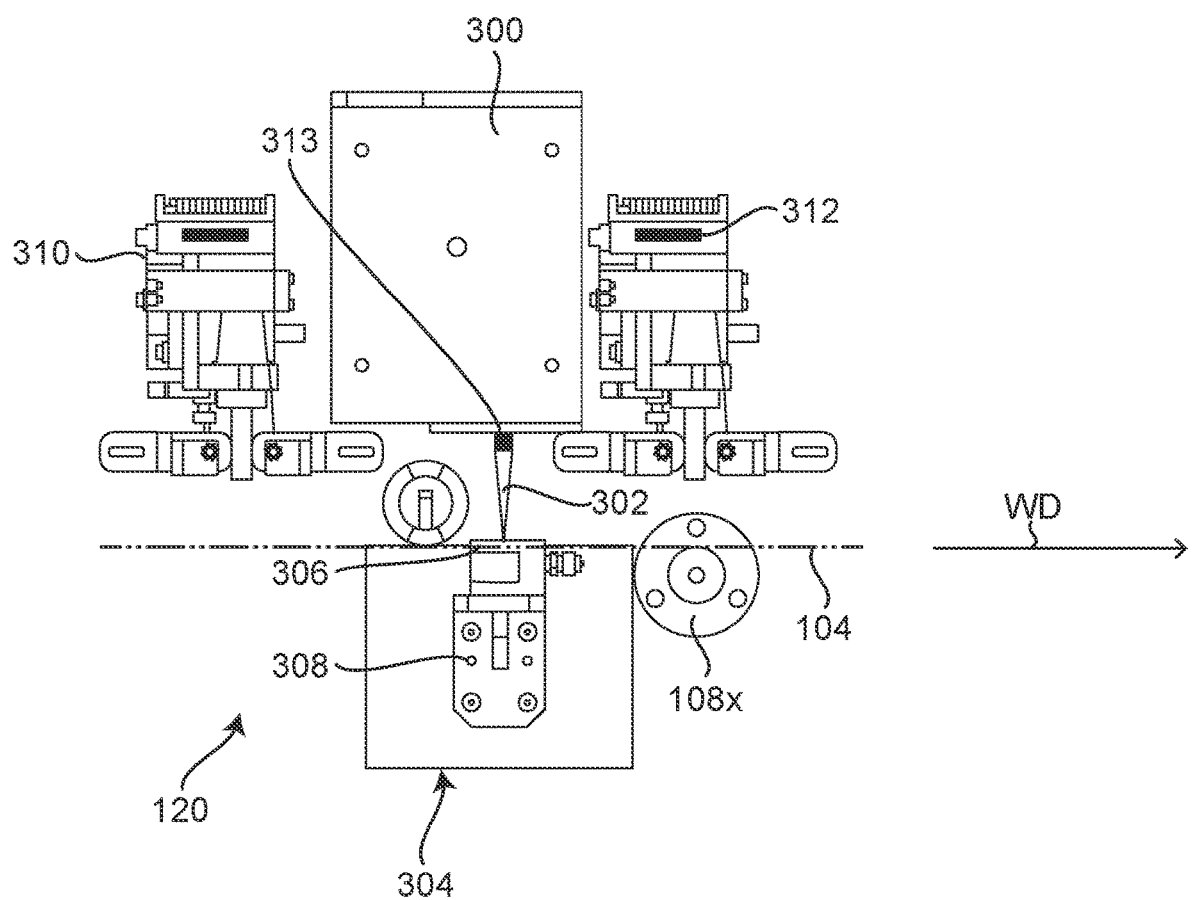
FIG. 3 is an enlarged schematic view of one suitable embodiment of a laser system according to the present disclosure.
Figure 4:
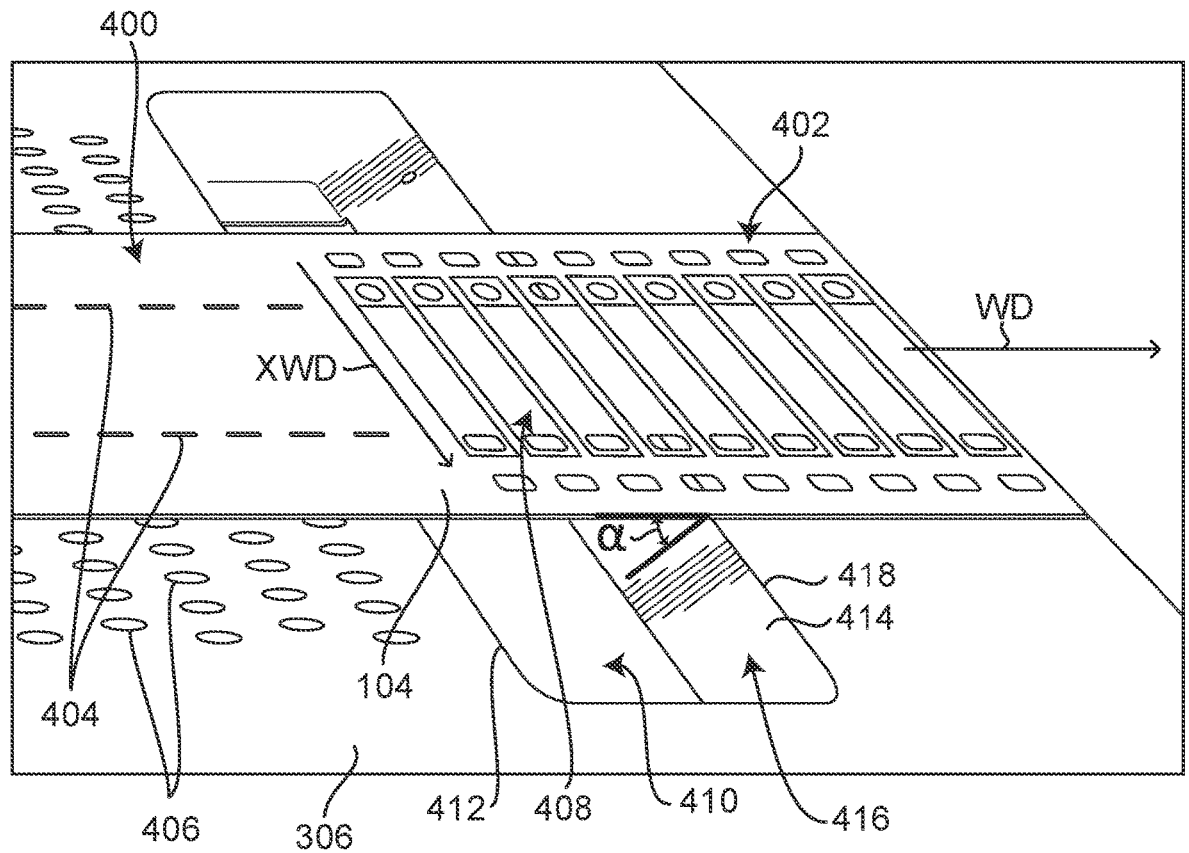
FIG. 4 is an isometric view of one suitable embodiment of a cutting plenum according to the present disclosure.
Figure 13:
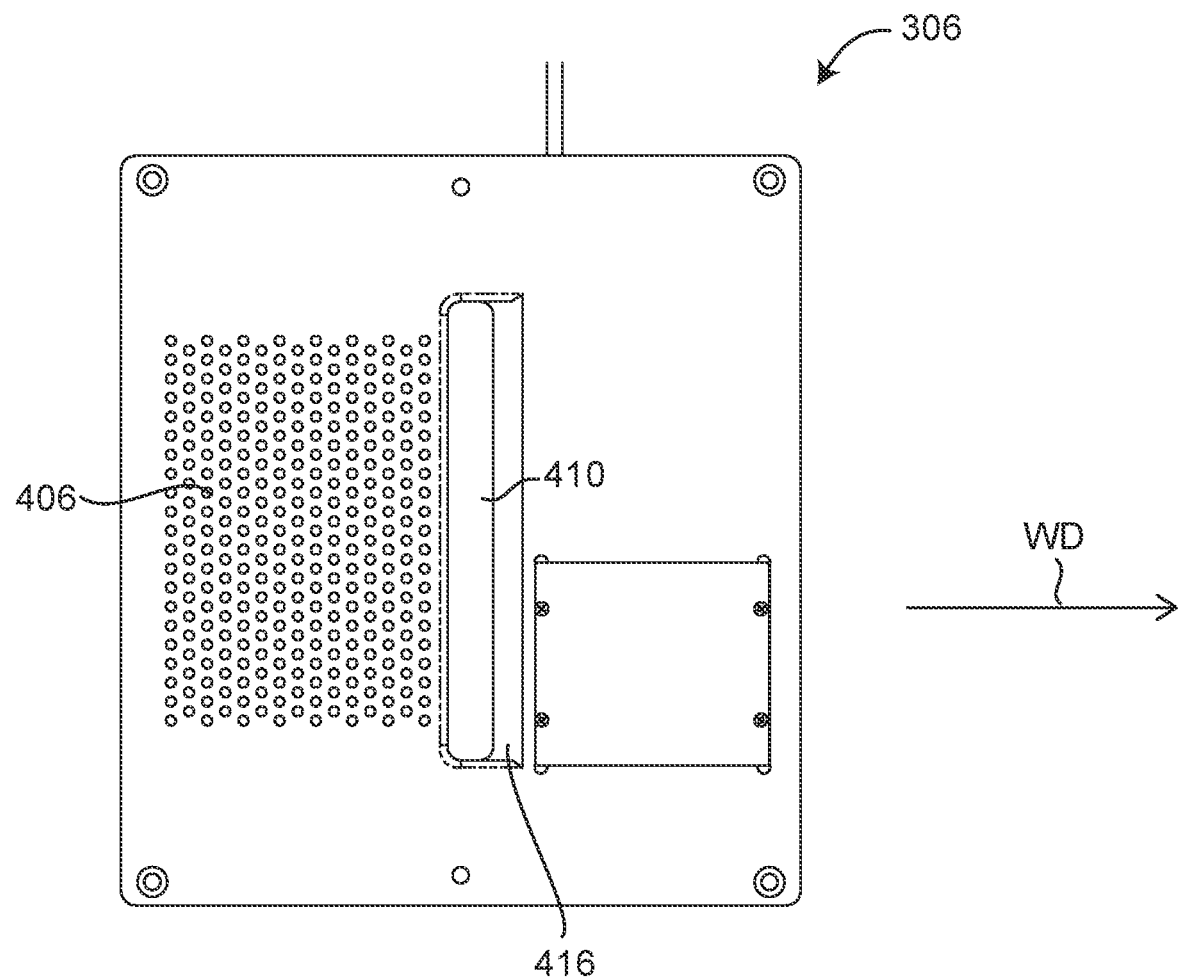
FIG. 13 is a top view of a chuck according to one suitable embodiment of the current disclosure.

The production system 100 includes one or more laser systems 120a, 120b, 120c. The embodiment shown in FIG. 2 includes three laser systems 120a-c, but it should be appreciated that any number of laser systems may be used to allow the production system 100 to function as described herein. Further description of the laser systems 120a-c is made with reference to FIG. 3. In one suitable embodiment, at least one of the laser systems 120a-c includes a laser device 300 configured to emit a laser beam 302 toward a cutting plenum 304 (FIG. 3). In the illustrated embodiment, the cutting plenum 304 includes a chuck 306 and a vacuum 308. Details of the chuck 306 are best shown in FIGS. 4 and 13, which are further described below. In one suitable embodiment and as illustrated in FIG. 4, adjacent the laser system 120, are one or more inspection systems 310, 312, which may be visual inspection devices such as a camera or any other suitable inspection system which allows the production system 100 to function as further described herein.

The exemplary production system 100 illustrated in FIG. 2 includes one or more cleaning stations such as a brushing station 124 and an air knife 126. Each cleaning station is configured to remove or otherwise facilitate removal of debris (not shown) from the web of base material 104, as described further herein.

The production system 100 of FIG. 2 includes an inspection device 128 to identify defects and an associated defect marking device 130 to mark the web of base material 104 to identify locations of identified defects, as described further herein.

In one suitable embodiment, the web of base material 104 is rewound via a rewind roller 134 together with a web of interleaf material 138, which is unwound via interleaf roller 136 to create a roll of electrodes 140 with layers of the electrodes separated by interleaf material 138. In some embodiments, the web of base material 104 can be rewound via the rewind roller 134 without the web of interleaf material 138.

It should be noted that the series of nip rollers 112, 122, 132, idlers 108a-x, and dancers 118a-x may be together referred to as a conveying system for conveying the web of base material 104 through the production system 100. As used herein, conveying system or conveying of the web of base material 104 refers to intended movement of the web of base material 104 through the production system in the web direction WD.

Figure 5:
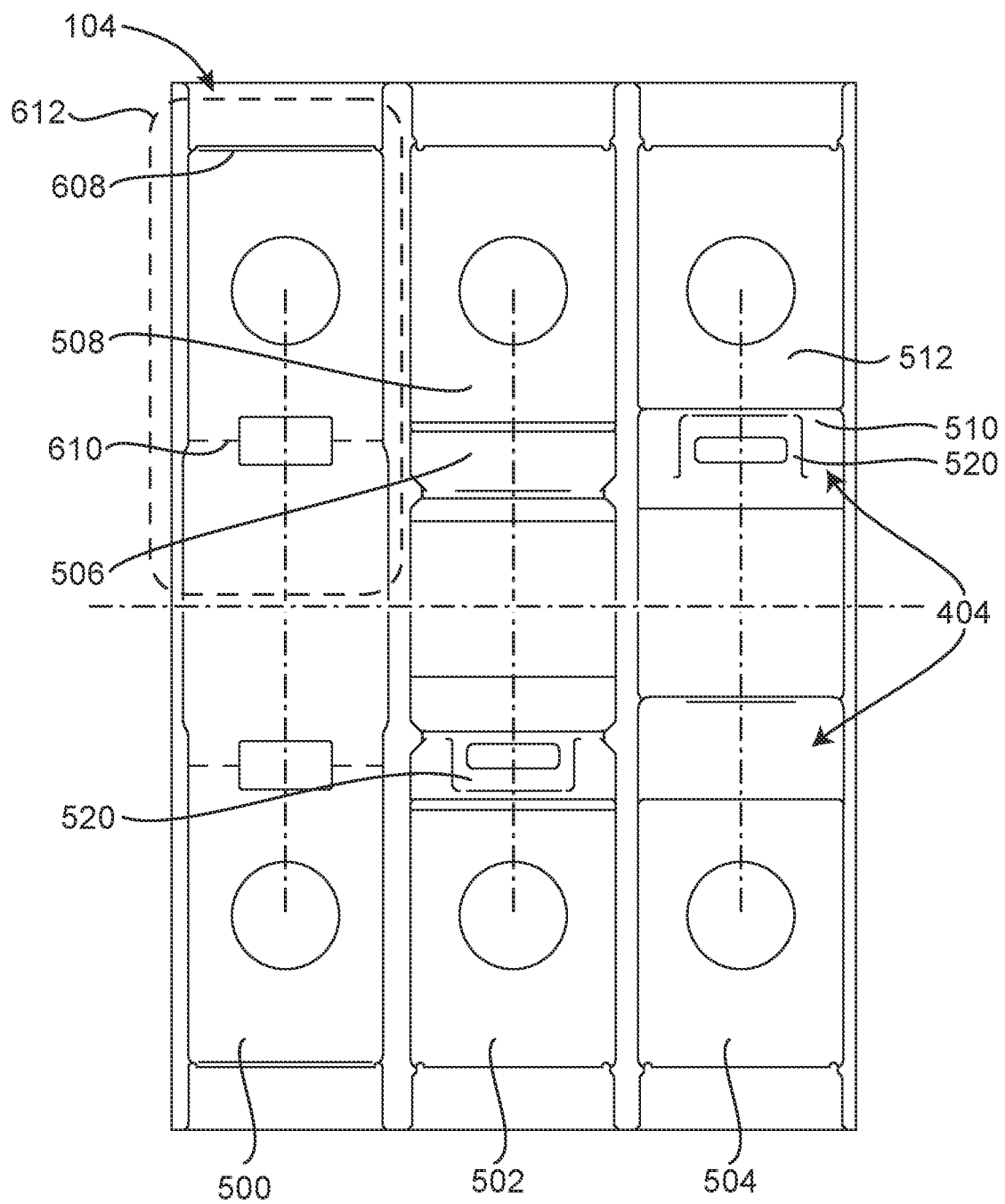
FIG. 5 is a truncated top view of exemplary webs of base material formed into electrodes after having been processed through the electrode manufacturing system of the current disclosure.

With reference to FIG. 5, the web of base material 104 may be any material suitable for the production of electrode components for use in batteries as described herein. For example, web of base material 104 may be an electrically insulating separator material 500, an anode material 502 or a cathode material 504. In one suitable embodiment, the web of base material 104 is an electrically insulating and ionically permeable polymeric woven material suitable for use as a separator in a secondary battery.

In another suitable embodiment and with reference still to FIG. 5, the web of base material 104 is a web of anode material 502, which may include an anode current collector layer 506 and an anodically active material layer 508. The anode current collector layer 506 may comprise a conductive metal such as copper, copper alloys or any other material suitable as an anode current collector layer. The anodically active material layer 508 may be formed as a first layer on a first surface of the anode current collector layer 506 and a second layer on a second opposing surface of the anode current collector layer 506. In another embodiment, the anode current collector layer 506 and anodically active material layer 508 may be intermixed. The first surface and the second opposing surface may be referred to as major surfaces, or front and back surfaces, of the web of base material 104. A major surface, as used herein, refers to the surfaces defined by the plane formed by the length of the web of base material in the down-web direction WD and the span of the web of base material 104 in the cross-web direction XWD.

In general, when the web of base material 104 is a web of anode material, the anodically active material layer(s) thereof will (each) have a thickness of at least about 10 um. For example, in one embodiment, the anodically active material layer(s) will (each) have a thickness of at least about 40 um. By way of further example, in one such embodiment, the anodically active material layer(s) will (each) have a thickness of at least about 80 um. By way of further example, in one such embodiment, the anodically active material layers will (each) have a thickness of at least about 120 um. Typically, however, the anodically active material layer(s) will (each) have a thickness of less than about 60 um or even less than about 30 um.

Exemplary anodically active materials include carbon materials such as graphite and soft or hard carbons, or graphene (e.g., single-walled or multi-walled carbon nanotubes), or any of a range of metals, semi-metals, alloys, oxides, nitrides and compounds capable of intercalating lithium or forming an alloy with lithium. Specific examples of the metals or semi-metals capable of constituting the anode material include graphite, tin, lead, magnesium, aluminum, boron, gallium, silicon, Si/C composites, Si/graphite blends, silicon oxide (SiOx), porous Si, intermetallic Si alloys, indium, zirconium, germanium, bismuth, cadmium, antimony, silver, zinc, arsenic, hafnium, yttrium, lithium, sodium, graphite, carbon, lithium titanate, palladium, and mixtures thereof. In one exemplary embodiment, the anodically active material comprises aluminum, tin, or silicon, or an oxide thereof, a nitride thereof, a fluoride thereof, or other alloy thereof. In another exemplary embodiment, the anodically active material comprises silicon or an alloy or oxide thereof.

In one embodiment, the anodically active material is microstructured to provide a significant void volume fraction to accommodate volume expansion and contraction as lithium ions (or other carrier ions) are incorporated into or leave the negative electrode active material during charging and discharging processes. In general, the void volume fraction of (each of) the anodically active material layer(s) is at least 0.1. Typically, however, the void volume fraction of (each of) the anodically active material layer(s) is not greater than 0.8. For example, in one embodiment, the void volume fraction of (each of) the anodically active material layer(s) is about 0.15 to about 0.75. By way of the further example, in one embodiment, the void volume fraction of (each of) the anodically active material layer(s) is about 0.2 to about 0.7. By way of the further example, in one embodiment, the void volume fraction of (each of) the anodically active material layer(s) is about 0.25 to about 0.6.

Depending upon the composition of the microstructured anodically active material and the method of its formation, the microstructured anodically active material may comprise macroporous, microporous, or mesoporous material layers or a combination thereof, such as a combination of microporous and mesoporous, or a combination of mesoporous and macroporous. Microporous material is typically characterized by a pore dimension of less than 10 nm, a wall dimension of less than 10 nm, a pore depth of 1-50 micrometers, and a pore morphology that is generally characterized by a "spongy" and irregular appearance, walls that are not smooth, and branched pores. Mesoporous material is typically characterized by a pore dimension of 10-50 nm, a wall dimension of 10-50 nm, a pore depth of 1-100 micrometers, and a pore morphology that is generally characterized by branched pores that are somewhat well defined or dendritic pores. Macroporous material is typically characterized by a pore dimension of greater than 50 nm, a wall dimension of greater than 50 nm, a pore depth of 1-500 micrometers, and a pore morphology that may be varied, straight, branched, or dendritic, and smooth or rough-walled. Additionally, the void volume may comprise open or closed voids, or a combination thereof. In one embodiment, the void volume comprises open voids, that is, the negative electrode active material contains voids having openings at the lateral surface of the negative electrode active material through which lithium ions (or other carrier ions) can enter or leave the anodically active material; for example, lithium ions may enter the anodically active material through the void openings after leaving the cathodically active material. In another embodiment, the void volume comprises closed voids, that is, the anodically active material contains voids that are enclosed by anodically active material. In general, open voids can provide greater interfacial surface area for the carrier ions whereas closed voids tend to be less susceptible to solid electrolyte interface while each provides room for expansion of the anodically active material upon the entry of carrier ions. In certain embodiments, therefore, it is preferred that the anodically active material comprise a combination of open and closed voids.

In one embodiment, the anodically active material comprises porous aluminum, tin or silicon or an alloy, an oxide, or a nitride thereof. Porous silicon layers may be formed, for example, by anodization, by etching (e.g., by depositing precious metals such as gold, platinum, silver or gold/palladium on the surface of single crystal silicon and etching the surface with a mixture of hydrofluoric acid and hydrogen peroxide), or by other methods known in the art such as patterned chemical etching. Additionally, the porous anodically active material will generally have a porosity fraction of at least about 0.1, but less than 0.8 and have a thickness of about 1 to about 100 micrometers. For example, in one embodiment, the anodically active material comprises porous silicon, has a thickness of about 5 to about 100 micrometers, and has a porosity fraction of about 0.15 to about 0.75. By way of further example, in one embodiment, the anodically active material comprises porous silicon, has a thickness of about 10 to about 80 micrometers, and has a porosity fraction of about 0.15 to about 0.7. By way of further example, in one such embodiment, the anodically active material comprises porous silicon, has a thickness of about 20 to about 50 micrometers, and has a porosity fraction of about 0.25 to about 0.6. By way of further example, in one embodiment, the anodically active material comprises a porous silicon alloy (such as nickel silicide), has a thickness of about 5 to about 100 micrometers, and has a porosity fraction of about 0.15 to about 0.75.

In another embodiment, the anodically active material layer comprises fibers of aluminum, tin or silicon, or an alloy thereof. Individual fibers may have a diameter (thickness dimension) of about 5 nm to about 10,000 nm and a length generally corresponding to the thickness of the anodically active material. Fibers (nanowires) of silicon may be formed, for example, by chemical vapor deposition or other techniques known in the art such as vapor liquid solid (VLS) growth and solid liquid solid (SLS) growth. Additionally, the anodically active material will generally have a porosity fraction of at least about 0.1, but less than 0.8 and have a thickness of about 1 to about 200 micrometers. For example, in one embodiment, the anodically active material comprises silicon nanowires, has a thickness of about 5 to about 100 micrometers, and has a porosity fraction of about 0.15 to about 0.75. By way of further example, in one embodiment, the anodically active material comprises silicon nanowires, has a thickness of about 10 to about 80 micrometers, and has a porosity fraction of about 0.15 to about 0.7. By way of further example, in one such embodiment, the anodically active material comprises silicon nanowires, has a thickness of about 20 to about 50 micrometers, and has a porosity fraction of about 0.25 to about 0.6. By way of further example, in one embodiment, the anodically active material comprises nanowires of a silicon alloy (such as nickel silicide), has a thickness of about 5 to about 100 micrometers, and has a porosity fraction of about 0.15 to about 0.75.

In general, the anode current collector will have an electrical conductivity of at least about $10^3$ Siemens/cm. For example, in one such embodiment, the anode current collector will have a conductivity of at least about $10^4$ Siemens/cm. By way of further example, in one such embodiment, the anode current collector will have a conductivity of at least about $10^5$ Siemens/cm. Exemplary electrically conductive materials suitable for use as anode current collectors include metals, such as, copper, nickel, cobalt, titanium, and tungsten, and alloys thereof.

Referring again to FIG. 5, in another suitable embodiment, the web of base material 104 is a web of cathode material 504, which may include a cathode current collector layer 510 and a cathodically active material layer 512. The cathode current collector layer 510 of the cathode material may comprise aluminum, an aluminum alloy, titanium or any other material suitable for use as a cathode current collector layer. The cathodically active material layer 512 may be formed as a first layer on a first surface of the cathode current collector layer 510 and a second layer on a second opposing surface of the cathode current collector layer 510. The cathodically active material layer 512 may be coated onto one or both sides of cathode current collector layer 510. It is noted that a current collector and a current conductor may be used interchangeably herein. Similarly, the cathodically active material layer 512 may be coated onto one or both major surfaces of cathode current collector layer 510. In another embodiment, the cathode current collector layer 510 may be intermixed with cathodically active material layer 512.

In general, when the web of base material 104 is a web of cathode material, the cathodically active material layer(s) thereof will (each) have a thickness of at least about 20 um. For example, in one embodiment, the cathodically active material layer(s) will (each) have a thickness of at least about 40 um. By way of further example, in one such embodiment the cathodically active material layer(s) will (each) have a thickness of at least about 60 um. By way of further example, in one such embodiment the cathodically active material layers will (each) have a thickness of at least about 100 um. Typically, however, the cathodically active material layer(s) will (each) have a thickness of less than about 90 um or even less than about 70 um.

Exemplary cathodically active materials include any of a wide range of cathodically active materials. For example, for a lithium-ion battery, the cathodically active material may comprise a cathodically active material selected from transition metal oxides, transition metal sulfides, transition metal nitrides, lithium-transition metal oxides, lithium-transition metal sulfides, and lithium-transition metal nitrides may be selectively used. The transition metal elements of these transition metal oxides, transition metal sulfides, and transition metal nitrides can include metal elements having a d-shell or f-shell. Specific examples of such metal element are Sc, Y, lanthanoids, actinoids, Ti, Zr, Hf, V, Nb, Ta, Cr, Mo, W, Mn, Tc, Re, Fe, Ru, Os, Co, Rh, Ir, Ni, Pb, Pt, Cu, Ag, and Au. Additional cathode active materials include $LiCoO_2$, $LiNi_{0.5}Mn_{1.5}O_4$, $Li(Ni_xCo_yAl_z)O_2$, $LiFePO_4$, $Li_2MnO_4$, $V_2O_5$, molybdenum oxysulfides, phosphates, silicates, vanadates, sulfur, sulfur compounds, oxygen (air), $Li(Ni_xMn_yCo_z)O_2$, and combinations thereof.

In general, the cathode current collector will have an electrical conductivity of at least about $10^3$ Siemens/cm. For example, in one such embodiment, the cathode current collector will have a conductivity of at least about $10^4$ Siemens/cm. By way of further example, in one such embodiment, the cathode current collector will have a conductivity of at least about $10^5$ Siemens/cm. Exemplary cathode current collectors include metals, such as aluminum, nickel, cobalt, titanium, and tungsten, and alloys thereof.

Referring again to FIG. 5, in another suitable embodiment, the web of base material 104 is a web of electrically insulating but ionically permeable separator material. Electrically insulating separator material 500 are adapted to electrically isolate each member of the anode population from each member of the cathode population of a secondary battery. Electrically insulating separator material 500 will typically include a microporous separator material that can be permeated with a non-aqueous electrolyte; for example, in one embodiment, the microporous separator material includes pores having a diameter of at least 50 Å, more typically in the range of about 2,500 Å, and a porosity in the range of about 25% to about 75%, more typically in the range of about 35-55%

In general, when the web of base material 104 is a web of electrically insulating separator material, the electrically insulating separator material will have a thickness of at least about 4 um. For example, in one embodiment, the electrically insulating separator material will have a thickness of at least about 8 um. By way of further example, in one such embodiment the electrically insulating separator material will have a thickness of at least about 12 um. By way of further example, in one such embodiment the electrically insulating separator material will have a thickness of at least about 15 um. Typically, however, the electrically insulating separator material will have a thickness of less than about 12 um or even less than about 10 um.

In one embodiment, the microporous separator material comprises a particulate material and a binder, and has a porosity (void fraction) of at least about 20 vol. % The pores of the microporous separator material will have a diameter of at least 50 Å and will typically fall within the range of about 250 to 2,500 Å. The microporous separator material will typically have a porosity of less than about 75%. In one embodiment, the microporous separator material has a porosity (void fraction) of at least about 25 vol %. In one embodiment, the microporous separator material will have a porosity of about 35-55%.

The binder for the microporous separator material may be selected from a wide range of inorganic or polymeric materials. For example, in one embodiment, the binder is an organic material selected from the group consisting of silicates, phosphates, aluminates, aluminosilicates, and hydroxides such as magnesium hydroxide, calcium hydroxide, etc. For example, in one embodiment, the binder is a fluoropolymer derived from monomers containing vinylidene fluoride, hexafluoropropylene, tetrafluoropropene, and the like. In another embodiment, the binder is a polyolefin such as polyethylene, polypropylene, or polybutene, having any of a range of varying molecular weights and densities. In another embodiment, the binder is selected from the group consisting of ethylene-diene-propene terpolymer, polystyrene, polymethyl methacrylate, polyethylene glycol, polyvinyl acetate, polyvinyl butyral, polyacetal, and polyethyleneglycol diacrylate. In another embodiment, the binder is selected from the group consisting of methyl cellulose, carboxymethyl cellulose, styrene rubber, butadiene rubber, styrene-butadiene rubber, isoprene rubber, polyacrylamide, polyvinyl ether, polyacrylic acid, polymethacrylic acid, and polyethylene oxide. In another embodiment, the binder is selected from the group consisting of acrylates, styrenes, epoxies, and silicones. In another embodiment, the binder is a copolymer or blend of two or more of the aforementioned polymers.

The particulate material comprised by the microporous separator material may also be selected from a wide range of materials. In general, such materials have a relatively low electronic and ionic conductivity at operating temperatures and do not corrode under the operating voltages of the battery electrode or current collector contacting the microporous separator material. For example, in one embodiment, the particulate material has a conductivity for carrier ions (e.g., lithium) of less than $1 \times 10^{-4}$ S/cm. By way of further example, in one embodiment, the particulate material has a conductivity for carrier ions of less than $1 \times 10^{-5}$ S/cm. By way of further example, in one embodiment, the particulate material has a conductivity for carrier ions of less than $1 \times 10^{-6}$ S/cm. Exemplary particulate materials include particulate polyethylene, polypropylene, a $TiO_2$-polymer composite, silica aerogel, fumed silica, silica gel, silica hydrogel, silica xerogel, silica sol, colloidal silica, alumina, titania, magnesia, kaolin, talc, diatomaceous earth, calcium silicate, aluminum silicate, calcium carbonate, magnesium carbonate, or a combination thereof. For example, in one embodiment, the particulate material comprises a particulate oxide or nitride such as $TiO_2$, $SiO_2$, $Al_2O_3$, $GeO_2$, $B_2O_3$, $Bi_2O_3$, $BaO$, $ZnO$, $ZrO_2$, $BN$, $Si_3N_4$, $Ge_3N_4$. See, for example, P. Arora and J. Zhang, "Battery Separators" Chemical Reviews 2004, 104, 4419-4462). In one embodiment, the particulate material will have an average particle size of about 20 nm to 2 micrometers, more typically 200 nm to 1.5 micrometers. In one embodiment, the particulate material will have an average particle size of about 500 nm to 1 micrometer.

In an alternative embodiment, the particulate material comprised by the microporous separator material may be bound by techniques such as sintering, binding, curing, etc. while maintaining the void fraction desired for electrolyte ingress to provide the ionic conductivity for the functioning of the battery.

In an assembled energy storage device, the microporous separator material is permeated with a non-aqueous electrolyte suitable for use as a secondary battery electrolyte. Typically, the non-aqueous electrolyte comprises a lithium salt and/or mixture of salts dissolved in an organic solvent and/or solvent mixture. Exemplary lithium salts include inorganic lithium salts such as $LiClO_4$, $LiBF_4$, $LiPF_6$, $LiAsF_6$, $LiCl$, and $LiBr$; and organic lithium salts such as $LiB(C_6H_5)_4$, $LiN(SO_2CF_3)_2$, $LiN(SO_2CF_3)_3$, $LiNSO_2CF_3$, $LiNSO_2CF_5$, $LiNSO_2C_4F_9$, $LiNSO_2C_5F_{11}$, $LiNSO_2C_6F_{13}$, and $LiNSO_2C_7F_{15}$. Exemplary organic solvents to dissolve the lithium salt include cyclic esters, chain esters, cyclic ethers, and chain ethers. Specific examples of the cyclic esters include propylene carbonate, butylene carbonate, γ-butyrolactone, vinylene carbonate, 2-methyl-γ-butyrolactone, acetyl-γ-butyrolactone, and γ-valerolactone. Specific examples of the chain esters include dimethyl carbonate, diethyl carbonate, dibutyl carbonate, dipropyl carbonate, methyl ethyl carbonate, methyl butyl carbonate, methyl propyl carbonate, ethyl butyl carbonate, ethyl propyl carbonate, butyl propyl carbonate, alkyl propionates, dialkyl malonates, and alkyl acetates. Specific examples of the cyclic ethers include tetrahydrofuran, alkyltetrahydrofurans, dialkyltetrahydrofurans, alkoxytetrahydrofurans, dialkoxytetrahydrofurans, 1,3-dioxolane, alkyl-1,3-dioxolanes, and 1,4-dioxolane. Specific examples of the chain ethers include 1,2-dimethoxyethane, 1,2-diethoxythane, diethyl ether, ethylene glycol dialkyl ethers, diethylene glycol dialkyl ethers, triethylene glycol dialkyl ethers, and tetraethylene glycol dialkyl ethers.

In one embodiment, web of base material 104 may have an adhesive tape layer (not shown) adhered to one or both surfaces of the anodically active material layer 508, or cathodically active material layer 512, respectively. The adhesive layer may then later be removed subsequent to ablation and cutting (described below) to remove unwanted material or debris.

Embodiments of the laser systems 120a-c are further described with reference to FIGS. 2-6. The web of base material 104 enters the laser system 120 in the web direction WD. In one embodiment, the web of base material 104 enters the laser system 120a in a first condition 400, having not yet been ablated or cut. Accordingly, the web of base material 104 in the first condition 400 should have substantially no defects or alterations from an initial state. The web of base material 104 passes over chuck 306, which includes a plurality of vacuum holes 406. The vacuum holes 406 are in fluid connection with vacuum 308, to draw a vacuum pressure on the web of base material 104 passing over the vacuum holes 406. The vacuum holes 406 may be staggered and/or be chamfered to allow the web of base material 104 to more easily pass thereover without snagging. The cross-sectional area of the holes must be small enough to prevent the web of base material 104 from being drawn therein, but large enough to allow proper airflow from the vacuum therethrough. The vacuum pressure facilitates maintaining the web of base material 104 in a substantially flat/planar state as it is conveyed across chuck 306. In some suitable embodiments, the laser system 120 is sensitive to focus, and in such embodiments it is critical to keep the web of base material 104 at a substantially constant distance from laser output 313, to ensure laser beam 302 is in focus when contacting the web of base material 104 during cutting or ablating processes. Accordingly, the vacuum pressure through vacuum holes 406 may be monitored and adjusted in real time, for example via user interface 116, to ensure that the web of base material 104 remains substantially flat across chuck 306 and does not lift or buckle while being processed. The cross-sectional shape of the vacuum holes may be circular, square, rectangular, oval or any other shape that allows the chuck 306 to function as described herein.

As seen in FIG. 4, the chuck 306 includes an opening 410 defined by an upstream edge 412 and the downstream edge 414. The illustrated chuck 306 includes a chamfer 416 on the downstream edge 414. In this embodiment, the chamfer 416 facilitates the web of base material 104 passing over downstream edge 414 without having the web of base material 104 catch or snag on the downstream edge 414. The angle α of the chamfer 416 may be between 1 degree and 90 degrees, such as 5 degrees, 10 degrees, 15 degrees, 20 degrees, 25 degrees, 30 degrees, 35 degrees, 40 degrees, 45 degrees, 50 degrees, 55 degrees, 60 degrees, 65 degrees, 70 degrees, 75 degrees, 80 degrees, 85 degrees or any other angle that allows chamfer 416 to function as describes herein. It the illustrated embodiment, for example, the angle α is approximately 25 degrees. It has been found that performance is improved if the angle α of the chamfer 416 is greater than the deflection of the web of base material 104 passing over the chamfer 416. Upper edge 418 of chamfer 416 may be radiused to provide a smooth transition from the chamfer 416 to the surface of the chuck 306.

In one suitable embodiment, the chuck 306 is formed from aluminum. However, the chuck 306 may be formed from aluminum alloy, composites, metals or metal alloys or any other suitable material that allows chuck 306 to function as described herein.

In one suitable embodiment, the web of base material 104 is first ablated by laser beam 302 (FIG. 3) to create the ablations 404 (FIG. 4) in the web of base material 104. In one embodiment, the web of base material 104 is anode material 502, and the ablations 404 remove the anodically active material layer 508 to expose anode current collector layer 506 (FIG. 5). In another embodiment, the web of base material 104 is cathode material 504, and the ablations 404 remove the cathodically active material layer 512 to expose cathode current conductor 510. In one embodiment, the ablations 404 are configured as electrode tabs 520 (adapted to electrically connect the cathode current collector and the anode current collector to the positive and negative terminals, respectively, of a secondary battery). When using the laser system 120a to make the ablations 404 in the web of base material 104, the power of the laser beam 302 is set to a level that is capable of substantially completely, or completely, removing the coating layer, but will not damage or cut through the current collector layer. In use, the laser beam 302 is controlled, for example via user interface 116, to create the ablations 404 while the web of base material 104 is in motion and being conveyed in down-web direction WD. The ablations 404 are created on each side of the web of base material 104, as best shown in FIG. 5. In one embodiment, after making the ablations 404, the laser system 120a forms fiducial features 402 (such as holes), as described further herein. In another embodiment, multiple lasers may be used to each ablate a portion of the web of base material 104 to each create one or more ablations 404 to increase the throughput of the production system 100.

With further reference to FIGS. 2, 3 and 4, in another stage of the production process, the web of base material 104 is conveyed in the down-web direction WD toward a cutting area 408 of the laser system 120a. The cutting area 408 includes the opening 410 of chuck 306. In one embodiment, the opening 410 is in fluid communication with the vacuum 308, to draw a vacuum pressure on the web of base material 104 passing over the opening 410. In one suitable embodiment, the opening 410 is wider in a cross-web direction XWD than the web of base material 104, such that an entire width of the web of base material 104 in the cross-web direction XWD is suspended over the opening 410. In one embodiment, there may be a second vacuum, configured to equalize the pressure on the web of base material 104 opposite the chuck 306. In this embodiment, the equalization in pressure facilitates maintaining the web of base material 104 in a substantially flat/planar state and at a consistent height when passing over the opening 410, which facilitates maintaining focus of laser beam 302 on the web of base material 104. In one embodiment, a carrier web may be used to support the web of base material 104. In some embodiments, the carrier web is removably attached to the web of base material using a low tack adhesive or electrostatic pinning. In such embodiments, the attachment has sufficient adhesion to remain attached to the web of base material during processing, but is removable without causing damage to the web of base material. In one embodiment, the carrier web is a material that does not absorb the laser wavelength being used during processing of the web of base material 104, such that the carrier web will not be cut through, vaporized or ablated, and accordingly may be reused on other webs of base material.

Figure 6:
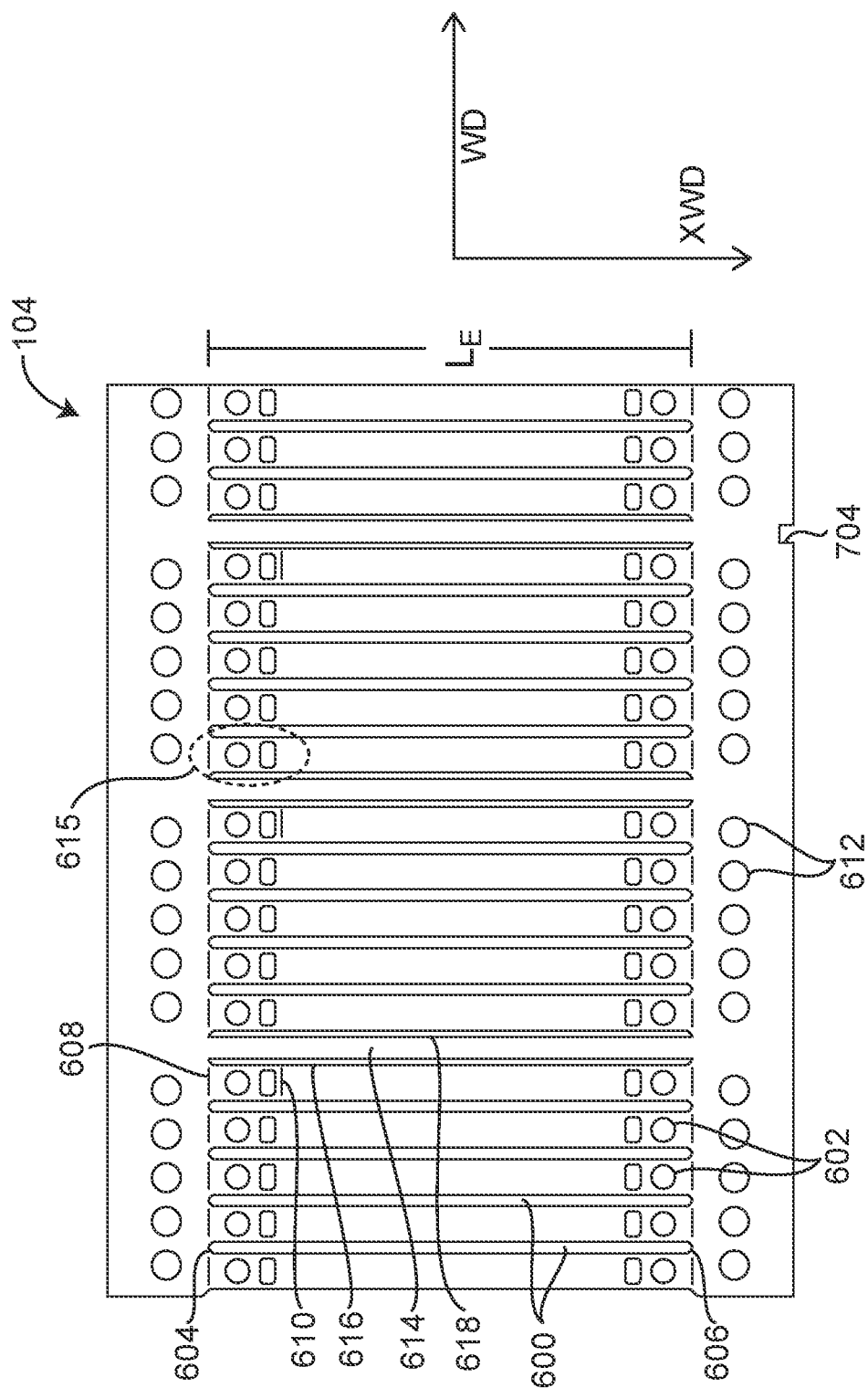
FIG. 6 is a top view of an exemplary web of base material having electrode patterns formed thereon.

The laser system 120 a is configured to cut one or more patterns (such as individual electrode patterns 800 (FIG. 8), which may also be referred to as an electrode tear pattern), each being a member of a population of electrode structures, in the web of base material 104 while the web of base material is over the opening 410. With reference to FIG. 6, the patterns may include one or more lengthwise edge cuts 600 that define lengthwise edges of an electrode in the cross-web direction XWD. The lengthwise edge cuts 600 are cut using laser beam 302 cutting the web of base material 104 in the cross-web direction XWD while the web of base material is conveyed in the down-web direction WD. The cross-web direction XWD is orthogonal to the down-web direction WD. It should be noted that, in one embodiment, in order to create lengthwise edge cuts 600 that are substantially perpendicular to the down-web direction WD, the laser beam 302 must be controlled to travel at an angle with respect to the down-web direction WD, to account for the movement of the web of base material 104 in the down-web direction WD. For example, as the web of base material 104 moves in the down-web direction WD, the path of the laser beam 302 is projected onto the web of base material 104 at an initial cut location 604, and then is synchronized with the motion of the web of base material 104 in the web direction. Accordingly, the path of laser beam 302 is controlled to travel in both the cross-web direction XWD and the down-web direction WD until reaching end cut location 606 to create the lengthwise edge cuts 600. In this embodiment, a compensation factor is applied to the path of the laser beam 302 to allow cuts to be made in the cross-web direction XWD while the web of base material is continuously traveling in the web direction WD. It should be appreciated that the angle at which the laser beam 302 travels varies based upon the speed of the web of base material 104 in the down-web direction WD. In another embodiment, the web of base material 104 is temporarily stopped during the laser processing operation, and as such, the path of the laser beam 302 does not need to account for the motion of the travel of the web of base material in the down-web direction WD. Such embodiment, may be referred to as a step process, or step and repeat process. During laser processing, one or more of the laser systems 120*a-c* use a repeating alignment feature, such as fiducial features 602 to adjust/align the laser beam 302 during the laser processing operations, for example to compensate for possible variations in positioning of the web of base material 104.

It should be appreciated that, although the laser processing operations as described herein such that the lengthwise edge cuts 600 are defined in the cross-web direction XWD, such that repeating patterns of electrode patterns are aligned in the cross-web direction XWD, in other embodiments, the laser processing operations described herein can be controlled such that the lengthwise edge cuts 600, and all associated cuts, perforations and ablation operations are oriented respectively perpendicular. For example, lengthwise edge cuts 600 can be aligned in the down-web direction WD, such that populations of electrode patterns 800 are aligned in the down-web direction WD, rather than the cross-web direction XWD.

In one embodiment, laser system 120*a* cuts a tie bar 614 between one or more of the electrode patterns. The tie bar 614 may be used to delineate between groups of the electrode patterns. For example, in the embodiment shown in FIG. 6, a tie bar 614 is cut between groups of five individual electrode patterns. However, in other embodiments the tie bar 614 may be included after any number of individual electrode patterns, or not present at all. The tie bar is defined by an upstream and downstream tie bar edge cut 616, 618 respectively. In some embodiments, the tie bar 614 is sized to provide additional structural stiffness to the web during processing.

In addition, in one suitable embodiment, the laser system 120*a* cuts one or more of the repeating alignment features such as a plurality of the fiducial features 602 in the web of base material 104. In one embodiment, the fiducial features 602 are fiducial through-holes. The fiducial features 602 are cut at a known location on the web of base material 104. The fiducial features 602 are shown as circular in FIG. 6, but may be rectangular as shown in FIG. 5, or any size or shape that allows the production system 100 to function as described herein. The fiducial features 602 are tracked by one or more of visual inspection systems 310, 312 which measures the location and speed of travel. The measurement of the fiducial features 602 is then used to accurately allow for front to back alignment of the patterns on the web of base material 104 in both the down-web direction WD and cross-web direction XWD. The laser system 120*a* may also cut a plurality of tractor holes 612 that may be used for alignment of the web of base material 104, or may be used as holes that engage with a gear wheel 1210 (FIG. 12) for, conveying, positioning and tension control of the web of base material 104. Tractor holes 612 may be circular, square or any other shape that allows the production system 100 to function as described herein. In another suitable embodiments, the web of base material 104 has the plurality of tractor holes 612 and/or fiducial features 602 pre-cut therein prior to being unwound and conveyed through production system 100. In one embodiment, there is a one-to-one ratio of fiducial features 602 to electrode patterns 800. In other embodiments, there may be two or more fiducial features per each electrode pattern 800.

Figure 7:
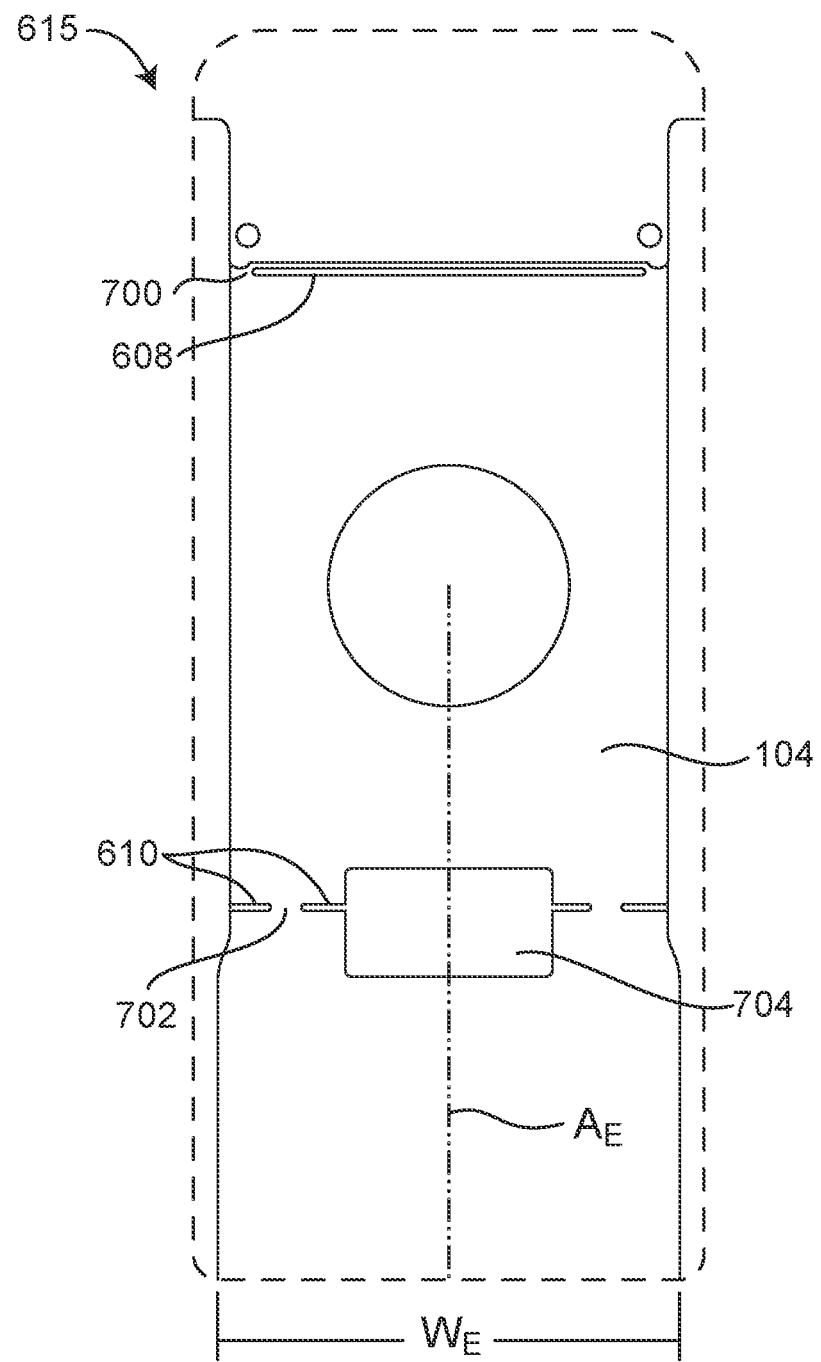
FIG. 7 is an enlarged top view of a portion of a web of base material having an exemplary electrode pattern formed thereon.

With reference to FIGS. 2 and 6, in one suitable embodiment, the laser system 120*a* cuts a first perforation 608 and a second perforation 610 in the web of base material 104 as part of the electrode pattern. The first perforation 608 may also be referred to as the "outer perforation" because it lies at the outside of the electrode pattern in the cross-web direction XWD, and the second perforation 610 may also be referred to as the "inner perforation" because it lies inboard of the outer perforation in the cross-web direction XWD. The perforations 608, 610 are best shown in FIG. 7, which is an enlarged view of the portion 615 (FIG. 6) of web of base material 104. First perforation 608 is formed by laser cutting using laser beam 302, while the web of base material is positioned over the opening 410 in chuck 306. The first perforation 608 is formed as a linear slit (e.g., through-cut) in a direction aligned with the down-web direction WD. Importantly, the first perforation 608 does not extend across the entirety of the width of the electrode $W_e$. Instead, outer tear strips 700 remain on both the upstream and downstream edges of the perforation 608, to ensure the electrode pattern remains connected to the web of base material 104.

Similarly, with further reference to FIGS. 6 and 7, the second perforations 610 are formed inboard (in the cross-web direction XWD) from the first perforations 608. In one suitable embodiment, the second perforations 610 are formed as a line of slits in the down-web direction WD separated by inner tear strips 702. In the embodiment shown, the second perforations 610 intersect through holes 704. In the illustrated embodiment, the inner tear strips 702 are at least two times the length of outer tear strips 700, such that the rupture force required to separate the outer tear strips is approximately half of the rupture force required to separate inner tear strips 702 from the web of base material 104. In other embodiments, the ratio of the rupture strength of the first and second tear strips may vary, but is preferred that the outer tear strips 700 have a rupture strength lower than the inner tear strips 702, such that upon application of a tensile, or shear, force applied to the edges of the web of base material 104, that the outer tear strips 700 will rupture before inner tear strips 702.

With reference to FIGS. 3, 4 and 6, by performing the laser cuts for the lengthwise edge cuts 600, the fiducial features 602, and the first and second perforations 608, 610 over the opening 410 of the chuck 306, it allows debris to fall through the opening 410 and also allows the vacuum 308 to collect debris formed during the laser cutting process.

In one suitable embodiment, the laser system 120*a* is configured as a first ablation station. In this embodiment, the laser system 120*a* forms the ablations 404, as described above on a first surface of the web of base material 104. Upon exiting laser system 120*a*, the web of base material passes over idler 108*d* which flips the web of base material 104 in a manner such that a second surface (opposing the first surface) of the web of base material is positioned for processing by the laser system 120*b*, which is configured as a second ablation station in this embodiment. In this embodiment, the laser system 120*b* is configured to use the fiducial features 602 to ensure alignment in the down-web direction WD and cross-web direction XWD. Accordingly, the laser system 120*b* performs a second ablation process on the opposing surface of the web of base material 104, such that ablations 404 on each surface of the web of base material 104 are aligned in the down-web direction WD and the cross-web direction XWD. In one embodiment, the ablations 404 are configured as current collector tabs of the electrodes.

In one embodiment, the laser system 120c seen in FIG. 2 is configured as a laser cutting station. In this embodiment, the laser system 120c performs the laser cuts such as lengthwise edge cuts 600, and the first and second perforations 608 and 610.

In one suitable embodiment, one or more of the laser devices 300 of the laser systems 120a-c is 20 watt fiber laser. In embodiments, suitable laser devices 300 of the laser systems 120a-c have a laser power within the range of from 10 watts to 5,000 watts, such as from 10 W to 100 W, 100 W to 250 W, 250 W to 1 kW, 1 kW to 2.5 kW, 2.5 kW to 5 kW. Suitable laser devices 300 will include a laser beam having a wavelength of from 150 nm to 10.6 µm, for example such as from 150 nm to 375 nm, 375 nm to 750 nm, 750 nm to 1,500 nm, and 1,500 nm to 10.6 µm. In embodiments, the laser devices 300 will be capable of laser pulse width types of one or more of continuous wave (cw), microsecond (µs), nanosecond (ns), picosecond (ps) and femtosecond (fs) pulse types. Any of these types of lasers may be used alone or in combination as laser devices 300 of laser systems 120a-c. In other suitable embodiments, the laser device 300 is any other laser capable of allowing laser systems 120a-c to perform as described herein.

In some embodiments, the web of base material 104 may include fiducial features 602 that have been machine punched, or laser cut, prior to being loaded into production system 100. In another suitable embodiment, the fiducial features 602 may be mechanically machine punched subsequently to forming ablations 404 on a first surface of the web of base material. In other suitable embodiments, the production system 100 may include one or more additional mechanical punches which may be used to form one or more of the lengthwise edge cuts 600, and/or the first and second perforation 608, 610.

In one embodiment, one or more of the rollers of the conveyor system may not be perfectly round, such that the roller has an eccentricity. In such case, especially if the eccentric roller is a nip roller, the web of base material may be conveyed in a manner such that a position of the web of base material 104 advances in a manner differently depending upon which portion of the eccentric roller is in contact with the web. For example, if the eccentric has a portion of the radius that exceeds the expected radius of the roller, the web may advance further in the down-web direction WD than expected, when the larger radius portion of the roller is pushing/pulling the web. Likewise, if the eccentric roller has a reduced radius portion, the web may advance a reduced distance in the down-web direction WD than expected. Accordingly, in one embodiment, the eccentric roller(s) may be mapped to determine the radius versus radial position. The laser system 120a-c may then be controlled to adjust the laser beam 302 position to account for the eccentricity based upon the mapping of the roller(s). In one embodiment, the mapping of the rollers may be stored in the memory of the user interface 116.

Upon having exited one or more of laser systems 120a-c, the web of base material may be conveyed to one or more cleaning stations such as brushing station 124 and air knife 126. In one suitable embodiment, the brushing station 124 includes a brush 1000 (FIGS. 10 and 11) that travels in the cross-web direction XWD. The brush 1000 includes a set of bristles 1002 that are held by bristle holder 1004. The brush 1000 is configured to allow bristles 1002 to delicately contact a surface of the web of base material 104 and remove or dislodge any debris therefrom. The contact pressure of the bristles 1002 on the surface of the web of base material 104 must be low enough that it does not break, rupture or otherwise cause defects in the electrode patterns, and maintains the electrode patterns as attached to the web of base material 104. In one embodiment, the normal force between the bristles 1002 and the surface of the web of base material 104 is from 0 to 2 lbs, such as 0.1 lbs, 0.2 lbs, 0.3 lbs, 0.4 lbs, 0.5 lbs, 0.6 lbs, 0.7 lbs, 0.8 lbs, 0.9 lbs, 1.0 lbs, 1.1 lbs, 1.2 lbs, 1.3 lbs, 1.4 lbs, 1.5 lbs, 1.6 lbs, 1.7 lbs, 1.8 lbs, 1.9 lbs or 2.0 lbs. In other embodiments, the normal force may be greater than 2.0 lbs.

In one embodiment, the length of the bristles 1002 is ¾ inch (19.05 mm). In one embodiment, the bristles 1002 are inserted or clamped within bristle holder 1004 by approximately ⅛ inch. The diameter of the bristles may be from 0.003 inch (0.076 mm) to 0.010 inch (0.254 mm), such as 0.003 inch (0.076), 0.004 inch (0.101 mm), 0.005 inch (0.127 mm), 0.006 inch (0.152 mm), 0.007 inch (0.177 mm), 0.008 inch (0.203 mm), 0.009 inch (0.228 mm) and 0.010 inch (0.254 mm). In one suitable embodiment, the bristles 1002 are nylon bristles. However, in other embodiments the bristles 1002 may be any other natural or synthetic material that allows the brush 1000 to function as described herein.

Figure 10:
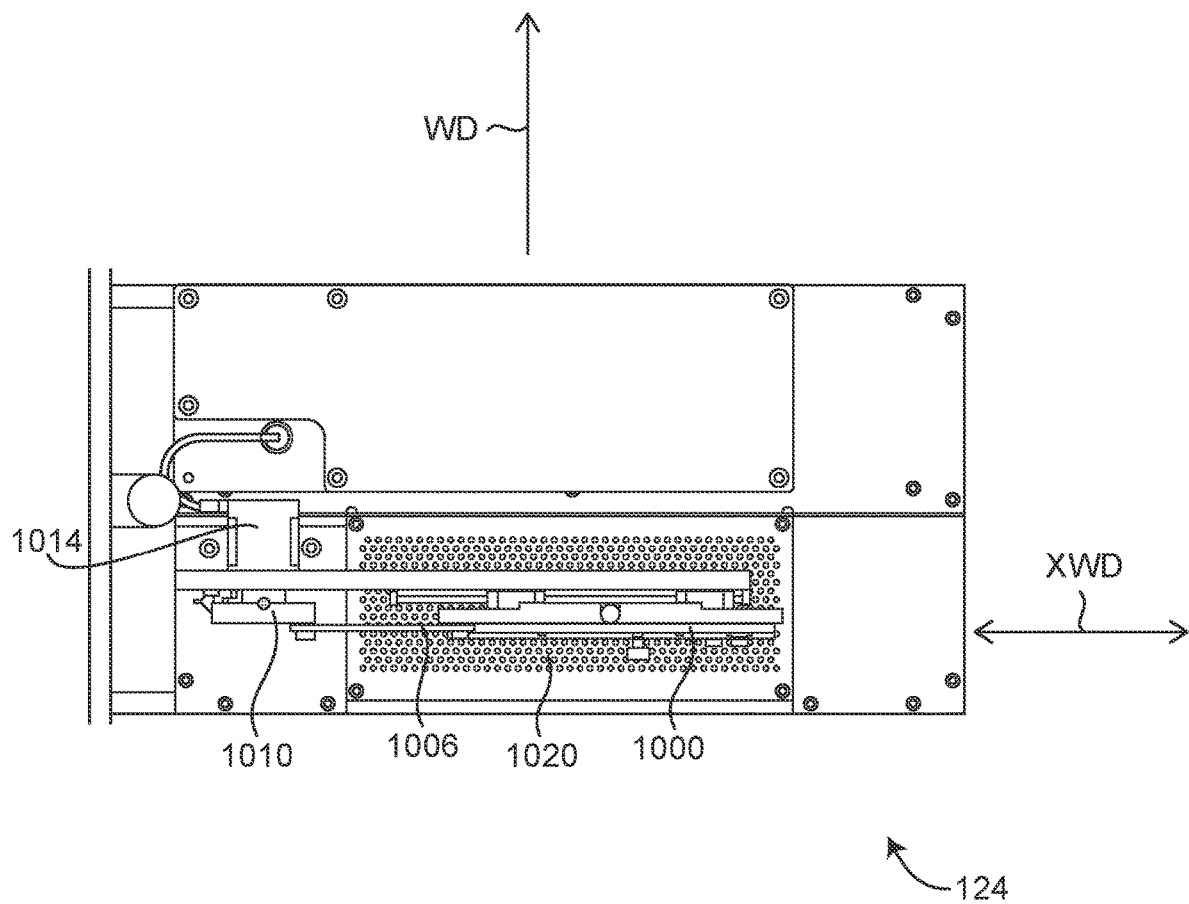
FIG. 10 is a top view of one suitable embodiment of a brushing station of the current disclosure.
Figure 11:
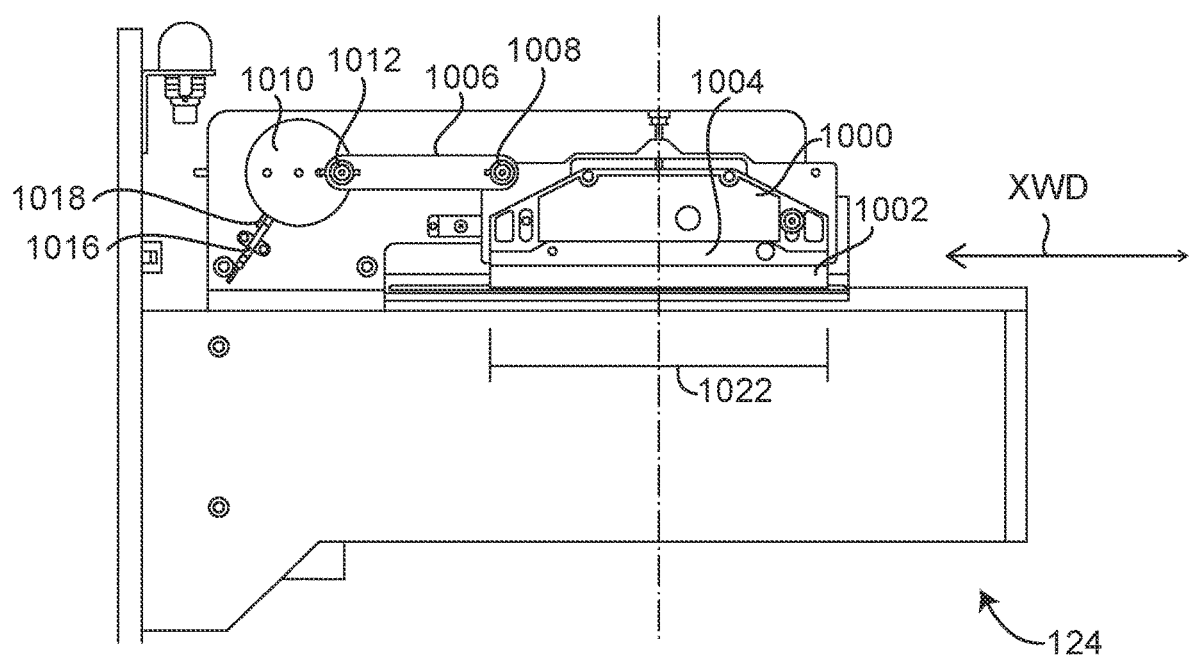
FIG. 11 is a side view of the exemplary brushing station shown in FIG. 10.

With further reference to FIGS. 10 and 11, in one suitable embodiment, to effect movement of the brush 1000 in the cross-web direction XWD, the brush 1000 is connected to crank arm 1006 via a rotatable coupling 1008, such as a bearing, bushing or the like. The crank arm 1006 is rotatably coupled to drive wheel 1010 via a second rotatable coupling 1012. The rotatable coupling is coupled to a position off center of the drive wheel 1010, such that the crank arm 1006 oscillates the brush 1000 in a back-and-forth motion in the cross-web direction XWD. The drive wheel 1010 is coupled to a motor 1014 to effect rotation of the drive wheel. A position sensor 1016 senses the position of a brush position marker 1018, which is coupled to the drive wheel 1010. Accordingly, the position sensor 1016 may measure the phase (e.g., angular position) and rotations per time of the drive wheel 1010. In one embodiment, the drive wheel 1010 is controlled to be within a range of 0 to 300 rotations per minute ("rpm") (e.g., 0 to 300 strokes per minute of brush 1000), such as 0 rpm, 25 rpm, 50 rpm, 75 rpm, 100 rpm, 125 rpm, 150 rpm, 175 rpm, 200 rpm, 225 rpm, 250 rpm, 275 rpm and 300 rpm. In other embodiments, the rpm of drive wheel 1010 may be greater than 300 rpm. It is noted that a constant rpm of drive wheel 1010 will cause a sinusoidal speed variation of brush 1000, due to the crank arm 1006 connection to drive wheel 1010.

In one suitable embodiment, a second brush (not shown) is located in a position to contact the opposing surface of the web of base material 104. In this embodiment, the second brush, which may be substantially the same as the first brush 1000 is configured to travel in a direction opposite to the first brush, and suitably 180 degrees out of phase with the first brush. The phase of the first brush and the second brush may be determined via the position sensor 1016, and an equivalent position sensor of the second brush. In this embodiment, the contact pressure of the bristles of the first brush and the second brush, together, must be low enough that it does not break, rupture or otherwise cause defects in the electrode patterns, and maintains the electrode patterns as attached to the web of base material 104.

In one embodiment, the brush 1000 has a bristle width 1022 that is wider in the cross-web direction XWD than the width of web of base material 104 in the cross-web direction XWD. For example, in one embodiment, the bristle width 1022 is of sufficient width that as the brush 1000 oscillates in the cross-web direction XWD, the bristles 1002 remain in contact with the surface of the web of base material 104 throughout the entire range of motion of the brush 1000. The rate of oscillation of the brush 1000 and the pressure exerted by the bristles 1002 against the surface of the web of base material 104 may be controlled by the user using the user interface 116.

The brushing station 124 may be equipped with a vacuum system configured to create a vacuum through brush station orifices 1020 to evacuate debris that has been brushed from one or more surfaces of the web of base material 104. In this embodiment, the debris may be brushed from the web of base material 104 and fall, or be suctioned through the brush station orifices 1020. The brush station orifices 1020 are illustrated as being round, but may be any shape that allows brushing station 124 to function as described herein. Further, the upper edges of the brush station orifices 1020 may be chamfered, and/or staggered in position to allow the web of base material 104 to more easily pass over them without having an edge of the web of base material get snagged thereon. In one embodiment, the vacuum level may be controlled to be from 0 to 140 inches H2O, such as 0 in H2O, 10 in H2O, 20 in H2O, 30 in H2O, 40 in H2O, 50 in H2O, 60 in H2O, 70 in H2O, 80 in H2O, 90 in H2O, 100 in H2O, 110 in H2O, 120 in H2O, 130 in H2O, and 140 in H2O. In some embodiments, the flow rate of the vacuum is controlled to be from about 0 to 425 cubic feet per minute ("cfm"), such as 0 cfm, 25 cfm, 50 cfm, 75 cfm, 100 cfm, 125 cfm, 150 cfm, 175 cfm, 200 cfm, 225 cfm, 250 cfm, 275 cfm, 300 cfm, 325 cfm, 350 cfm, 375 cfm, 400 cfm and 425 cfm. In other embodiments, the vacuum level and flow rate may be greater than 140 in H2O and 425 cfm, respectively. The vacuum level and flow rate are controlled to be within a range such that debris is pulled away from the web of base material 104 without creating unnecessary friction between the web of base material 104 and the conveying system components. Such vacuum levels and flow rates are, in some embodiments, applicable to all other components of the system using a vacuum.

Figure 8:
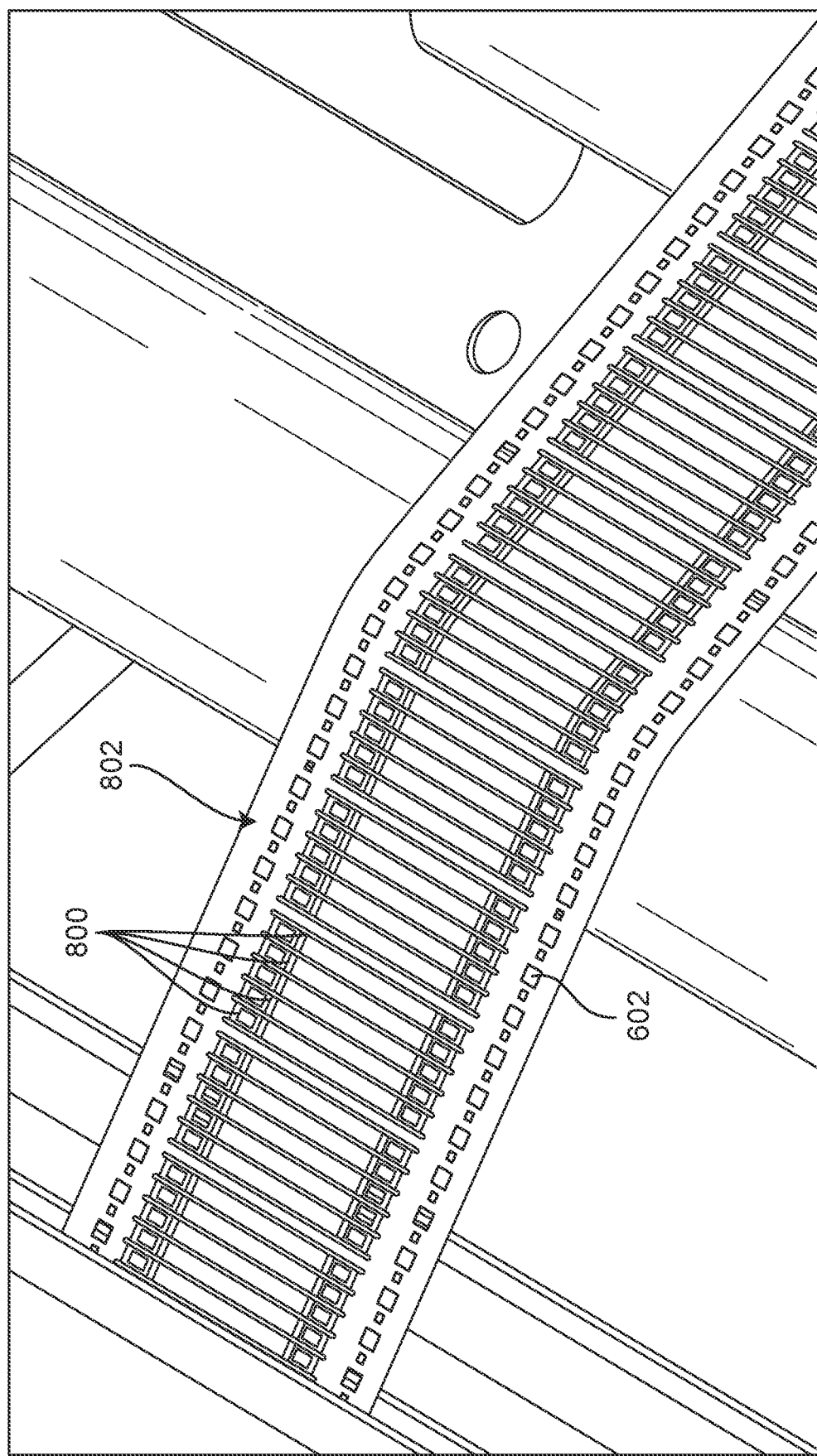
FIG. 8 is an isometric view of base material formed into a web of electrode material including electrode patterns after having been processed through the electrode manufacturing system of the current disclosure.

In another suitable embodiment, one or more of the first brush and the second brush may include a load sensor that measures or monitors the pressure the brush is exerting upon the web of electrode material 802. As shown in FIG. 8, the web of electrode material 802 refers to the web after having been processed as described herein, such that a population of electrode patterns 800 have been formed therein. In this embodiment, the first brush and the second brush may be controlled, via user interface 116, to maintain a uniform brushing pressure on the web of electrode material 802 based upon variations in brush bristle wear or electrode thickness or surface roughness.

In another suitable embodiment, one or more of the first brush and the second brush are configured to move at least partially in the down-web direction WD at a rate of speed equivalent to the rate of speed of the web of electrode material 802, thus maintaining a substantially zero speed differential between the brush and the web of electrode material 802 in the down-web direction WD.

In yet another suitable embodiment, the brushing station 124 may be equipped with a position sensor that is a phase measurement sensor 1016 to determine the phase of the first brush and the second brush. In one such embodiment, the phase sensor may measure the location of a home sensor flag 1018 of the first brush and the second brush. In this embodiment, the phase measurement sensor 1016 determines whether the first and second brushes are within a range of predetermined phase difference, such as 180 degrees out of phase, 90 degrees out of phase or zero degrees out of phase or any other suitable phase difference that allows the production system 100 to function as described herein. As used herein, the "phase" of a brush refers to an angular position of a brush, such that the bristles of two separate brushes would be aligned when "in phase."

In still another embodiment, an ultrasonic transducer (not shown) may be configured to impart ultrasonic vibrations to one or more of the first and second brushes to facilitate debris removal from the web of electrode material 802.

With further reference to FIG. 2, in one suitable embodiment, the web of base material 104 is conveyed through an air knife 126. As used herein, the term air knife refers to a device that uses high pressure air that is blown at the web of base material 104. The high pressure air contacts the surface of the web of base material 104 and removes debris therefrom. The air knife 126 is controlled to supply air at a pressure/velocity such that it does not break, rupture or otherwise cause defects in the electrode patterns, and maintains the electrode patterns as attached to the web of base material 104. In another embodiment, a second air knife 126 is configured to blow air at an opposing surface of the web of base material 104 and remove debris therefrom. In this embodiment, the second air knife may blow air in the same direction as the first air knife, or in a direction opposite the first air knife, or any other direction that allows the air knife 126 to function as described herein. In one embodiment, the air knife 126 station is equipped with a vacuum that facilitates removal of the debris that has been removed by the air knife 126.

With reference to FIG. 8, after having been processed by the laser systems 120*a-c* and cleaned by the brushing station 124 and the air knife 126, the web of base material 104 exits the cleaning stations as a web containing a population of electrode patterns 800 within web of base material 104, collectively a web of electrode material 802.

Figure 12:
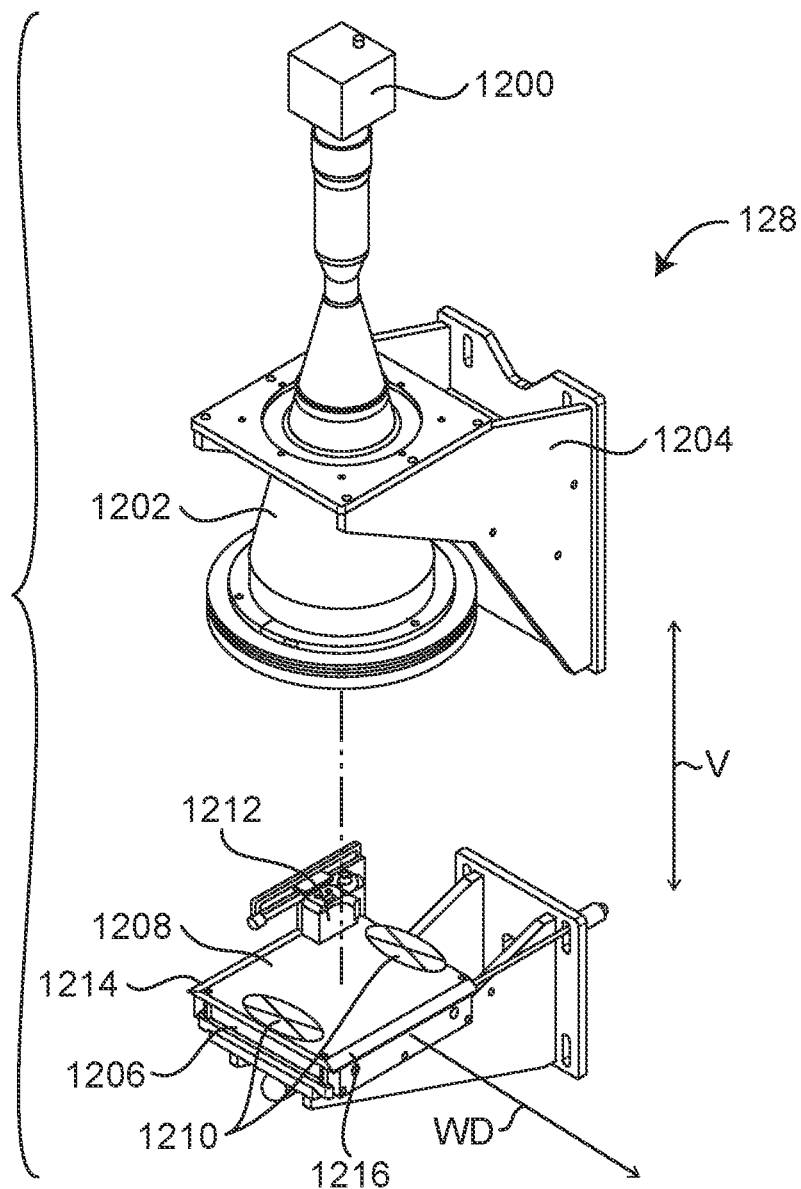
FIG. 12 is an isometric view of one suitable embodiment of an inspection station according to the current disclosure.

With further reference to FIGS. 2, 8 and 12, in one embodiment, web of electrode material 802 passes through inspection device 128. The inspection device 128 is a device configured to analyze the electrode material 802 and identify defects thereon. For example, in one embodiment, the inspection device 128 is a visual inspection device including a camera 1200, which may be a digital camera such as a digital 3-D camera configured to analyze the electrode patterns on the web of electrode material 802. In one embodiment, the camera 1200 is a digital light camera including a CMOS having a 48 megapixel sensitivity. The camera 1200 is optically coupled to a lens 1202, which may be a wide field of view lens. In one embodiment, the lens 1202 is a telecentric lens. The lens 1202 is held in place by a lens mount 1204, which in one embodiment may be adjustable in a vertical direction V to control a focus of the lens 1202. The lens 1202 is aimed to focus on the web of electrodes 802 as it passes over inspection plate 1206. In one embodiment, the inspection plate 1206 includes a transparent or semi-transparent top 1208 that allows light from a light source (not shown) housed within the inspection plate 1206 to shine therethrough to generate a backlight. In one suitable embodiment, the intensity and/or color of the light may be controlled via the user interface 116. In one embodiment, one or more additional lighting sources, such as an upstream light and a downstream light illuminate the web of electrode material 802 while within the inspection device 128. In some embodiments, each of the lighting sources are independently controllable for intensity and color. In one embodiment, the backlight includes a diffuse low angle ring light. The web of electrode material 802 may be secured and conveyed over the inspection plate 1206 by gear wheels 1210 that are configured to engage the tractor holes 612 of the web of electrode material 802. In doing so, the web of electrode material 802 is held taught against inspection plate 1206, to substantially eliminate curling of the web of electrode material 802. Each of the inspection plate leading edge 1214 and the inspection plate trailing edge 1216 may be chamfered (e.g., at angles similar to angle α) to allow the web of electrode material to pass smoothly thereover without snagging.

With continued reference to FIG. 12, in one embodiment, the inspection device 128 includes a trigger sensor 1212 that detects a predetermined feature of the web of electrode material 802, such as a fiducial feature 602, lengthwise edge cut 600 or any other feature that allows inspection device 128 to function as described herein. Upon detection of the predetermined feature, the trigger sensor 1212 sends a signal directly to camera 1200 or indirectly through the user interface 116, to trigger the camera 1200 to image an electrode of the web of electrode material 802. Upon imaging the electrode, camera 1200 may be configured to detect one or more metrics such as a height of the electrode, a size or shape of a feature that has been cut by one of the laser devices 120a-c (FIG. 2), the pitch (distance) between electrodes or any other feature that allows the inspection device to function as described herein. For example, in one suitable embodiment, the inspection device 128 detect whether the ablations 404 (FIG. 4), lengthwise edge cuts 600, fiducial features 602, tractor holes 612, pitch between individual electrode structures, offset in the cross-web and web direction of tractor holes 612, and first and second perforations 608, 610 (FIG. 6) are within a predefined tolerance of size, shape, placement and orientation. In one suitable embodiment, a user may control which feature to inspect using the user interface 116.

With In one embodiment, the web of electrode material 802 is held substantially flat during analysis by the inspection device 128, such as by use of application of balanced vacuum or fluid (e.g., air) flow over the opposing sides of the web of electrode material 802. In this embodiment, by having the web of electrode material 802 be flat during inspection, more precise imaging and analysis may be conducted on the web of electrode material 802, and thus higher quality error and defect detection is enabled. In one embodiment, the inspection system may be configured to provide in-line metrology of the web of base material 104 and/or web of electrode material 802. For example, the inspection device 128 may be configured to measure metrics such as web thickness, sizes and shapes of the electrode patterns, and the like while the web is being conveyed in the down-web direction WD. These metrics may be transmitted to the user interface 116 for viewing or memory storage, or otherwise used to adjust production parameters of the production system 100.

In one embodiment, in the event the inspection system determines a defect is present on the web of electrode material 802 (FIG. 8), the marking device 130 (FIG. 2) will mark the web of electrode material to identify such defect. The marking device 130 may be a laser etching device, printer, stamper or any other marking device capable of placing a mark indicating a defect is present on a web of electrode material 802. In another suitable embodiment, the marking device 130 is controllable to mark the web of electrode material 802 with one or more of an identification number (ID) and known good electrodes (KGEs), allowing for the possibility to further mark the web of electrode material 802 with a grade, such as grade A, grade B, grade C or the like, indicating a quality measurement (such as number or type of defects) of a particular electrode within the web of electrode material 802.

Figure 8A:
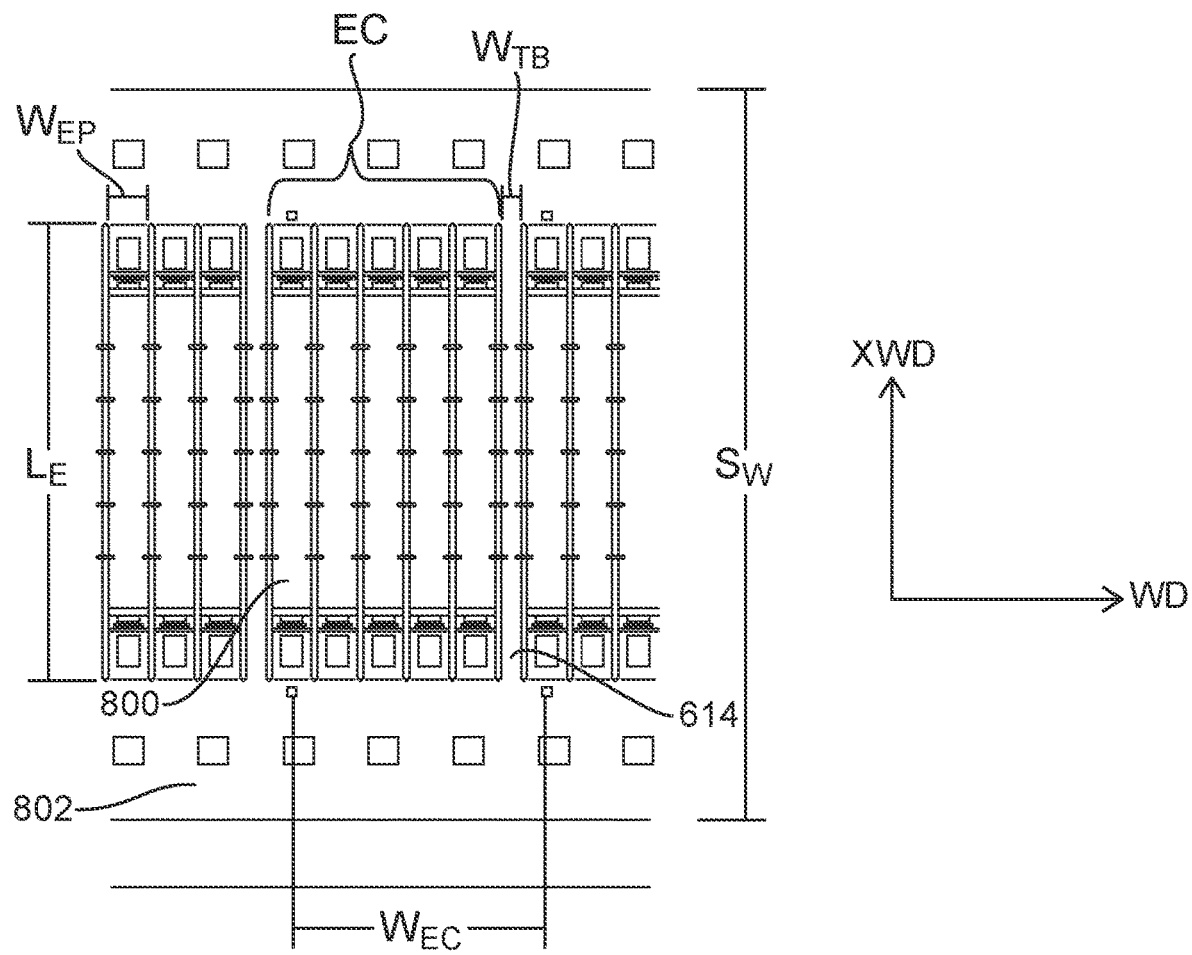
FIG. 8A is a top view of a portion of the web of electrode material of FIG. 8.

Upon the processing of the web of base material 104 into the web of electrode material 802, the web of electrode material 802 has a web strength reduction in the down-web direction WD of from 25 percent to 90 percent as compared to the unprocessed web of base material 104. With reference to FIG. 8A, a portion of the web of electrode material 802 is shown. In this embodiment, the web of electrode material 802 includes electrode clusters EC comprising five electrode patterns 800 separated by a tie bar 614. However, it should be understood that in other embodiments, the electrode cluster EC may include any number of electrode patters including one or more, such as for example, 2, 3, 4, 5, 6, 7, 8, 9, 10, 11, 12, 13, 14, 15, 16, 17, 18, 19, 20 or any other number of electrode patterns 800 between tie bars 614. A distance $L_{EC}$ is defined as a distance in the down-web direction WD between a centerpoint of a first electrode pattern of an electrode cluster EC to a centerpoint of a first electrode in a second electrode cluster EC.

In an exemplary embodiment, the cross-web span of the web $S_W$ is 3X mm in the cross-web direction and a width $W_{EP}$ of each electrode pattern 800 in the down-web direction WD is X mm. In this embodiment, the reduction in web strength in the down-web direction WD is 33 percent as compared to the unprocessed web of base material 104. The reduction in web strength is calculated as the width $W_{EP}$ divided by the cross-web span $S_W$ (i.e., X mm/3X mm=0.33).

In another exemplary embodiment, the cross-web span of the web $S_W$ is 1.5X mm in the cross-web direction and a width $W_{EP}$ of each electrode pattern 800 in the down-web direction WD is 1.3X mm. In this embodiment, the reduction in web strength in the down-web direction WD is 87 percent as compared to the unprocessed web of base material 104. The reduction in web strength is calculated as $W_{EP}/S_w$ (i.e., 1.3X/1.5X=0.87). Web strength in the down-web direction WD is verified and measured as a breaking strength of the web of electrode material 802 using an electromechanical or hydraulic material tester with at least force feedback, and may include displacement feedback, such as an Instron brand testing machine.

In another exemplary embodiment, there is a strength reduction in the cross-web direction XWD of the web of electrode material 802 as compared to the web of base material 104. In a first exemplary embodiment, the electrode cluster width $W_{EC}$ is 6X mm in the down-web direction WD, the width $W_{TB}$ of the tie bar 614 is X mm in the down-web direction WD and the width $W_{EP}$ of the electrode pattern is X mm in the down-web direction WD and the length $L_E$ of the electrode pattern is 1.7X mm in the cross-web direction XWD. In this embodiment, the reduction in strength of the web of electrode material 802 in the cross-web direction XWD is about 77 percent as compared to the unprocessed web of base material 104. In another exemplary embodiment, the electrode cluster length $L_{EC}$ is 10X mm, the width $W_{TB}$ of the tie bar 614 is 0X mm (i.e., no tie bar) and the width $W_{EP}$ of the electrode pattern is 2X mm and the length $L_E$ of the electrode pattern is 1.7X mm. In this embodiment, the reduction in strength of the web of electrode material 802 in the cross-web direction XWD is about 92 percent as compared to the unprocessed web of base material 104. Web strength in the cross-web direction XWD is verified and measured as a breaking strength of the web of electrode material 802 using an electromechanical or hydraulic material tester with at least force feedback, and may include displacement feedback, such as an Instron brand testing machine.

Figure 9:
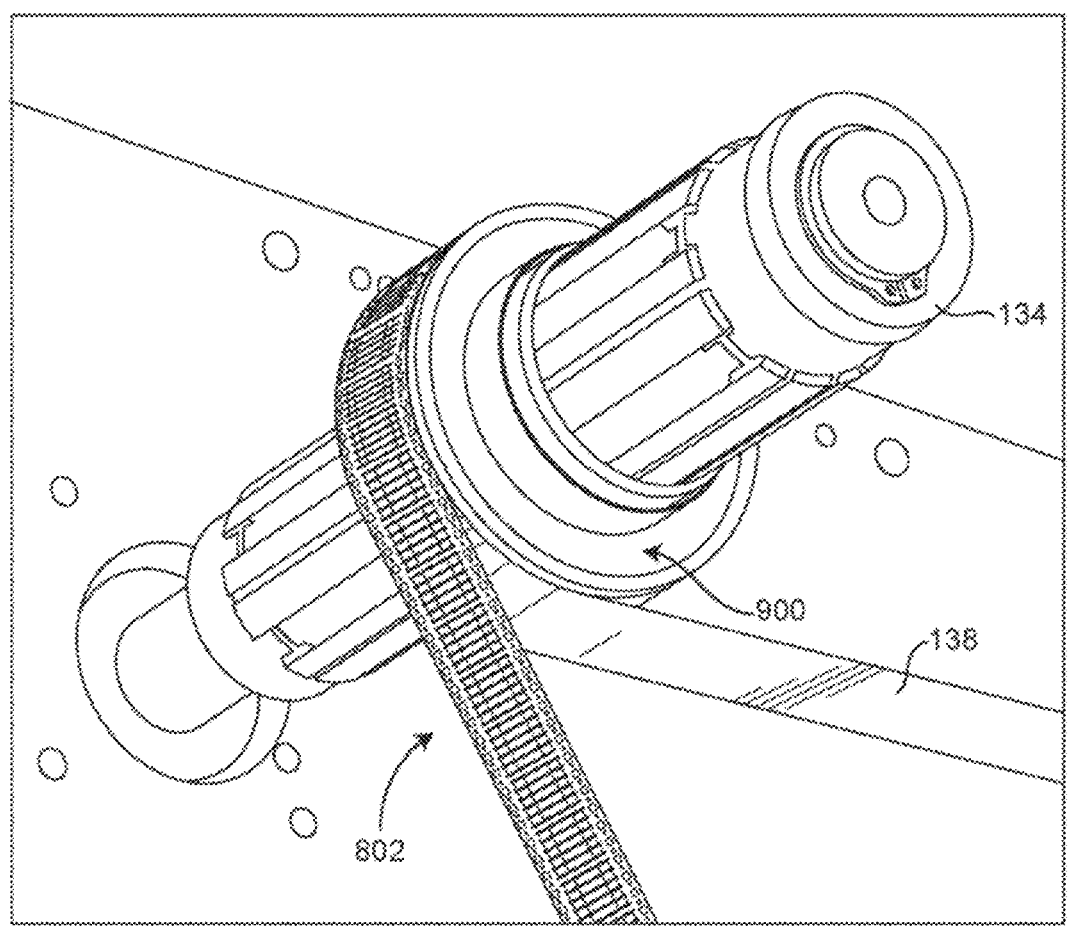
FIG. 9 is an isometric view of one suitable embodiment of a rewind roller of the electrode manufacturing system of the current disclosure.

With further reference to FIG. 9, the web of electrode material 802 is then conveyed to the rewind roller 134, where it is wound together with web of interleaf material 138 to create a spool 900 having alternating layers of web of electrode material 802 and web of interleaf material 138.

In one suitable embodiment, the user interface 116 may include a processor and memory configured to store and execute instructions causing the production system 100 to function as described herein. The user interface 116 may further include a display device, such as a LCD or LED display and a set of controls, or virtual controls, that allow a user to control and adjust parameters of the production system 100, as well as view metrics such as web conveyance speed, tension, number of defects, and any other parameters that allow production system 100 to function as described herein.

In use, with reference to FIG. 2, the base unwind roller 102 of production system 100 is loaded with a web of base material 104. The web of base material 104 is passed across an edge guide 106, to facilitate unwinding of the web of base material 104. In this embodiment, the web of base material 104 is then passed around the idler 108a and into the splicing station 110. The idler 108a is used to facilitate maintaining proper positioning and tension of the web of base material 104, as well as to change the direction of the web of base material 104. The idler 108a receives the web of base material 104 in the vertical direction, and is partially wrapped around the idler 108a such that the web of base material 104 leaves the idler 108a in an output direction substantially ninety degrees from the input direction. However, it should be appreciated that the input and output directions may vary without departing from the scope of this disclosure. In some embodiments, the production system 100 may use multiple idlers 108a-108x to change the direction of the web of base material one or more times as it is conveyed through the production system 100. In this embodiment, the user unwinds the base material 104 through the idlers 108a-108x, for example as shown in FIG. 2.

In one embodiment, the splicing station 110 is used to splice two separate webs together. In this embodiment, a first web of base material 104 is unwound, such that a trailing edge (not shown) of the web of base material 104 is stopped within the splicing station 110, and a leading edge (not shown) of a second web of base material 104 is unwound into the splicing station 110 such that the trailing edge of the first web and the leading edge of the second web are adjacent one another. The user then applies an adhesive, such as an adhesive tape, to join the leading edge of the second web to the trailing edge of the first web to form a seam between the two webs and create a continuous web of base material. Such process may be repeated for numerous webs of base material 104, as dictated by a user.

In one suitable embodiment, upon exiting the splicing station 110, the web of base material 104 is conveyed in the down-web direction WD to the nip roller 112. The nip roller 112 is controlled via user interface 116 to adjust/maintain the speed at which the web of base material 104 is conveyed through the production system 100. The web of base material 104 is pressed against each of the two adjacent rollers 114 of nip roller 112, with enough pressure to allow friction of the rollers to move the web of base material 104, but a low enough pressure to avoid any significant deformation or damage to the web of base material 104.

In one embodiment, during use, the speed of the web of base material 104 is controlled by controlling the rate of rotation of the high friction roller of nip roller 112 via user interface 116. In other embodiments, the production system 100 may include one or more additional nip rollers 122, 132 to facilitate control of the speed of the web of base material 104, and the web of base material is conveyed therethrough. In this embodiment, the speed of the additional nip rollers 122, 132 may be controlled via user interface 116. In use, when multiple nip rollers are used, each of the speed of each of the nip rollers 112, 122, 132 may be set via user interface 116 to the same speed, or different speeds as required, such that the web of base material 104 is conveyed smoothly through production system 100.

In use, in one embodiment, the web of base material is unwound through the dancer 118. In this embodiment, the pair of rollers of the dancer 118 rotates about the central axis thereof, to passively adjust the tension on the web of base material 104.

With further reference to FIG. 2, in use the web of base material is conveyed through one or more laser systems 120a, 120b, 120c. The embodiment shown in FIG. 2 includes three laser systems 120a-c, but it should be appreciated that any number of laser systems may be used to allow the production system 100 to function as described herein.

Use of the production system is further described with additional reference to FIG. 2-6. The web of base material 104 is conveyed through the laser systems 120a-c in the down-web direction WD. In one embodiment, the web of base material 104 is conveyed into laser system 120a in the first condition 400, having not yet been ablated or cut. The web of base material 104 is conveyed over chuck 306, and thus over the plurality of vacuum holes 406. The vacuum holes 406 are in fluid connection with vacuum 308, and vacuum 308 is controlled via user interface 116 to draw a vacuum pressure on the web of base material 104 passing over the vacuum holes 406. The vacuum pressure is controlled to maintain the web of base material 104 in a substantially flat/planar state as it is conveyed across chuck 306. In one embodiment of use, the vacuum pressure through vacuum holes 406 is monitored and adjusted in real time, via user interface 116, to ensure that the web of base material 104 remains substantially flat across chuck 306 and does not lift or buckle while being processed.

With reference to FIG. 4, the web of base material 104 is conveyed over the opening 410 of chuck 306, and further over the chamfer 416 on the downstream edge 414. In this embodiment, the chamfer 416 facilitates the web of base material 104 passing over downstream edge 414 without having the web of base material 104 catch or snag on the downstream edge 414.

With further reference to FIGS. 3-5, in one embodiment of use, the web of base material 104 is ablated by laser beam 302 (FIG. 3) to create the ablations 404 (FIG. 4) in the web of base material 104. In one embodiment, the web of base material 104 is anode material 502, and the ablations 404 remove the anodically active material layer 508 to expose anode current collector layer 506 (FIG. 5). In another embodiment, the web of base material 104 is cathode material 504, and the ablations 404 remove the cathodically active material layer 512 to expose cathode current conductor 510.

During use, when using the laser system 120a to make the ablations 404 in the web of base material 104, the power of the laser beam 302 is controlled via user interface 116 to a level that is capable of substantially completely, or completely, removing the coating layer, but will not damage or cut through the current collector layer. In use, the laser beam 302 is controlled, for example via user interface 116, to create the ablations 404 while the web of base material 104 is in motion and being conveyed in down-web direction WD. The laser beam 302 is controlled such that ablations 404 are created on each lateral side of the web of base material 104, as best shown in FIG. 5. In one embodiment of use, after making the ablations 404, the laser system 120a is controlled to cut fiducial features 602 in the web of base material 104, as described further herein. In some embodiments, multiple lasers are used to each ablate a portion of the web of base material 104 to each create one or more ablations 404 to increase the throughput of the production system 100.

With further reference to FIGS. 2, 3 and 4, in another stage of use the production process, the web of base material 104 is conveyed in the down-web direction WD toward the cutting area 408 of the laser system 120a. In this embodiment the opening 410 is in fluid communication with the vacuum 308, and vacuum 308 is controlled to draw a vacuum pressure on the web of base material 104 as it passes over the opening 410. In another embodiment, a second vacuum is controlled to equalize the pressure on the web of base material 104 opposite the chuck 306. In this embodiment, the equalization in pressure is monitored and controlled to maintain the web of base material 104 in a substantially flat/planar state and at a consistent height as it passes over the opening 410, to facilitate focus of laser beam 302 on the web of base material 104.

In one embodiment of use, the laser system 120 a is controlled to cut one or more patterns in the web of base material 104 while the web of base material 104 is over the opening 410. With reference to FIG. 6, the laser system is controlled to cut one or more lengthwise edge cuts 600 to define lengthwise edges of an electrode in the cross-web direction XWD. The lengthwise edge cuts 600 are cut using laser beam 302 by cutting the web of base material 104 in the cross-web direction XWD while the web of base material 104 is conveyed in the down-web direction WD. For example, in one embodiment, the path motion of laser beam 302 is controlled and/or synchronized with the motion of the web of base material 104 in the down-web direction WD. Accordingly, the path of the laser beam 302 travels at an angle with respect to the down-web direction WD, to account for the movement of the web of base material 104 in the down-web direction WD. In this embodiment, a compensation factor is applied to the path of the laser beam 302 to allow cuts to be made in the cross-web direction XWD while the web of base material 104 is continuously traveling in the down-web direction WD. In this embodiment, as the web of base material 104 moves in the web direction WD, the laser is projected onto the web of base material 104 at an initial cut location 604, and then is controlled to travel in both the cross-web direction XWD and the web direction WD until reaching end cut location 606 to create the lengthwise edge cuts 600. It should be appreciated that the angle at which the laser beam 302 is controlled to travel varies based upon the speed of the web of base material 104 in the down-web direction WD. In another embodiment, the web of base material 104 is temporarily stopped during the laser processing operation, and as such, the path of the laser beam 302 does not need to account for the motion of travel of the web of base material 104. Such embodiment may be referred to as a step process, or step and repeat process. During laser processing, one or more of the laser systems 120 a-c use a repeating alignment feature, such as fiducial features 602 to adjust and/or align the laser beam 302 during the laser processing operations, for example to compensate for possible variations in positioning of the web of base material 104.

With further reference to FIG. 6, in one embodiment of use, the laser system 120a is controlled to cut one or more of the repeating alignment features such as a plurality of fiducial features 602 in the web of base material 104. The fiducial features 602 are cut at a predetermined/known location on the web of base material 104. In one embodiment of use, the fiducial features 602 are tracked by one or more of the visual inspection systems 310, 312 to measure the location and speed of travel of the web of base material 104. The measurement of the fiducial features 602 is then used to accurately maintain front to back alignment of the patterns on the web of base material 104 in both the down-web direction WD and cross-web direction XWD. In some embodiments of use, the laser system 120a cuts the plurality of tractor holes 612 and/or fiducial features 602. In other embodiments, the fiducial features 602 have been pre-formed into the web of base material 104 such that one or more of laser systems 120a-c uses them for positioning/alignment as described above.

With reference to FIGS. 2 and 6, in one suitable embodiment of use, the laser system 120 a is controlled to cut a first perforation 608 and a second perforation 610 in the web of base material 104 as part of the electrode pattern as the web of base material is in motion in the down-web direction WD. First perforation 608 is formed by laser cutting using laser beam 302, while the web of base material is positioned over the opening 410 in chuck 306. The first perforation 608 is formed as a linear slit (e.g., through-cut) in a direction aligned with the down-web direction WD. Importantly, the first perforation 608 is cut such that it does not extend across the entirety of the width of the electrode We. Instead, the laser system 120 a is controlled to cut the patterns such that outer tear strips 700 remain on both the upstream and downstream edges of the first perforation 608, to ensure the electrode pattern remains connected to the web of base material 104.

With further reference to FIGS. 6 and 7, in use, the second perforations 610 are cut inboard (in the cross-web direction XWD) from the first perforations 608. In this embodiment of use, second perforations 610 are cut as a line of slits in the down-web direction WD separated by inner tear strips 702. In the embodiment shown, the second perforations 610 are cut to intersect through holes 704. In the illustrated embodiment, the inner tear strips 702 are cut to be at least two times the length of outer tear strips 700, but may be cut at different lengths as to allow the production system 100 to function as described herein.

In use, with reference to FIGS. 3, 4 and 6, debris from the laser cuts for the lengthwise edge cuts 600, the fiducial features 602, and the first and second perforations 608, 610 over the opening 410 of the chuck 306, is allowed to fall through the opening 410 and the vacuum 308 is controlled to collect debris formed during the laser cutting process.

In one suitable embodiment of use, the laser system 120a is configured as a first ablation station. In this embodiment, the laser system 120a is controlled to form the ablations 404, as described above on a first surface of the web of base material 104. Upon exiting laser system 120a, the web of base material is conveyed over idler 108d to flip the web of base material 104 in a manner such that a second surface (opposing the first surface) of the web of base material 104 is positioned for processing by the laser system 120b. In this embodiment, laser system 120b is configured as a second ablation station and uses the fiducial features 602 to ensure alignment of the ablations 404 in the down-web direction WD and cross-web direction XWD. Accordingly, the laser system 120b is controlled to perform a second ablation process on the opposing surface of the web of base material 104, such that ablations 404 on each surface of the web of base material 104 are aligned in the web direction WD and the cross-web direction XWD.

In one embodiment of use, the laser system 120c shown in FIG. 2 is configured as a laser cutting station. In this embodiment, the laser system 120c is controlled to perform the laser cuts for lengthwise edge cuts 600, and the first and second perforations 608 and 610.

With further reference to FIGS. 2, 10 and 11, in one embodiment of use, the web of base material is then conveyed through one or more cleaning stations, such as brushing station 124 and air knife 126 upon having exited one or more of laser systems 120a-c. In one suitable embodiment of use, the web of base material 104 is conveyed through brushing station 124 and bristles 1002 are controlled to delicately contact a surface of the web of base material 104 and remove or dislodge any debris therefrom. The contact pressure of the bristles 1002 on the surface of the web of base material 104 is controlled to be low enough that it does not break, rupture or otherwise cause defects in the electrode patterns, and maintains the electrode patterns as attached to the web of base material 104.

With further reference to FIGS. 10 and 11, in one suitable embodiment of use, brush 1000 is controlled to move in the cross-web direction XWD by controlling the motor 1014 to effect rotation of the drive wheel 1010. A position sensor 1016 is controlled to sense the position of the brush position marker 1018 to measure the phase (e.g., angular position) and rotations per time of the drive wheel 1010.

In one suitable embodiment of use, a second brush (not shown) is controlled to contact the opposing surface of the web of base material 104. In this embodiment, the second brush, which may be substantially the same as the first brush 1000 is controlled to travel in a direction opposite to the first brush, and suitably 180 degrees out of phase with the first brush. The phase of the first brush and the second brush may be monitored via the position sensor 1016, and an equivalent position sensor of the second brush. In this embodiment, the contact pressure of the bristles of the first brush and the second brush, together, is controlled to be low enough that it does not break, rupture or otherwise cause defects in the electrode patterns, and maintains the electrode patterns as attached to the web of base material 104.

In use, the rate of oscillation of the brush 1000 and the pressure exerted by the bristles 1002 against the surface of the web of base material 104 may be controlled by the user using the user interface 116.

In one embodiment of use, the brushing station 124 is equipped with a vacuum system and controlled to create a vacuum through brush station orifices 1020 to evacuate debris that has been brushed from one or more surfaces of the web of base material 104. In this embodiment, the debris is brushed from the web of base material 104 and falls, or is suctioned through the brush station orifices 1020.

In another suitable embodiment of use, one or more of the first brush and the second brush include a load sensor that is measured or monitored to determine the pressure the brush is exerting upon the web of electrode material 802. In this embodiment, the first brush and the second brush are controlled, via the user interface 116, to maintain a substantially uniform brushing pressure on the web of electrode material 802 based upon variations in brush bristle wear or electrode thickness or surface roughness.

In another suitable embodiment of use, one or more of the first brush and the second brush are controlled to move at least partially in the down-web direction WD at a rate of speed equivalent to the rate of speed of the web of electrode material 802, to maintain a substantially zero speed differential between the brush and the web of electrode material 802 in the down-web direction WD.

In yet another suitable embodiment of use, the brushing station 124 is equipped with a phase measurement sensor 1016 that determines the phase of the first brush and the second brush. In this embodiment, the phase sensor measures the location of the brush position marker 1018 (e.g., a home sensor flag) of the first brush and the second brush. In this embodiment, the phase measurement sensor 1016 determines whether the first and second brushes are within a range of predetermined phase difference, such as 180 degrees out of phase, 90 degrees out of phase or zero degrees out of phase or any other suitable phase difference that allows the production system 100 to function as described herein, and allows for correction thereof or provides an alert to the user via user interface 116 or other alert device that the brushes are not properly phased.

In still another embodiment of use, an ultrasonic transducer (not shown) is activated to impart ultrasonic vibrations to one or more of the first and second brushes to facilitate debris removal from the web of electrode material 802.

With further reference to FIG. 2, in one suitable embodiment of use, the web of base material 104 is conveyed through an air knife 126. In this embodiment, high pressure air is controlled to contact the surface of the web of base material 104 to remove debris therefrom. The air knife 126 is controlled, for example via user interface 116, to supply air at a pressure/velocity such that it does not break, rupture or otherwise cause defects in the electrode patterns, and maintains the electrode patterns as attached to the web of base material 104. In another embodiment, a second air knife 126 is controlled to blow air at an opposing surface of the web of base material 104 to remove debris therefrom. In this embodiment, the second air knife is controlled to blow air in the same direction as the first air knife, or in a direction opposite the first air knife, or any other direction that allows the air knife 126 to function as described herein. In another embodiment, the air knife 126 station is equipped with a vacuum that is controlled to facilitate removal of the debris that has been removed by the air knife 126.

With reference to FIG. 8, after having been processed by the laser systems 120a-c and cleaned by the brushing station 124 and the air knife 126, the web of base material 104 exits the cleaning stations as a web containing a plurality of electrode patterns 800 within web of base material 104, collectively the web of electrode material 802.

With further reference to FIGS. 2, 8 and 12, in one embodiment of use, the web of electrode material 802 is conveyed through inspection device 128. The inspection device 128 is controlled to analyze the electrode material 802 and identify defects thereon. For example, in one embodiment, the inspection device 128 is a visual inspection device including the camera 1200. The lens 1202 is aimed to focus on the web of electrodes 802 as it passes over inspection plate 1206. In one embodiment of use, the inspection plate 1206 includes the transparent or semi-transparent top 1208 that allows light from a light source (not shown) housed within the inspection plate 1206 to shine therethrough. In one suitable embodiment, the intensity and/or color of the light is controlled via the user interface 116. In one embodiment of use, the web of electrode material 802 is conveyed over the inspection plate 1206 by gear wheels 1210 that engage the tractor holes 612 of the web of electrode material 802. In doing so, the web of electrode material 802 is held taught against inspection plate 1206, to substantially eliminate curling of the web of electrode material 802.

With additional reference to FIG. 12, in one embodiment of use, the inspection device 128 includes a trigger sensor 1212 that is controlled to detect a predetermined feature of the web of electrode material 802, such as a fiducial features 602, lengthwise edge cut 600 or any other feature that allows inspection device 128 to function as described herein. Upon detection of the predetermined feature, the trigger sensor 1212 sends a signal directly to camera 1200 or indirectly through the user interface 116, to trigger the camera 1200 to image an electrode of the web of electrode material 802. Upon imaging the electrode, camera 1200 is controlled to detect one or more metrics such as a height of the electrode, a size or shape of a feature that has been cut by one of the laser devices 120*a-c* (FIG. 2), the pitch (distance) between electrodes or any other feature that allows the inspection device to function as described herein. For example, in one suitable embodiment, the inspection device 128 is controlled to detect whether the ablations 404 (FIG. 4), lengthwise edge cuts 600, fiducial features 602, and first and second perforations 608, 610 (FIG. 6), individual electrode structure cross-web direction XWD dimensions, individual electrode structure down-web direction WD dimensions, individual electrode active area offset, and any other ablation or cut of web of electrode material 802 are within a predefined tolerance of size, shape, placement, cross-machine direction pitch, machine direction pitch, and orientation, and presents this information to the user via user interface 116. In one suitable embodiment, a user may control which feature to inspect using the user interface 116. In yet another embodiment, inspection device 128 may detect a cluster identification code for one or more electrode structures of the web of electrode material 802.

In one embodiment of use, the inspection device 128 is used to provide in-line metrology of the web of base material 104 and/or web of electrode material 802. In this embodiment, the inspection device 128 is controlled to measure metrics such as web thickness, sizes and shapes of the electrode patterns, and the like while the web is being conveyed in the machine direction. These metrics are transmitted to the user interface 116 for viewing or memory storage, or otherwise used to adjust production parameters of the production system 100.

In one embodiment of use, if the inspection system determines a defect is present on the web of electrode material 802 (FIG. 8), the marking device 130 (FIG. 2) is controlled to mark the web of electrode material 802 to identify such defect using a laser etching device, printer, stamper or any other marking device capable of placing a mark indicating a defect is present on a web of electrode material 802. In another suitable embodiment of use, the marking device 130 is controlled to mark the web of electrode material 802 with one or more of an identification number (ID) and known good electrodes (KGEs), allowing for the possibility to further mark the web of electrode material 802 with a grade, such as grade A, grade B, grade C or the like, indicating a quality measurement (such as number or type of defects) of a particular electrode within the web of electrode material 802.

With further reference to FIG. 9, the web of electrode material 802 is then conveyed to the rewind roller 134, where it is wound together with web of interleaf material 138 to create a spool 900 having alternating layers of web of electrode material 802 and web of interleaf material 138.

In one suitable embodiment of use, the web of base material 104 is rewound via a rewind roller 134 together with a web of interleaf material 138, which is unwound via interleaf roller 136 to create a roll of electrodes 140 with layers of the electrodes separated by interleaf material 138. In some embodiments, the web of base material 104 is rewound via the rewind roller 134 without the web of interleaf material 138.

In one embodiment, web of base material 104 has an adhesive tape layer (not shown) adhered to one or both surfaces of the anodically active material layer 508, or cathodically active material layer 512, respectively. In this embodiment, in use, the adhesive layer is removed subsequent to the ablation and cutting (described above) to remove unwanted material or debris.

In one embodiment of use, one or more of the rollers of the conveyor system is not perfectly round, such that the roller has an eccentricity. In such embodiment, the eccentric roller(s) are mapped to determine the radius versus radial position. The laser system 120*a-c* is then controlled to adjust the laser beam 302 position to account for the eccentricity based upon the mapping of the roller(s).

Figure 14:
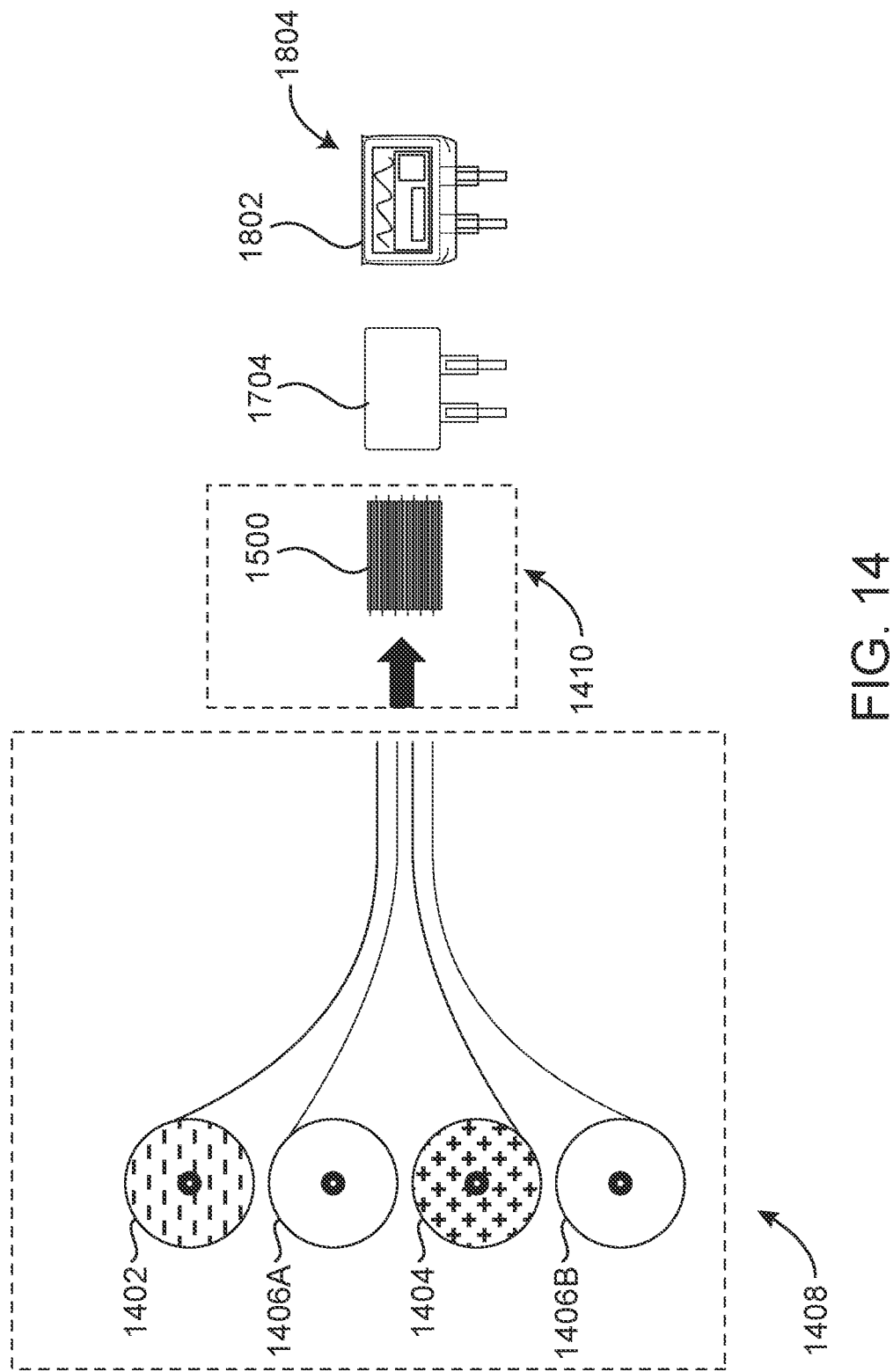
FIG. 14 is a partial schematic view of a merging and stacking arrangement according to the current disclosure.
Figure 15:
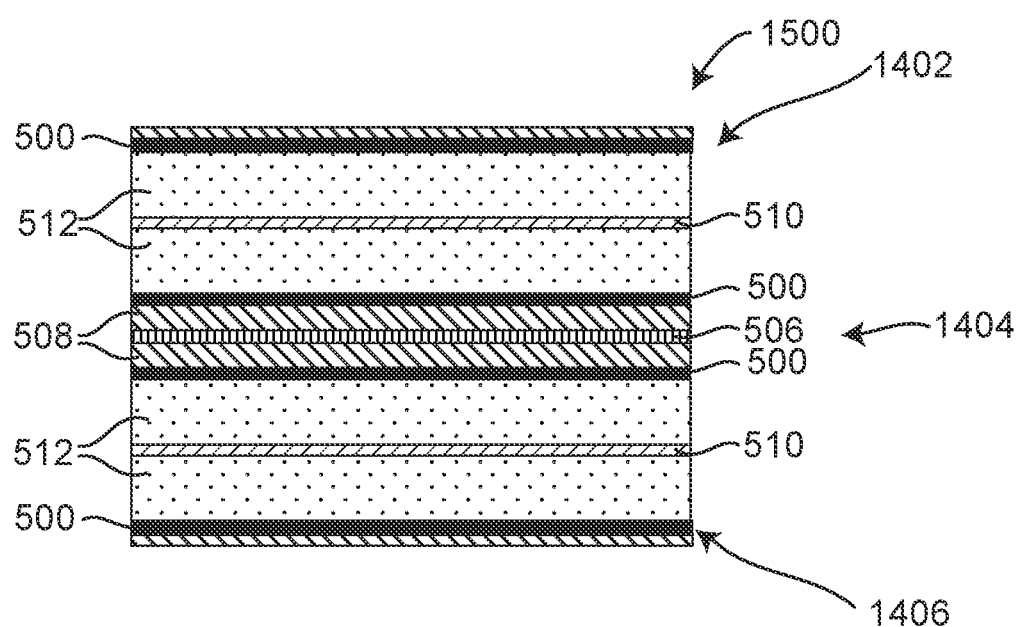
FIG. 15 is a cross section of a multi-layer stack of electrodes according to the current disclosure.
Figure 16A:
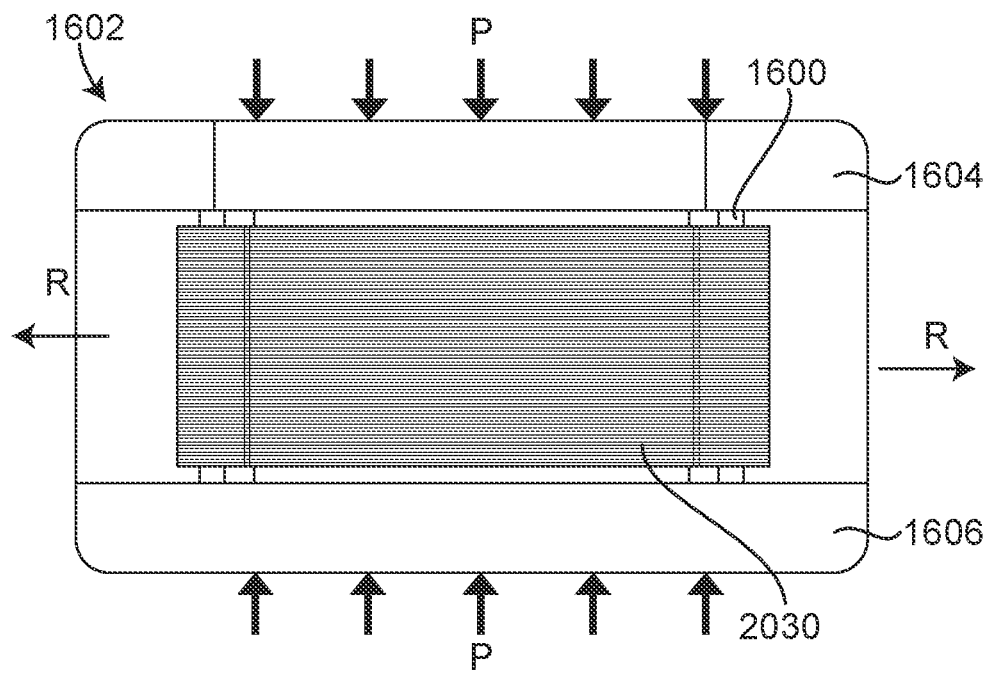
FIG. 16A is a side view of a multi-layer stack of electrode sub-units according to the current disclosure.
Figure 16B:
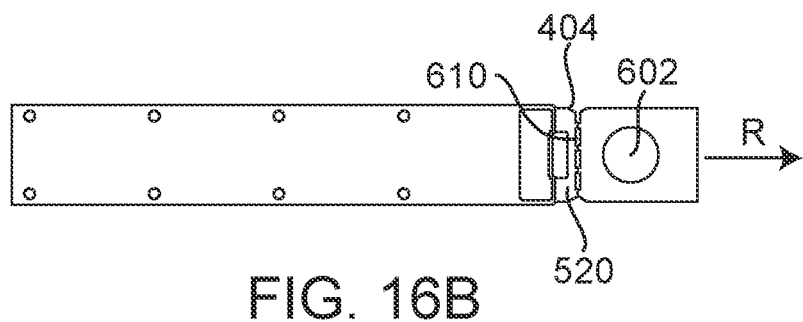
FIG. 16B is a partial top view of the multi-layer stack of electrode sub-units of FIG. 16A.

With reference to FIGS. 14-16, the web of electrode material 802 is used to produce a battery. In this embodiment, individual spools of web of electrode material from spools 1402, 1404, and 1406A and 1406B are each unwound and merged in merging zone 1408 and stacked in punching and stacking zone 1410 in an alternating configuration including at least one layer of web of cathode material from spool 1402, and web of anode material from spool 1404 separated by web of separator material from spool 1406. It should be appreciated that the spools of electrode material from spools 1402, 1404, and 1406A and 1406B have been produced as web of electrode material 802 as described herein.

Figure 14A:
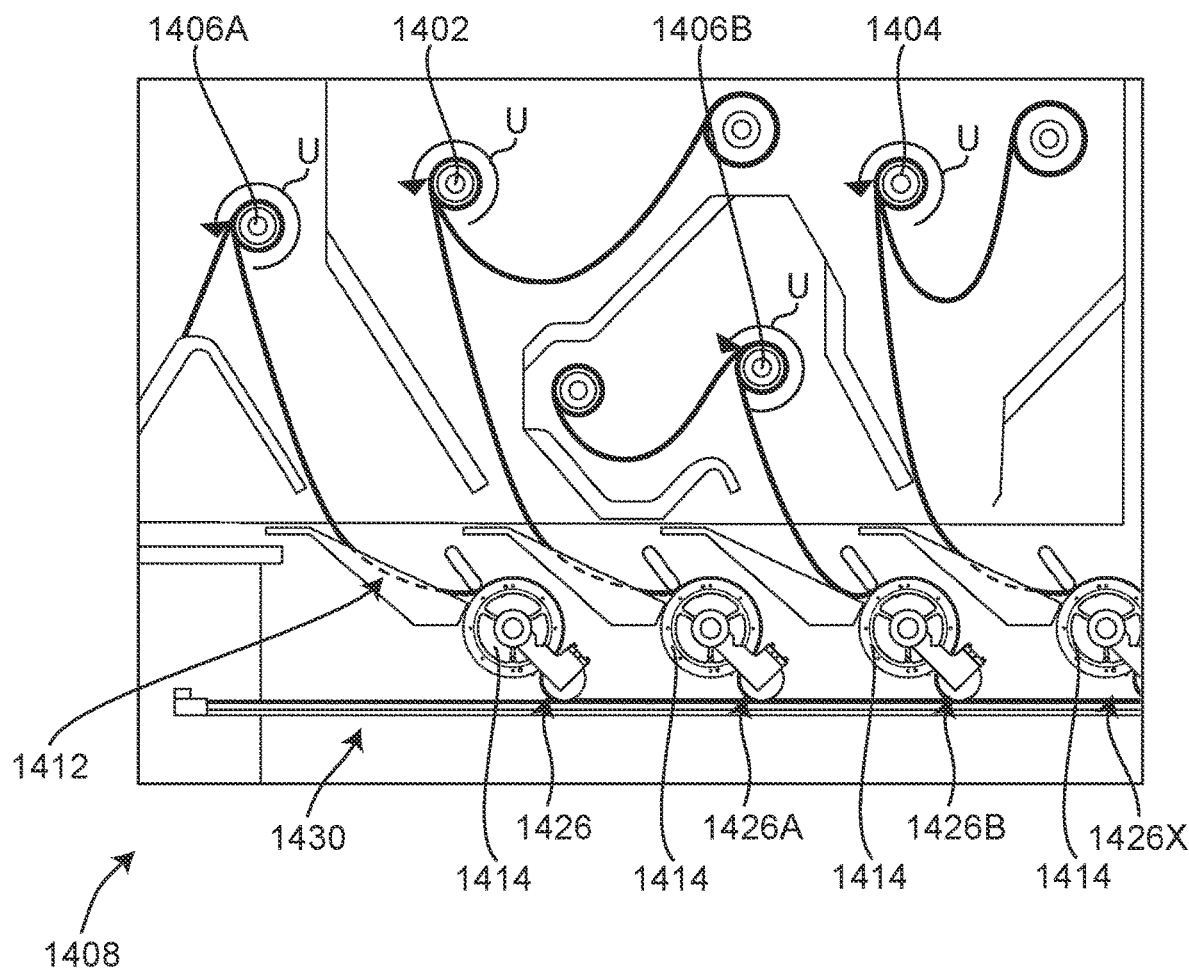
FIG. 14A is a partial side view of a merging zone according to the current disclosure.
Figure 15A:
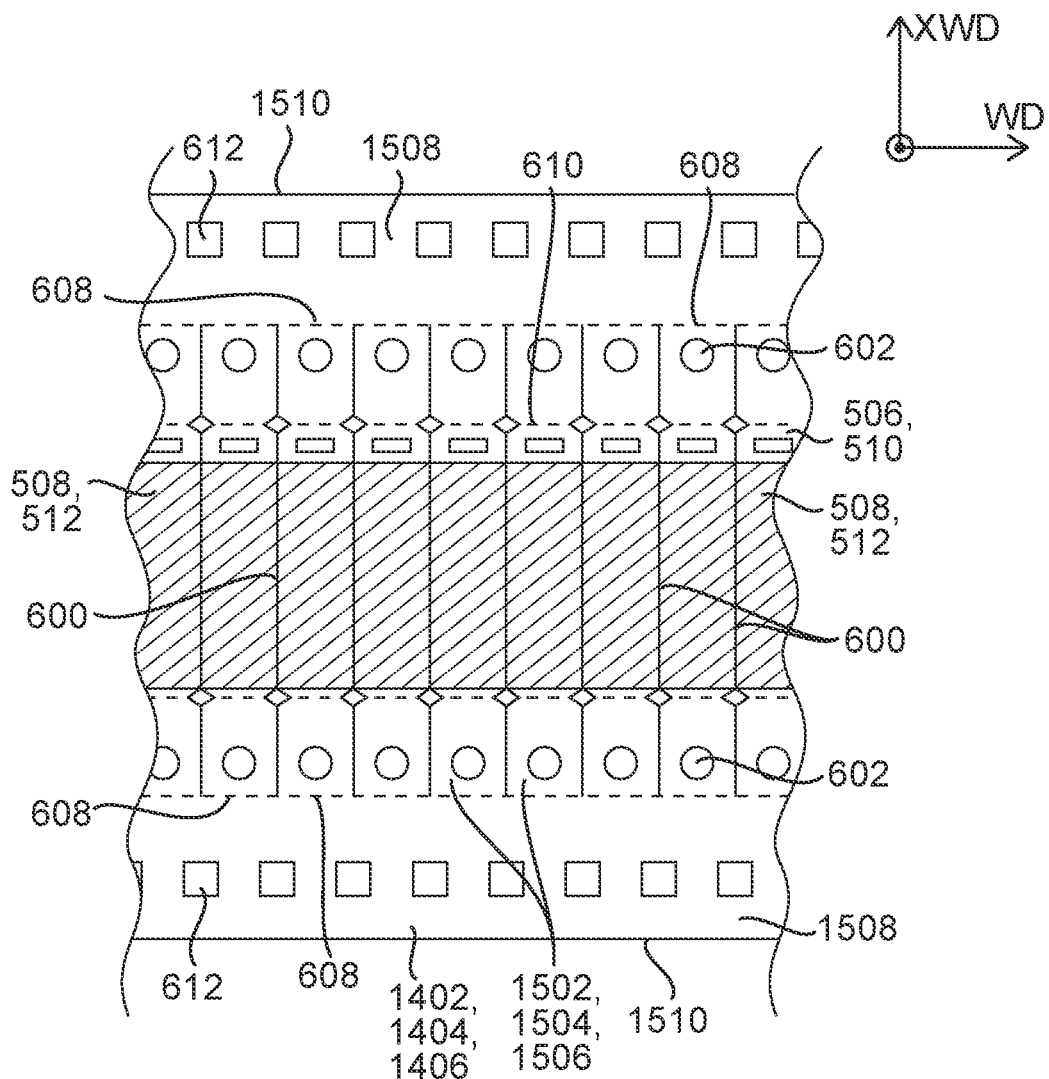
FIG. 15A is a partial top view of a web of electrode material according to the current disclosure.

With reference to FIGS. 14A and 15A, additional detail of the merging zone 1408 and merging process is described. In the merging zone 1408, the spools of webs of electrode material from spools 1402, 1404, and 1406A and 1406B are individually unwound in the direction indicated by arrows U. In one embodiment, the spools of electrode material from spools 1402, 1404, and 1406A and 1406B are rolls of electrodes 140, described above. In the embodiment shown in FIG. 14A, spool 1406 is a spool of wound web separator material having a population of individual electrode separators 1506 formed therein each bounded by outer perforations 608 and lengthwise edge cuts 600. Spool 1402 is a spool of wound web of cathode material having a population of individual cathode electrodes 1502 formed therein each bounded by outer perforations 608 and lengthwise edge cuts 600. Spool 1404 is a spool of wound web anode material having a population of individual anode electrodes 1504 formed therein each bounded by outer perforations 608 and lengthwise edge cuts 600.

As best seen in FIG. 15A, each of the spools of electrode material from spools 1402, 1404, 1406 is formed of a web having continuous outer edges 1508 in which the tractor holes 612 have been formed, and web edge boundaries 1510 defining the outer perimeter of the webs. It should be appreciated that in other embodiments, the order and placement of the spools of electrode material from spools 1402, 1404, and 1406 during the merging process may vary so long as separator material is placed between any adjacent layers of anode material and cathode material to prevent short circuiting.

Figure 14B:
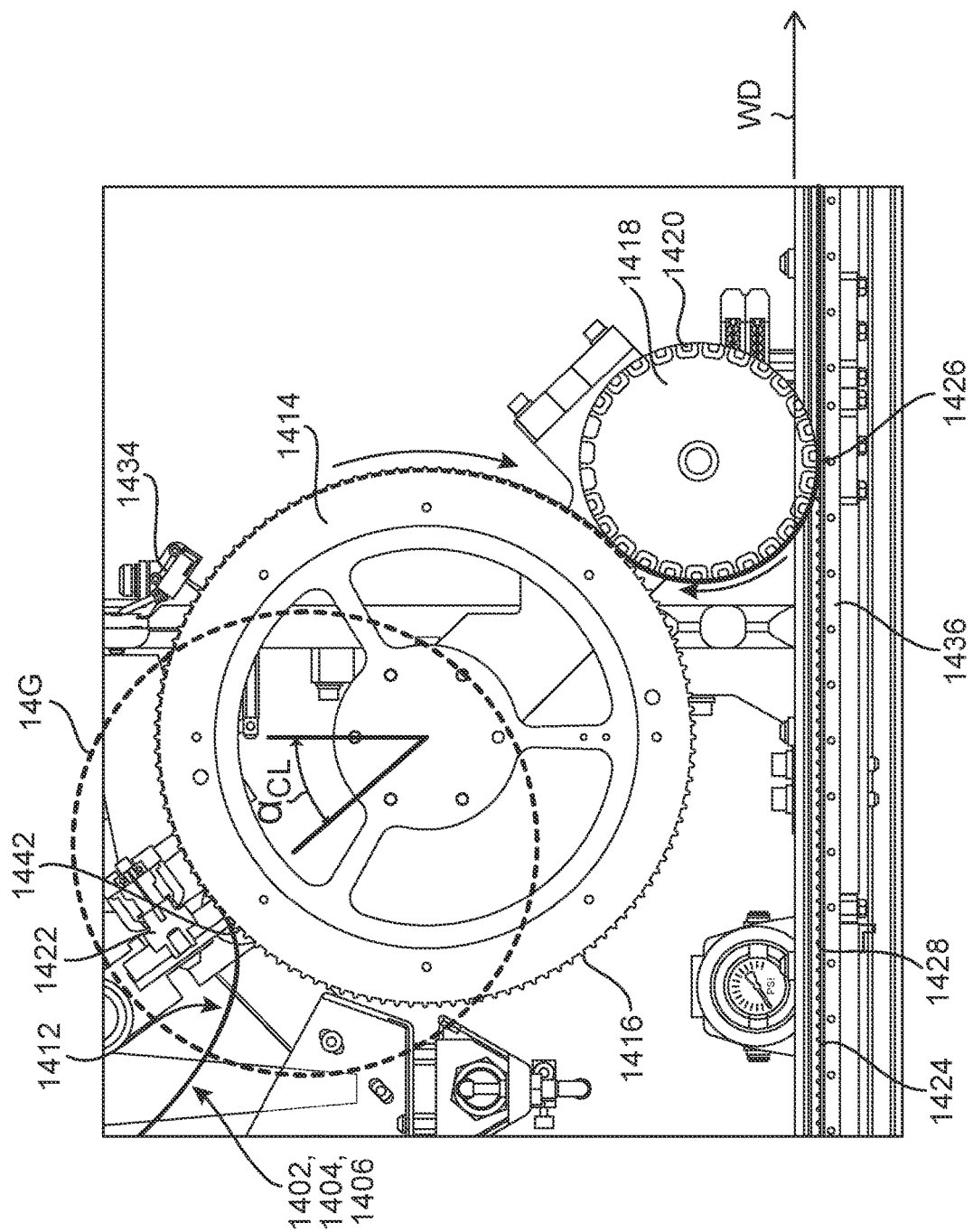
FIG. 14B is an enhanced detail view illustrating a portion of an unwind section of the stacking device of FIG. 14A.

In one embodiment, as each of the spools of electrode material from spools 1402, 1404 and 1406 are unwound, the unwound web of each of the spools 1402, 1404 and 1406 is controlled to form a catenary curve 1412 prior to engagement with a merge sprocket 1414, for example as shown in FIG. 14B. In the embodiment using the catenary curve 1412, the catenary curve 1412 facilitates self-alignment and/or tensioning of the web from spools 1402, 1404 and 1406 to merge sprocket 1414 without the use of a steering roller or dancer. In another embodiment, as an alternative to or in addition to the catenary curve 1412, a web steering roller and a dancer (e.g., similar to dancer 118) to accurately control the position of the unwound web as it engages the merge sprocket 1414. In embodiments, merge sprocket 1414 may have a radius $R_s$ (FIG. 14H) of 19 mm or larger, such as 38 mm, 51 mm, 76 mm, 114 mm, 152 mm or any other radius that allows the system to function as described herein. It is noted that any or all of the other sprockets, spools and rollers as described herein may have the same or similar radiuses that allow the system to function as described herein. From a practical standpoint, in some embodiments it is desirable to reduce the size of the merge sprocket 1414 (and any other sprocket, spool or roller) such that it takes up less space, and thus the system may accordingly be made smaller. In addition, it is noted that using smaller sprockets, spools and rollers reduce the overall path length that the web travels while being processed in the system, which may facilitate reduced waste and improved alignment of webs, as described herein. Each of the merge sprockets 1414 includes a population of teeth 1416 (e.g., pins or projections) that are sized, shaped and placed to precisely engage or align with the tractor holes 612 of the web. For example, if the tractor holes 612 have a square cross sectional shape, the teeth 1416 would have a corresponding square cross sectional shape. However, the size and shape, including any taper, of the tractor holes 612 and teeth 1416 may be any size and shape that allows the system to function as described herein, such as the following cross-sectional shapes, square, rectangular, circular, oval, triangular, polygonal or combinations thereof.

With reference to FIGS. 14A, 14B, and 14H, the webs from the spools of electrode material from spools 1402, 1404, 1406 are moved in a circular path around the respective merge sprocket 1414 until it engages with an inverted tooth sprocket 1418. In embodiments, the radius of inverted tooth sprocket 1418 is 19 mm or larger, such as 38 mm, 51 mm, 76 mm, 114 mm, 152 mm or any other radius that allows the system to function as described herein. Each of the inverted tooth sprockets 1418 includes a population of inverted teeth 1420 that are configured to engage with teeth 1416 of merge sprocket 1414, while a respective one of the webs from spools 1402, 1404, and 1406 is located therebetween, to facilitate maintaining proper positioning and tension of the webs from spools of electrode material from spools 1402, 1404, 1406 during the unwind procedure. In one suitable embodiment, the merge sprocket 1414 is driven by a motor and its speed is controlled to ensure proper tensioning of the webs from spools of electrode material from spools 1402, 1404, 1406. In another embodiment, merge sprocket 1414 freely rotates and the speed of spools of electrode material from spools 1402, 1404 and 1406 are controlled to ensure proper tensioning of the webs from spools of electrode material from spools 1402, 1404, 1406. In another embodiment, merge sprocket 1414 is controlled to rotate at a fixed speed that is mechanically or electronically keyed to rotate to match the speed of the pin plate 1424. In this embodiment, the pin plate 1424 acts as the master component for speed control and the merge sprocket 1414 is driven as a slave component to match the speed of the pin plate 1424. In this embodiment, speed of spools of electrode material from spools 1402, 1404 and 1406 may also be controlled to ensure proper tensioning of the webs from spools of electrode material from spools 1402, 1404, 1406. In one such embodiment, a loop sensor 1422, such as an optical sensor or physical sensor, determines an amount of sag (curvature) of the catenary curve 1412 which is then used to calculate the tension on the webs from spools of electrode material from spools 1402, 1404, 1406. For example, if the sag is determined to be too large (i.e., too low of tension), the speed of merge sprocket 1414 is increased, or the speed of spools of electrode material from spools 1402, 1404, 1406 is decreased in order to reduce the sag (i.e., increase the tension) to be within a predetermined range. Alternatively, if the sag is determined to be too little (i.e., too high of tension), the speed of merge sprocket 1414 is decreased or the speed of spools of electrode material from spools 1402, 1404, 1406 is increased in order to increase the sag (i.e., decrease the tension) to be within a predetermined range. In one embodiment, the sag is targeted to control the angle $\alpha_{CL}$ at which the webs from spools of electrode material 1402, 1404, 1406 make contact the merge sprocket 1414. In one such embodiment, $\alpha_{CL}$ is from 0° to 90° measured in a counterclockwise direction from vertical, for example in embodiments $\alpha_{CL}$ is 0°, 5°, 10°, 15°, 20°, 25°, 30°, 35°, 40°, 45°, 50°, 55°, 60°, 65°, 70°, 75°, 80°, 85° or 90°. In another embodiment, $\alpha_{CL}$ is controlled to be within +/-5 degrees from the vacuum tensioner 1442. In the embodiment shown in FIG. 14H, view (i), $\alpha_{CL}$ may be indicated using clock positions, where 12:00 refers to the top vertical position, and each hour in the clockwise direction refers to a movement of 30 degrees. Accordingly, in the embodiment shown in FIG. 14H, view (i), webs from spools 1402, 1404, 1406 make contact the merge sprocket 1414 at the 10:30 position on the merge sprocket 1414, and the brushes 1440 are positioned at the 11:00 position.

After the webs of electrode material from spools 1402, 1404, 1406 are unwound onto the inverted tooth sprocket 1418, each web is then guided and transferred onto pin plate 1424 at transfer location 1426. In one embodiment, tension on the webs of electrode material from spools 1402, 1404, 1406 are controlled such that each web is transferred onto pin plate 1424 at the 6 o'clock position (e.g., vertically downward). The pin plate 1424 includes a series of pins 1428 that are sized and shaped to precisely engage with tractor holes 612 of the webs of electrode material from spools 1402, 1404, 1406 and also the inverted teeth 1420 of inverted tooth sprocket 1418. Accordingly, each of the webs of electrode material from spools 1402, 1404, 1406 is sandwiched between the pin plate 1424 and the inverted tooth sprocket 1418 as it is transferred onto pin plate 1424, while the pins 1428 extend through the tractor holes 612 and into inverted teeth 1420 to facilitate alignment of the web of electrode material from spools 1402, 1404, 1406 onto pin plate 1424.

In one embodiment, the inverted tooth sprocket 1418 is positioned at a suitable height above the pin plate 1424 in the Z-direction, such as from 0 μm to 3000 μm to define a nip (i.e., gap) between the inverted tooth sprockets 1418 and the pin plate 1424 to allow the web to float above the pin plate 1424 before being transferred thereon, such as 0 μm, 1 μm, 5 μm, 10 μm, 20 μm, 50 μm, 100 μm, 200 μm, 300 μm, 500 μm, 1000 μm, 1250 μm, 1500 μm, 2000 μm 2500 μm, 3000 μm or other distances that allow the system to operate as described herein. In one embodiment, the inverted tooth sprocket 1418 is positioned at a suitable height above the pin plate 1424 in the Z-direction based upon the height of the web on the pin plate 1424. For example, in embodiments, the inverted tooth sprocket 1418 is positioned at a suitable height above the pin plate 1424 in the Z-direction up to a height of less than or equal to 10 times the height of the web on the pin plate 1424. In this regard "float" refers to the web having a portion that is not in contact with either the inverted tooth sprocket 1418 or the pin plate 1424, such that the web has some slack which facilitates self-alignment of tractor holes 612 to pins 1428. In embodiments, the height of inverted tooth sprocket 1418 above the pin plate 1424 may be adjustable automatically or manually in order to ensure self-alignment of the tractor holes 612 to pins 1428.

In another embodiment, the height of inverted tooth sprocket 1418 over pin plate 1424 may also vary depending on which of the webs of electrode material from spools 1402, 1404, 1406 is being transferred to pin plate 1424. In this embodiment, a small amount of possible misalignment of the respective web of electrode material from spools 1402, 1404, 1406 is reduced or eliminated by allowing the web of electrode material from spools 1402, 1404, 1406 to have a sufficient amount of float (i.e., web that is not in contact with either the inverted tooth sprocket 1418 or the pin plate 1424) to self-adjust and thus align the respective tractor holes 612 to the pin plate 1424. In one suitable embodiment, the slack is sufficient to form an S-shaped curve of the web of electrode material from spools 1402, 1404, 1406 between the inverted tooth sprocket 1418 and the pin plate 1424. It should be appreciated that as each layer of the web of electrode material from spools 1402, 1404, 1406 is placed on to the pin plate 1424, subsequent (i.e., downstream) nips formed between the inverted tooth sprockets 1418 and the pin plate 1424 will increase in size to account for the previous layers of web of electrode material from spools 1402, 1404, 1406 placed thereon. In one suitable embodiment, the nip distance increases by an amount equal to the thickness of the previous layer of web of electrode material from spools 1402, 1404, 1406 placed onto the pin plate 1424.

In one embodiment, as shown in FIG. 14A, there are four spools of the web of electrode material from spools 1402, 1406, 1404, 1406. In this embodiment, the spools 1402, 1406, 1404, 1406 are located such that they may be sequentially unwound and merged onto the pin plate 1424. In this embodiment, the pin plate 1424 extends from pre-merge location 1430 located upstream of a first transfer location 1426. The pin plate 1424 extends to a downstream location past the last transfer location 1426X (FIG. 14A). In this embodiment, each of the four spools of the web of electrode material from spools 1402, 1406A, 1404, 1406B has its own transfer location 1426, 1426A, 1426B and 1426X respectively. It should be appreciated that in other embodiments, additional spools of electrode material may be unwound and merged, and thus additional transfer locations for each additional spool may be included.

With reference to FIGS. 14A-C, individual layers of the webs of electrode material from spools 1402, 1406A, 1404, 1406B are merged (e.g., sequentially layered) to form merged material web 1432. Each layer of the webs of electrode material from spools 1402, 1406A, 1404, 1406B are merged such that each layer of merged material web is vertically aligned, for example such that one or more of a longitudinal axis $A_E$ (FIG. 7) of each electrode pattern, tractor holes 612, fiducial features 602 and lengthwise edge cuts 600, and perforations 608, 610 (FIG. 6) of the electrode patterns of each layer are aligned in both the web direction and cross-web direction XWD. Variation in alignment of the webs may cause defects in later operations, such as punching and stacking, and thus maintaining alignment of the webs from spools 1402, 1406A, 1404, 1406B as they are merged is critical in some embodiments. It is noted that spools of separator material 1406A and 1406B may be the same or different separator material. As used herein, when describing spools of webs of separator material generally, 1406A and 1406B may be generally referred to as spools of web of separator material from spool 1406.

Each layer of the merged material web 1432 has been transferred sequentially, layer by layer, as described in the process above to be vertically aligned. That is, the initial layer in this embodiment, comprised of web of separator material from spool 1406, is transferred to the pin plate 1424 at transfer location 1426. Subsequently, at transfer location 1426A which is located downstream of transfer location 1426, web of cathode material from spool 1402 is transferred atop of the web of separator material from spool 1406. Next, a second layer of separator material from spool 1406 (via a separate spool) is transferred atop of the layer of separator material from spool 1406 at transfer location 1426B, which is downstream of transfer location 1426A. In this embodiment, a layer of anode material web from spool 1404 is transferred atop the second layer of separator material web from spool 1406 at transfer location 1426X. Once all four layers have been stacked, or merged, the four layer laminate web is referred to as merged material web 1432. During the transfer of each layer onto pin plate 1424, the target down-web tension on each layer of merged material web 1432 is zero. In one embodiment, the down-web tension on each layer of merged material web 1432 is determined by the mass of the web from each spool 1402, 1404, 1406, respectively, and the amount of sag of such web between merge sprocket 1414 and the pins 1428 of pin plate 1424.

During the transfer of each layer, it should be appreciated that the pins 1428 of pin plate 1424 are sized to extend through each layer of material and into inverted teeth 1420 of inverted tooth sprocket 1418 to maintain alignment of each layer with respect to one another. At each of the transfer locations, a nip (i.e., gap) is formed at transfer location 1426 between the respective inverted tooth sprocket 1418 and pin plate 1424, which is set to a fixed gap distance of from 100 to 1000 um over the web. In one embodiment, the nip is set to approximately 3 times the thickness of the web. For example, if the thickness of the web in the Z-direction is 100 microns, the nip gap will be approximately 300 microns in the Z-direction. It should be appreciated that the actual gap distance between the respective inverted tooth sprocket 1418 and pin plate 1424 is increased at each downstream transfer location 1426 to account for the added thickness of each previous layer that has been transferred onto the pin plate 1424. In one embodiment, the increase in gap distance at each subsequent downstream transfer location is approximately equivalent to the height of the added layer in the Z-direction. In one embodiment, the nip gap is about three times the height of the merged material web at the respective transfer location 1426. As shown in FIG. 14E, the pins 1428 of pin plate 1424 may have a constant cross-sectional area in the Z-direction as shown in the upper figure of FIG. 14E, or may taper to have a larger cross-sectional area proximal to the pin plate 1424 in the Z-direction. In embodiments where pins 1428 have such a taper, the merged material web desirably rests above the pin plate 1424, approximately mid-way up the pins 1428 in the Z-direction. It should also be appreciated that in other embodiments, the ordering of layers may be different depending on the desired outcome, and accordingly, the positioning of each of the spools 1402, 1404, 1406 may be placed at the corresponding transfer location to facilitate proper layering of the webs from spools of electrode material from spools 1402, 1404 and 1406. It should also be appreciated that additional spools of electrode material may be included, and a corresponding number of transfer locations may be used to facilitate layering of the additional webs from the additional spools.

A cross sectional view 1500 of one embodiment of merged material web 1432 is shown in FIG. 15, which also may represent a cross section of a multi-layer electrode sub-stack. In this embodiment, the merged material web 1432 comprises anode current collector layer 506 in the center, anodically active material layer 508, electrically insulating separator material 500, cathodically active material layer 512 and cathode current conductor layer 510 in a stacked formation. Additional layers may be merged, by alternating layers of webs from spools of anode 1404, separator 1406, and cathode 1402 to form the desired number of layers for merged material web 1432. In one embodiment, the spools of anode 1404, separator 1406, and cathode 1402 may be rolls of electrodes 140, as described above.

In some embodiments, the pin plate 1424 includes a population of individual separate pin plates (each similar to pin plate 1424) that each are abutted and indexed to one another to form a continuous stream of pin plates. In this embodiment, it is important that the individual pin plates be precisely positioned with respect to one another, such that proper registration of the layers of merged material web 1432 is maintained as each of the layers are transferred onto the pin plates. Accordingly, in some embodiments, each pin plate 1424 may be held by a jig or other alignment device, such as a pin, magnet, protrusion or the like to maintain proper registration of the pin plates 1424. The pin plates 1424 are conveyed in the web direction via a conveyor mechanism 1436, which is controlled to travel at the same speed as inverted tooth sprocket 1418, such that the layers of merged material web 1432 are properly aligned to the pins 1428 of pin plates 1424. In one embodiment, the engagement of pins 1428 with inverted teeth 1420 are what propel pin plates 1424 in the down-web direction WD. Accordingly, in such embodiment, proper speed is maintained between pin plates 1424 and inverted tooth sprocket 1418.

In one embodiment, at one or more of transfer locations 1426, 1426A-X, an electrode defect sensor 1434 is positioned such that the web of electrode material from spools 1402, 1404 and 1406 pass adjacent to the defect sensor 1434. It is noted that as used herein, 1426X is used to refer to any number of additional transfer locations as described herein. The defect sensor 1434 is configured to detect defects in the web of electrode material from spools 1402, 1404 and 1406. For example, defect sensor 1434 may be configured to detect missing electrodes from the web, misaligned or missing tractor holes 612, fiducial features 602, ablations, cuts, perforations or other weakened areas in the web of electrode material from spools 1402, 1404 and 1406. In the event the defect sensor 1434 detects a defect in the web of electrode material from spools 1402, 1404 and 1406, the web may be marked using a marking device collocated with the defect sensor 1434 to indicate the defect. The marking of the defect may be used in subsequent process steps to ensure that the defective portion of the web of electrode material from spools 1402, 1404 and 1406 is not used in the stacking phase, further described below, or is otherwise disposed of prior to becoming part of a stacked cell 1704.

Figure 14D:
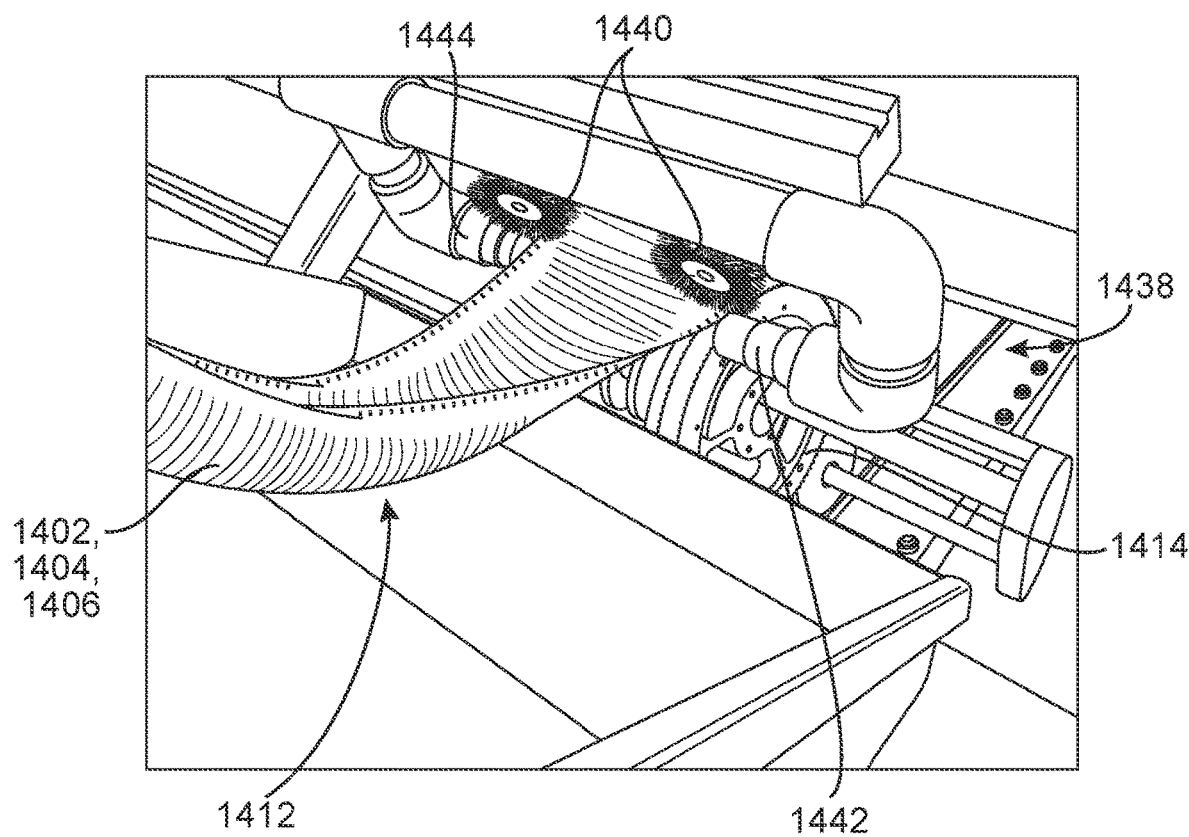
FIG. 14D is an isometric view of an electrode material tensioning section of the electrode manufacturing system of the present disclosure.

With reference to FIG. 14D, one embodiment of the manufacturing system includes an electrode material tensioning section 1438 configured to flatten the web of electrode material from spools 1402, 1404 and 1406 prior to entering the transfer location 1426. In some instances, the web of electrode material from spools 1402, 1404 and 1406 may tend to curl, or cup, such that the web has a U-shape. It is speculated that the curl may be caused by a weakening of the web structure due to lengthwise edge cuts 600, which cause the center portion of the web to sag. In addition, electrical, or static electrical charge buildup along the longitudinal edges of the web of electrode material from spools 1402, 1404 and 1406 may cause such edges to curl inwardly. If the web of electrode material from spools 1402, 1404 and 1406 has such a curl, the position of the tractor holes 612, and the spacing between opposing tractor holes 612 will not be aligned to the merge sprocket 1414.

Figure 14G:
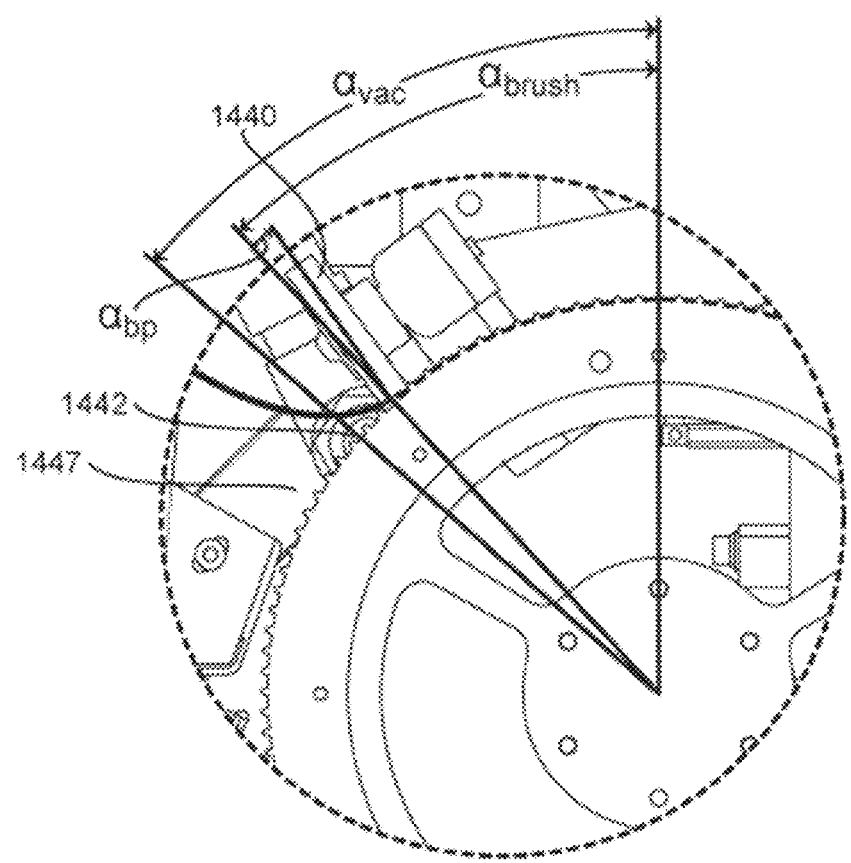
FIG. 14G shows an enlarged view of an initial contact point shown in FIG. 14B of a web with a merge sprocket according to an embodiment of the present disclosure.

Accordingly, in order to remediate the curl, the tensioning section 1438 may include at least one of counter rotating brushes 1440 (FIGS. 14D, 14F, 14G, 14H) and a vacuum tensioner 1442. In one embodiment, the counter rotating brushes 1440 are driven by an electric motor (not shown) in opposing directions $W_b$ in the cross-web direction XWD. In one embodiment the counter-rotating brushes have an outer diameter $D_b$ of from 25 mm to 150 mm and an inner diameter $D_a$ of from 10 mm to 50 mm. The counter rotating brushes, in one embodiment, have a central through-bore 1441 having a diameter of from 5 mm to 25 mm, the center of which defines the axis upon which the counter rotating brushes 1440 rotate about. Each of the counter rotating brushes 1440 have a thickness $T_B$ of from 2 mm to 20 mm. The counter rotating brushes include a plurality of bristles 1443 which may be made of natural or synthetic materials, such as animal hair, nylon, carbon fiber, high density polyethylene, high temperature nylon, PEEK, polyester, polyethylene, polypropylene, polystyrene, polyvinylchloride, metals, metal alloys, plastic, and the like. In a preferred embodiment, the bristles 1443 are made from nylon. The bristle material should be suitably selected to allow the brushes to function as described herein without causing abrasive or other damage to the web. The counter rotating brushes 1440 are adjustably positioned adjacent flatten the web of electrode material from spools 1402, 1404 and 1406, such that the counter rotating brushes 1440 contact the web at a brush pitch angle $\alpha_{bp}$ (FIG. 14G) with sufficient pressure to uncurl and flatten the longitudinal edges of the web of electrode material from spools 1402, 1404 and 1406 prior to engaging with merge sprocket 1414. In some embodiments, the rotational speed and contact pressure of the counter rotating brushes 1440 can be monitored and adjusted to ensure a sufficient flatness of the web of electrode material from spools 1402, 1404 and 1406 is obtained. In one embodiment, for example as shown in FIG. 14H, view (ii), the brush speed is referenced as a velocity vector $V_{bs}$ having a velocity component $V_b$ in the cross-web direction XWD and a velocity component $V_s$ in the down web direction WD. In embodiments, the velocity component $V_b$ may be set (such as by adjusting the rotational speed (e.g., rpm) of the brush), to between from 50 mm/sec to 250 mm/sec, such as 50 mm/sec, 60 mm/sec, 70 mm/sec, 80 mm/sec, 90 mm/sec, 100 mm/sec, 110 mm/sec, 120 mm/sec, 130 mm/sec, 140 mm/sec, 150 mm/sec, 160 mm/sec, 170 mm/sec, 180 mm/sec, 190 mm/sec, 200 mm/sec, 210 mm/sec, 220 mm/sec, 230 mm/sec, 240 mm/sec or 250 mm/sec or any velocity therein. In embodiments, the velocity component $V_s$ may be set (such as by adjusting the speed of the web in the Web direction WD) from 10 mm/sec to 100 mm/sec, such as 10 mm/sec, 20 mm/sec, 30 mm/sec, 40 mm/sec, 50 mm/sec, 60 mm/sec, 70 mm/sec, 80 mm/sec, 90 mm/sec, 100 mm/sec or any velocity therein. Accordingly, the brush tip speed across the web may be calculated as $V_{bs}=\text{sqrt}(V_b^2+V_s^2)$. In some embodiments, $V_{bs}$ may be within the range of from 51 mm/sec to 270 mm/sec.

In one embodiment, the tensioning section includes a deionizer device 1447 configured to reduce or eliminate the static electrical charge on the web of electrode material from spools 1402, 1404 and 1406. In such embodiment, the deionizer device 1447 is placed upstream, just prior to, the vacuum tensioner 1442 and counter rotating brushes 1440. The deionizer device 1447 is configured to neutralize an electrical charge of components, such as the vacuum tensioner 1442, which may be formed from plastic pipe, such as PVC, in some embodiments. For example, if a deionizer is not used, when the separator material from spool 1406 passes over the vacuum tensioner, or when small particles are carried by airflow through the vacuum tensioner, it may build up a static electrical charge on the vacuum tensioner 1442. Accordingly, the deionizer device 1447 may be used to neutralize the electrical charge on the vacuum tensioner 1442, thus allowing the web of electrode material from spools 1402, 1404 and 1406 to pass thereby without being electrically attracted to the vacuum tensioner 1442. It should be noted that although the deionizer device has been described with respect to vacuum tensioner 1442, one or more deionizer devices 1447 may be used on any component within the system that is affected by electrical charge and benefits from charge neutralization, such as any component that is in contact with or close proximity to webs of electrode material from spools 1402, 1404 and 1406. In some embodiments, the deionizer device 1447 is a DC ionizing bar. In some embodiments, the deionizer device 1447 is capable of pulsed DC ionization for short range applications, such as from 20 mm to 200 mm. In some embodiments, the frequency of the pulses may be controlled, automatically, or by a user, to be set from 1 Hz to 20 Hz in order to adjust the effect of the deionizer device 1447 on the affected component. In some embodiments, the deionizer device 1447 is configured with metal pins, such as titanium pins or the like, that are used as ionizer emitters. Such pins may have an output of from −3 kV to +7.5 kV in pulsed DC mode, which facilitates allowing positive to negative charged ion ratios of from 80:20 to 20:80. Accordingly, the deionizer device 1447 In other embodiments the order of the deionizer device 1447, vacuum tensioner 1442 and counter rotating brushes 1440 may vary. In another embodiment, electrical charge buildup may be prevented by grounding the affected component. In this embodiment, a grounding strap or grounding wire (not shown) is electrically connected to the affected device, such as vacuum tensioner 1442, to prevent electrical charge buildup by providing the electrical charge to have a path to ground. In yet another embodiment, electrical charge buildup of components may be prevented by coating the affected device with a conductive coating to prevent charge buildup.

In one suitable embodiment, the rotational speed of the counter rotating brushes 1440 is kept sufficiently low to reduce or eliminate excessive wear or heat build-up caused by the friction of counter rotating brushes 1440 in contact with the web of electrode material from spools 1402, 1404 and 1406. In one embodiment, the counter rotating brushes 1440 are configured to smooth or otherwise reduce wrinkles present in the web of electrode material from spools 1402, 1404 and 1406. In one embodiment, the counter rotating brushes 1440 are configured to reduce or eliminate micro-wrinkles in the web of electrode material from spools 1402, 1404 and 1406. In such embodiment, the micro-wrinkles are wrinkles in the web that are too small to be removed by the deionizer 1447 or the vacuum tensioner 1442. In one such embodiment, the micro-wrinkles are defined as wrinkles that are approximately twenty percent the magnitude of macro-wrinkles that are removed by the deionizer 1447 or the vacuum tensioner 1442. In one suitable example, if a macro-level wrinkle is approximately 100 mm in magnitude in the Z-direction, micro-wrinkles will have a magnitude of 20 mm or less in the Z-direction. In other embodiments, macro-wrinkles may have a magnitude of between 1 mm to 250 mm and micro-wrinkles may have a magnitude of from 0.2 mm to about 50 mm.

In another embodiment, in addition to or alternative to the counter rotating brushes 1440, the material tensioning section 1438 includes a vacuum tensioner 1442, which includes a plurality of vacuum orifices 1444 located on a surface of the vacuum tensioner 1442 adjacent to the web of electrode material from spools 1402, 1404 and 1406. In this embodiment, a vacuum is pulled through the vacuum tensioner 1442, which creates a suction through vacuum orifices 1444. The vacuum tensioner 1442 is positioned at an angle $\alpha_{vac}$ (FIG. 14G) with respect to the vertical direction. The suction from vacuum orifices 1444 creates a fluid flow (typically air flow) across the surface of the web of electrode material from spool 1402 facing the vacuum orifices 1444. Because the fluid flow is faster across the surface of the web of electrode material from spools 1402, 1404, 1406 facing the vacuum orifices 1444 than on the opposing side of the web of electrode material from spools 1402, 1404, 1406 the effect (i.e., Bernoulli effect) pulls the web of electrode material from spools 1402, 1404 and 1406 taught against the vacuum tensioner 1442, and facilitates alignment of the tractor holes 612 with the teeth 1416 of merge sprocket 1414.

With further reference to FIG. 14B, in one suitable embodiment, the teeth 1416 of merge sprocket 1414 are tapered in a manner that facilitates the outer edges of the tractor holes 612, in the cross web direction XWD, being pulled apart as the tractor holes 612 are seated onto the teeth 1416. For example, the teeth 1416 may be tapered to have a larger cross section at a proximal end (proximal to a center of merge sprocket 1414) and continuously vary in cross-section, to a smaller cross section in a distal direction (i.e., distal to the center of merge sprocket 1414). Accordingly, the taper of the teeth 1416 applies a sufficient cross-web tension on the web of electrode material from spools 1402, 1404 and 1406 to eliminate the sag and curl of the web in the cross web direction XWD. In this embodiment, the vacuum orifices 1444 of the vacuum tensioner 1442 are only located at or near a merge point of the web of electrode material from spools 1402, 1404 and 1406 to the teeth 1416 of merge sprocket 1414, because after that point the web of electrode material from spools 1402, 1404 and 1406 is seated against the merge sprocket 1414 via the tension applied to the web of electrode material from spools 1402, 1404 and 1406 by the taper of teeth 1416.

In one embodiment, the counter rotating brushes 1440 are located, in a downstream location in the web direction WD of vacuum tensioner 1442. However, in other embodiments, counter rotating brushes are co-located with, or upstream of, vacuum tensioner 1442. In one embodiment, each of the transfer locations 1426, 1426A-X, include counter rotating brushes 1440 and a vacuum tensioner. In another embodiment, only transfer stations that transfer web of separator material include the counter rotating brushes 1440, but all transfer stations include a vacuum tensioner 1442.

Figure 19:
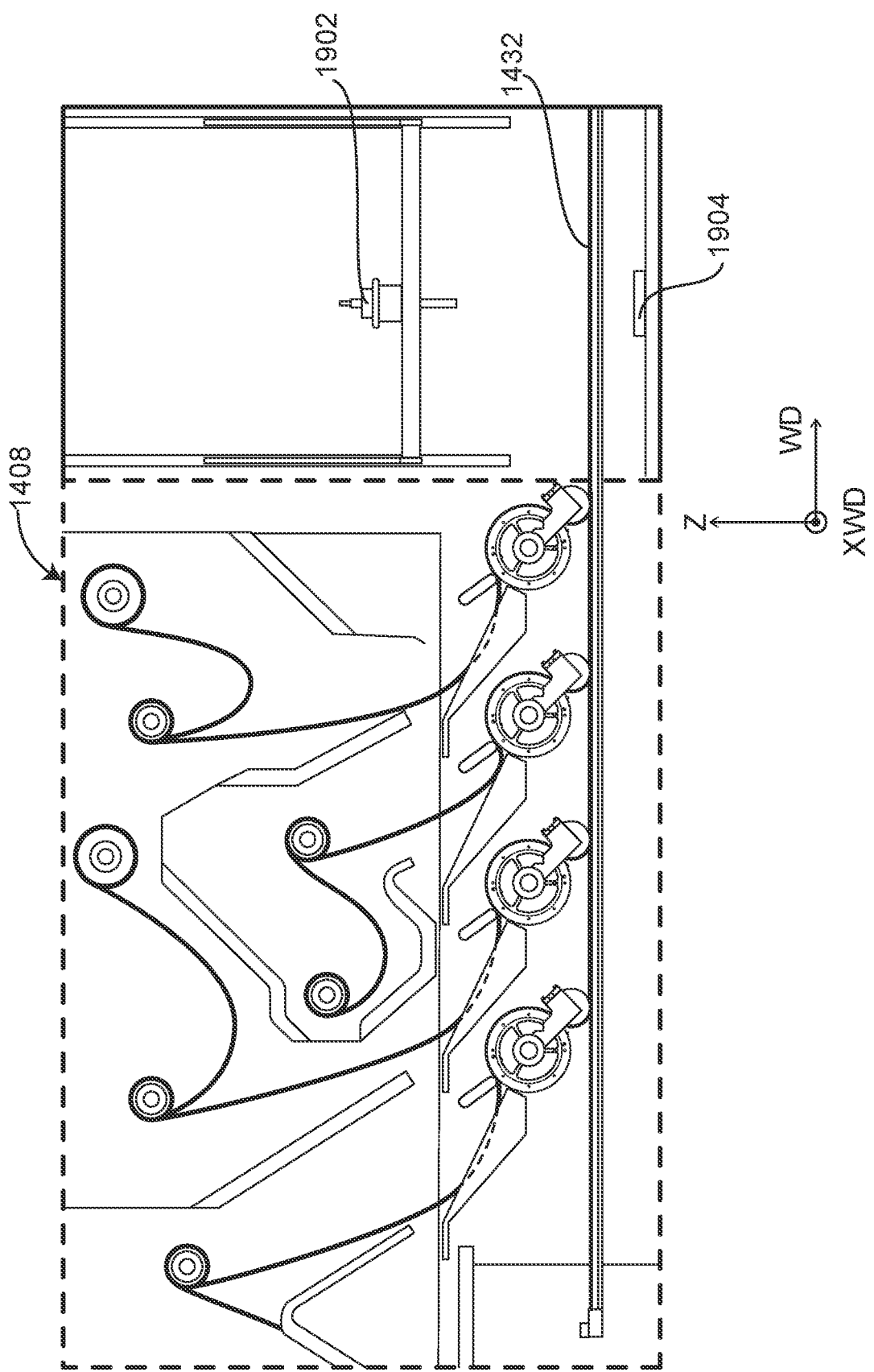
FIG. 19 is a side view of a merging section of the system of the present disclosure.

With reference to FIG. 19, in one embodiment, an alignment feature detection system 1900 is positioned downstream of the merging zone 1408. In embodiments, alignment of the layers of the merged material web are within 1 mm, when measured from a centerpoint of the layers in each of the web direction WD and cross web direction XWD. The alignment feature detection system 1900 includes an optical sensor 1902 and a back-light 1904. The optical sensor may be a digital camera or other light sensitive device capable of allowing the device to function as described herein. In this embodiment, the optical sensor 1902 is positioned such that it captures light from back-light 1904 after such light has passed through merged material web 1432, such that a silhouette of the merged material web 1432 is captured by the optical sensor 1902. The silhouette of the merged material web 1432 is analyzed by the optical sensor 1902 to accurately locate fiducial features 602. The location of fiducial features 602, as located by optical sensor 1902 may be stored by user interface 116 (FIG. 1), and used to ensure that the merged material web 1432 is precisely positioned for subsequent processing. Accordingly, the precise positioning means that each layer of merged material web is vertically aligned, for example such that a longitudinal axis $A_E$ (FIG. 7) of each electrode pattern, tractor holes 612, fiducial features 602 and edges (lengthwise edge cuts 600, perforations 608, 610) (FIG. 6) of the electrode patterns of each layer are aligned in both the web direction and cross-web direction XWD. In one embodiment, as further described below, the location, fiducial features 602, as located by optical sensor 1902 are used to control the position of the receiving unit(s) 2010 and alignment pins 2012 to align with the fiducial features 602. Accordingly, it is important that the fiducial features of each layer are in alignment. In one embodiment, the receiving unit 2010 is controlled to align a center of the alignment pins to within +/−10 um to 50 um of a center of the fiducial features 602 in the web-direction WD. In another embodiment, the receiving unit 2010 is a controller such that the center of the alignment pins 2012 are controlled to align with the fiducial features 602 in the cross-web direction XWD to within +/−10 um to 50 um.

Figure 20:
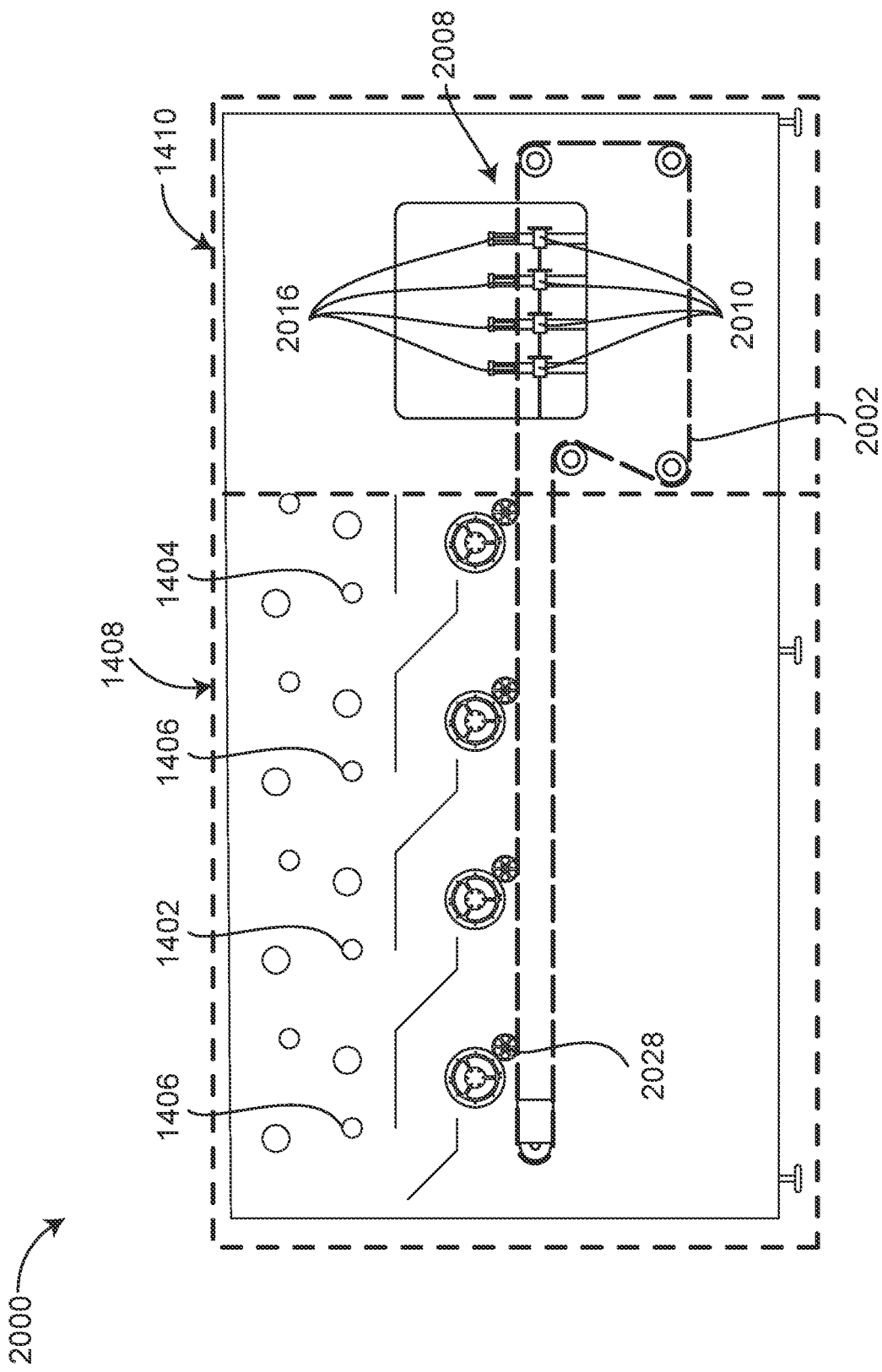
FIG. 20 is a side view of a high volume stacking system of the present disclosure.
Figure 20A:
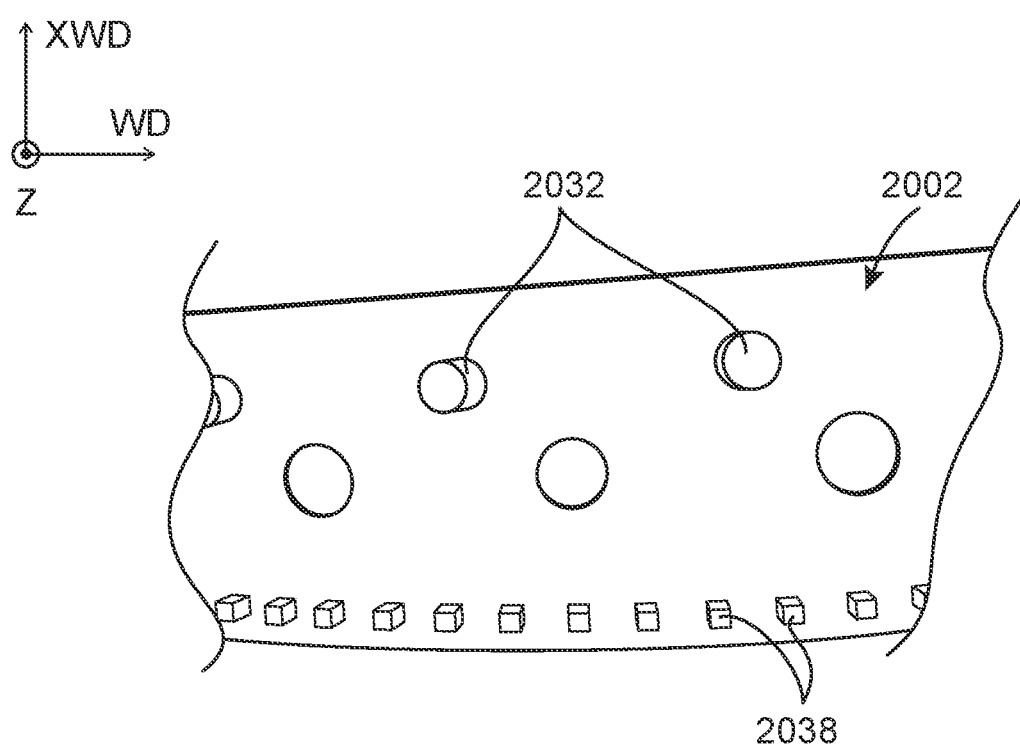
FIG. 20A is a partial close-up view of a toothed below of the high volume stacking system of FIG. 20.

With reference to FIGS. 20 and 20A, in one embodiment, a high volume stacking system 2000 is used. In this embodiment, the merging zone 1408 is similar to that as described above. However, in this embodiment, a toothed belt 2002 (denoted by the dashed line) is utilized. In one embodiment, the toothed belt 2002 comprises stainless steel and includes a population of conveying teeth 2038 (FIG. 20A) that are sized, shaped and positioned to engage one or more of the tractor holes 612 or fiducial features 602 of the web of electrode material from spools 1402, 1404 and 1406, and subsequently merged material web 1432. The toothed belt 2002 is configured to be operated in an endless configuration through the merging zone 1408 and a stacking and punching zone 2004. The toothed belt 2002 is conveyed using one or more synchronization sprockets 2006 that engage a drive portion of the toothed belt 2002 to control its speed, which is synchronized to the processes within merging zone 1408, described above.

With further reference to FIG. 20, the high volume stacking system includes an automated jig loading assembly 2008 within the punching and stacking zone 1410. The automated jig loading assembly includes one or more receiving unit 2010. In the embodiment shown in FIG. 20, there are four receiving units 2010 aligned sequentially along the path of the toothed belt 2002. In one embodiment, each of the receiving units 2010 are driven by the same actuating device to create simultaneous motion of all receiving units 2010, which may be a cam, that drives the motion of the receiving unit 2010. In other embodiments, each of the receiving unit 2010 may be independently controlled or driven.

Figure 21:
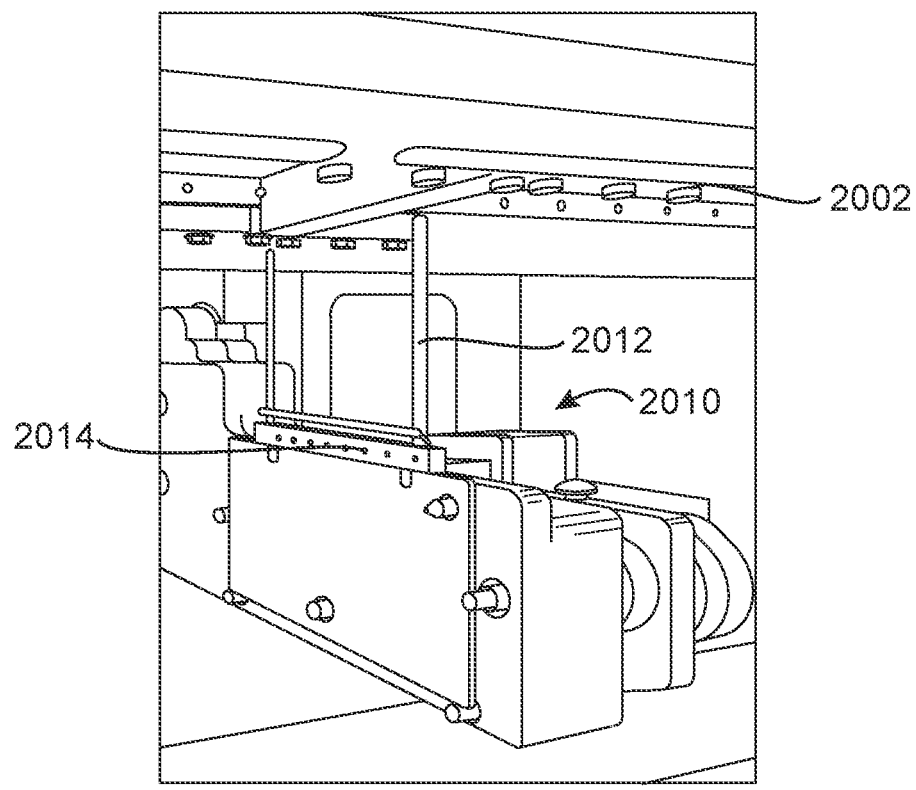
FIG. 21 is a perspective view of a receiving unit according to the present disclosure.
Figure 22:
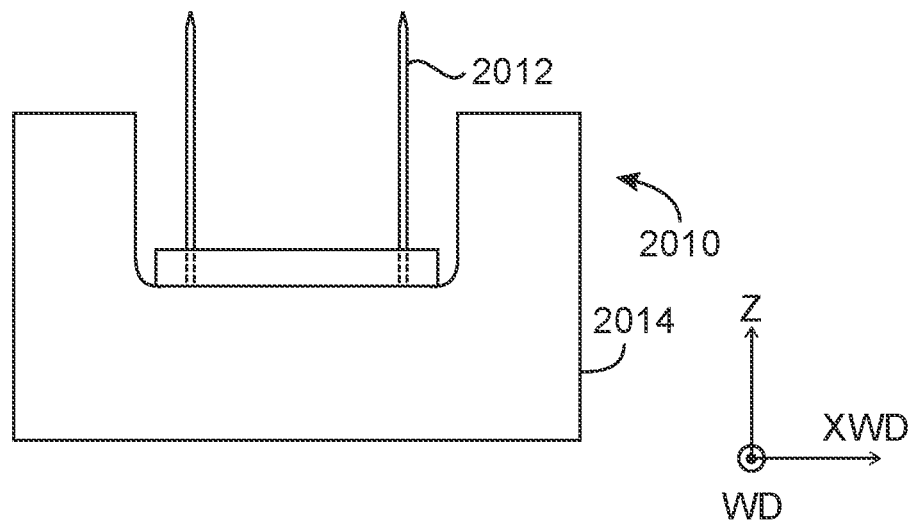
FIG. 22 is a front view of a receiving unit of FIG. 21.

With reference to FIGS. 21 and 22, each receiving unit 2010 comprises one or more alignment pins 2012 extending from a receiver base 2014. The alignment pins 2012 are configured to engage with one or more of the fiducial features 602 or tractor holes 612. Each receiving unit 2010 may be coupled to a 2-axis motion control device, such as a servo, motor or the like that allows the receiving unit 2010 to move in the cross-web direction XWD as well as the down web direction WD. In one embodiment, the motion control device is controlled based upon the location of fiducial features 602, as located by optical sensor 1902. In this embodiment, the location of fiducial features 602 is used to control the motion control device to position the receiving unit 2010 such that its alignment pins 2012 are properly positioned to pass through the corresponding fiducial features 602 of the merged material web 1432. The motion control device will be controlled to properly position the receiving unit 2010 for each punching operation performed in the punching and stacking zone 1410, as further described below.

With additional reference to FIGS. 23 and 26A-C, the punching and stacking operations are described. In this embodiment, the merged material web 1432 is conveyed from the merging zone 1408 to the punching and stacking zone 1410. The merged material web 1432 passes under a punch head 2016 and over the receiving unit 2010 as it is conveyed by toothed belt 2002, which is conveyed by one or more of the synchronization sprockets 2006. In one embodiment, the punch head 2016 is controlled to move in the Z direction (e.g., vertically) in an up-and-down motion, as indicated by the double-headed arrow. In one embodiment, the receiving unit 2010 is controlled to move in the Z direction (e.g., vertically) in an up-and-down motion, as indicated by the double-headed arrow.

Figure 24A:
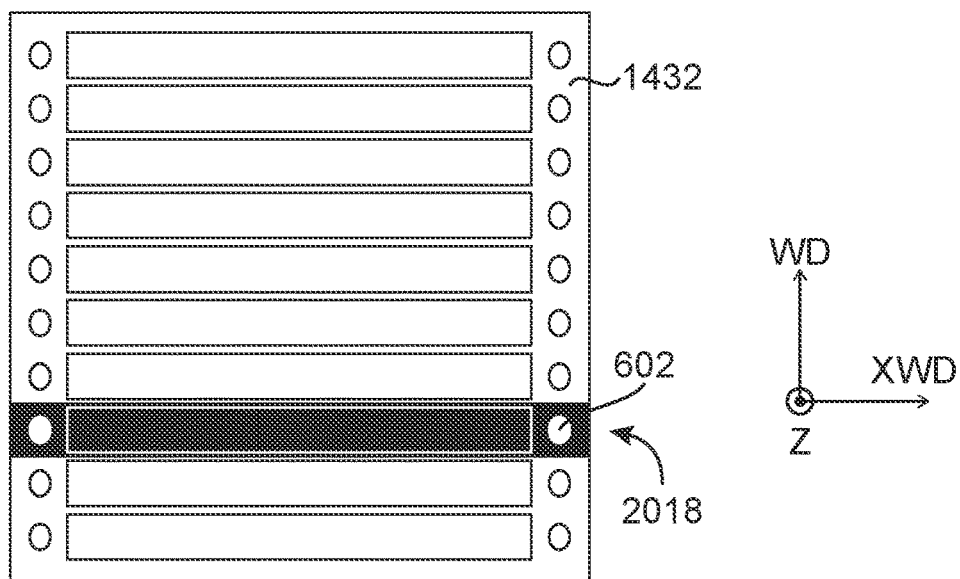
FIGS. 24A, 24B and 24C are a top view of a merged material web highlighting an electrode sub-unit, an electrode sub-unit and a series of stacked electrode sub-units of the present disclosure, respectively.
Figure 24B:
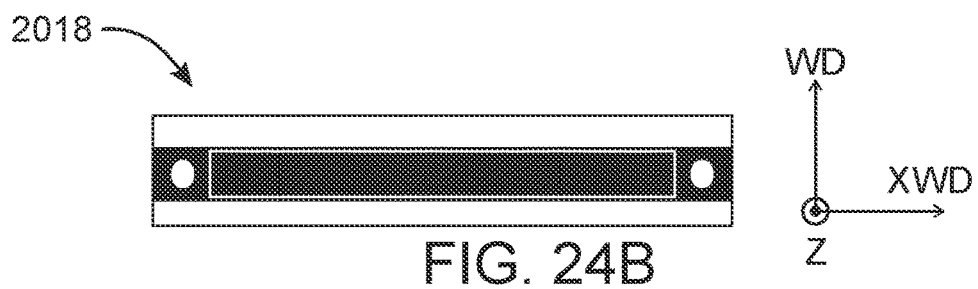
Figure 24C:
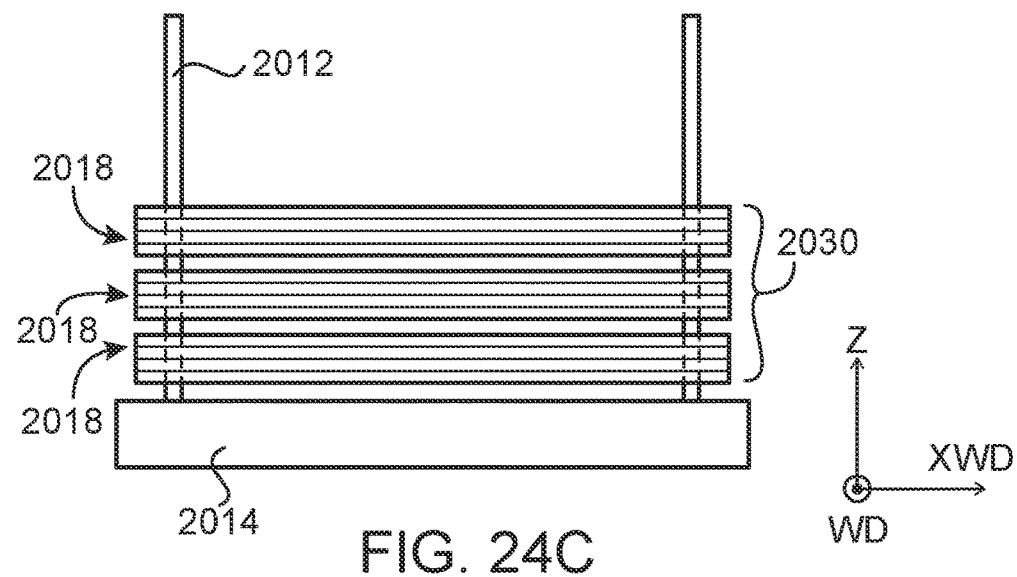
Figure 24D:
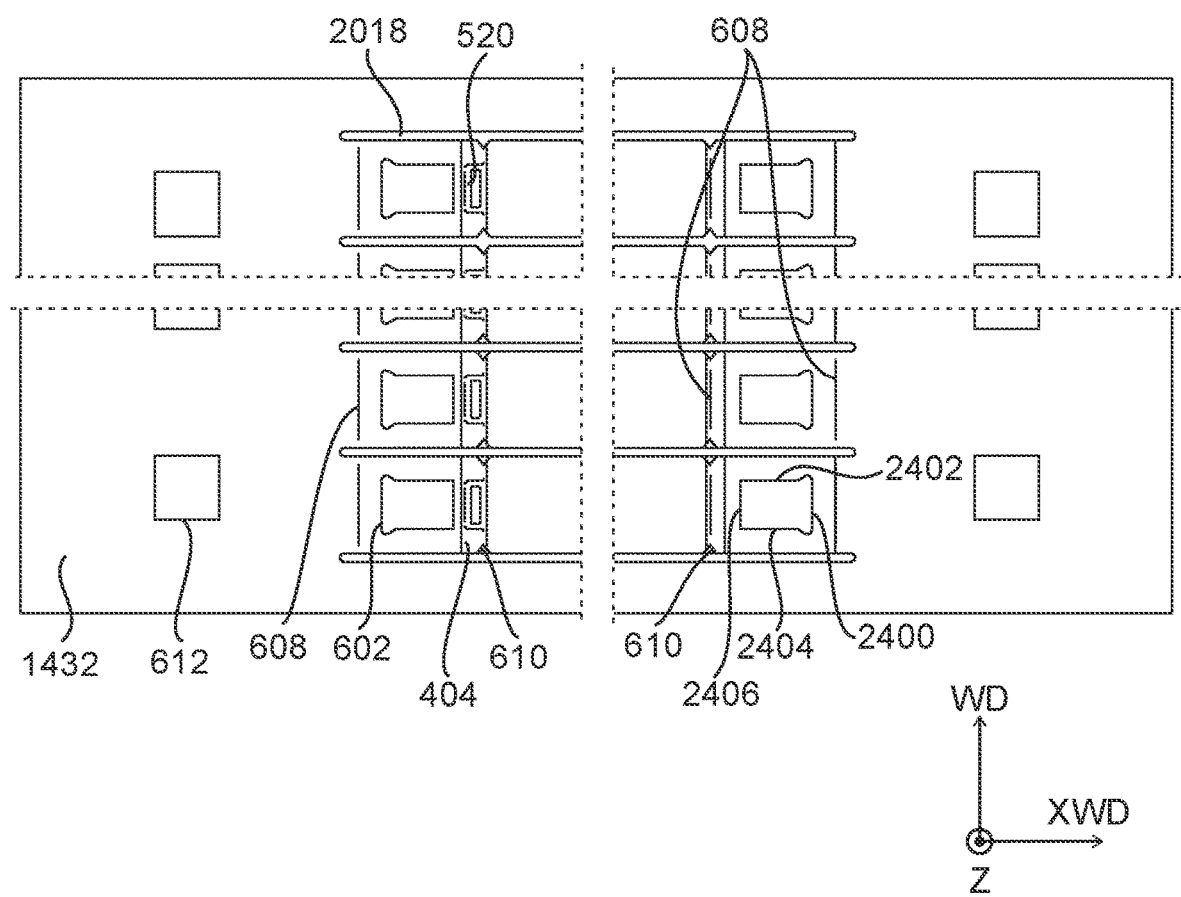
FIG. 24D is a truncated view of an embodiment of a merged material web including a population of electrode sub-units.

With reference to FIGS. 24A-C, in one embodiment, each receiving unit 2010 has a single pair of alignment pins 2012, as described above that are sized and spaced to correspond with the fiducial features 602 of each electrode sub-unit 2018. In one embodiment, the alignment pins 2012 are configured to engage only a portion of the inner perimeter of the fiducial features 602. For example, in one embodiment the fiducial features 602 have a substantially rectangular inner perimeter, and the alignment pins 2012 are configured to contact only the outer edge 2400, down-web edge 2402 and up-web edge 2404, but not the inside edge 2406 (FIG. 24D) of fiducial features 602. During a single punching operation, a single electrode sub-unit 2018 is punched and loaded onto the receiving unit 2010. In another embodiment, the alignment pins 2012 and fiducial features 602 are correspondingly sized and positioned such that there is a clearance between the alignment pins 2012 and all edges (outer edge 2400, down-web edge 2402, up-web edge 2404, and inside edge 2406) of the fiducial features 602. In this embodiment, there may be a clearance of about 50 micrometers between the alignment pin 2012 and each of outer edge 2400, down-web edge 2402, up-web edge 2404, and inside edge 2406. In other embodiments, the clearance between the alignment pin 2012 and each of outer edge 2400, down-web edge 2402, up-web edge 2404, and inside edge 2406 may be within a range of from 0 to 2000 micrometers, such as 0 micrometers, 50 micrometers, 100 micrometers, 150 micrometers, 200 micrometers, 250 micrometers, 300 micrometers, 350 micrometers, 400 micrometers, 450 micrometers, 500 micrometers, 550 micrometers, 600 micrometers, 650 micrometers, 700 micrometers, 750 micrometers, 800 micrometers, 850 micrometers, 900 micrometers, 950 micrometers, 1000 micrometers, 1050 micrometers, 1100 micrometers, 1150 micrometers, 1200 micrometers, 1250 micrometers, 1300 micrometers, 1350 micrometers, 1400 micrometers, 1450 micrometers, 1500 micrometers, 1550 micrometers, 1600 micrometers, 1650 micrometers, 1700 micrometers, 1750 micrometers, 1800 micrometers, 1850 micrometers, 1900 micrometers, 1950 micrometers and 200 micrometers. In one embodiment, the clearance between the alignment pin 2012 and down-web edge 2402 and up-web edge 2404 are each within the range of from 50 micrometers to 2000 micrometers. In yet other embodiments, the clearance between the alignment pin 2012 and each of outer edge 2400, down-web edge 2402, up-web edge 2404, and inside edge 2406 may be the same or different clearances to allow the system to function as described herein.

Figure 24E:
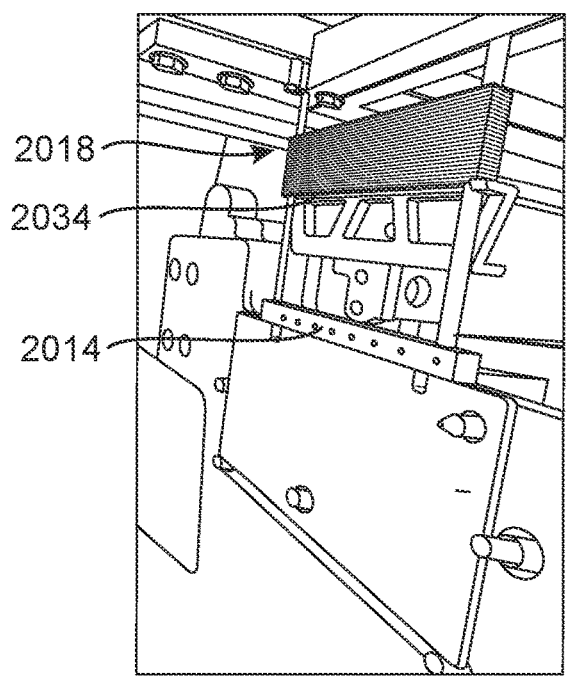
FIG. 24E is an isometric view of a receiving unit of the present disclosure.
Figure 24F:
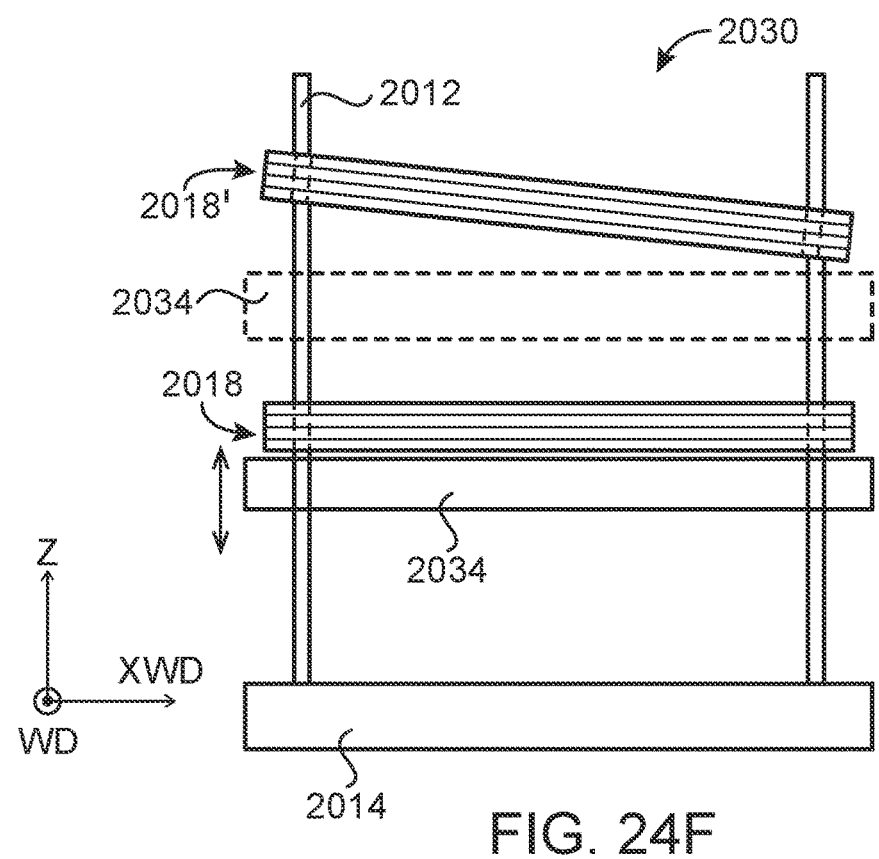
FIG. 24F is a front view illustrating a receiving unit having a population of electrode sub-units being stacked thereon.

As shown in FIG. 24E, the receiving unit 2010 may include a movable platform 2034 that moves in the Z-direction and maintains a Z-direction force in the direction toward the punch head 2016. The movable platform 2034 may also be referred to as an elevator herein. The movable platform 2034 is controlled to move in close proximity to merged material web 1432 during the punching process to prevent uneven shifting of the electrode sub-unit, as shown at 2018' as the electrode sub-unit 2018 is separated from the merged material web 1432. It should also be appreciated that any misalignment of the layers of an electrode sub-unit 2018, for example if the fiducial features 602 of each layer are not precisely aligned in the web direction WD and cross web direction XWD (e.g., causing a reduced cross sectional area), it may create additional friction on alignment pins 2012 causing uneven shifting of the electrode sub-unit, as shown at 2018'. In one embodiment, the movable platform 2034 is controlled to contact the electrode sub-unit 2018 of merged material web 1432 (e.g., zero clearance). In other embodiments, the movable platform 2034 is controlled to come within a range of from 0 to 1000 micrometers of merged material web 1432, for example, 0 micrometers, 50 micrometers, 100 micrometers, 150 micrometers, 200 micrometers, 250 micrometers, 300 micrometers, 350 micrometers, 400 micrometers, 450 micrometers, 500 micrometers, 550 micrometers, 600 micrometers, 650 micrometers, 700 micrometers, 750 micrometers, 800 micrometers, 850 micrometers, 900 micrometers, 950 micrometers or 1000 micrometers. In one embodiment, the movable platform 2034 is attached to a ball-bearing slide mechanism allowing movement in the Z-direction. In one embodiment, the movable platform 2034 may be coupled to a gear drive mechanism that is driven by a stepper motor that is activated to move just prior to each punching operation and/or just subsequent to each punching operation.

Figure 26A:
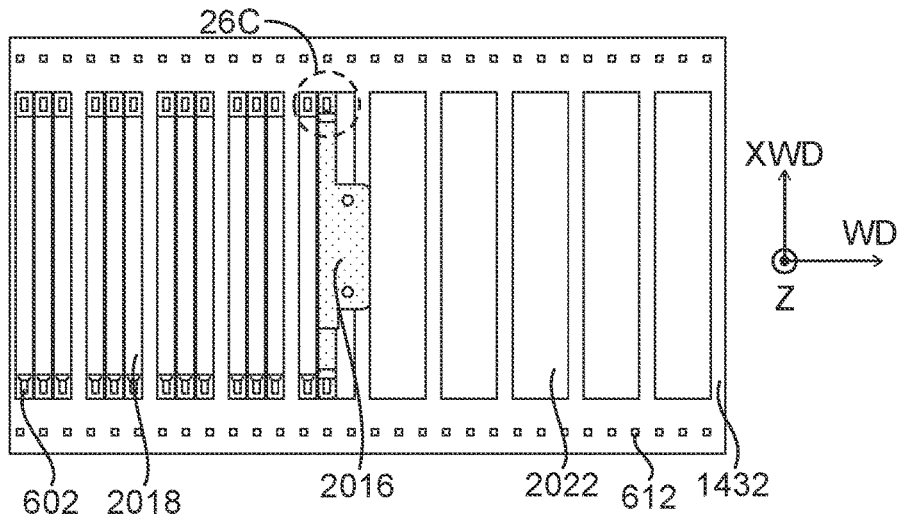
FIG. 26A is a top view of a punch head during a punching operation according to an embodiment of the present disclosure.
Figure 26B:
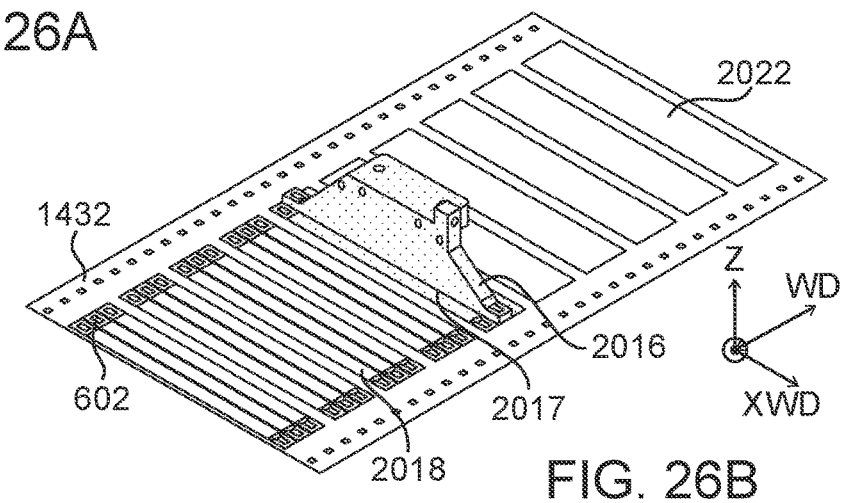
FIG. 26B is an isometric view of the punch head shown in FIG. 26A.
Figure 26C:
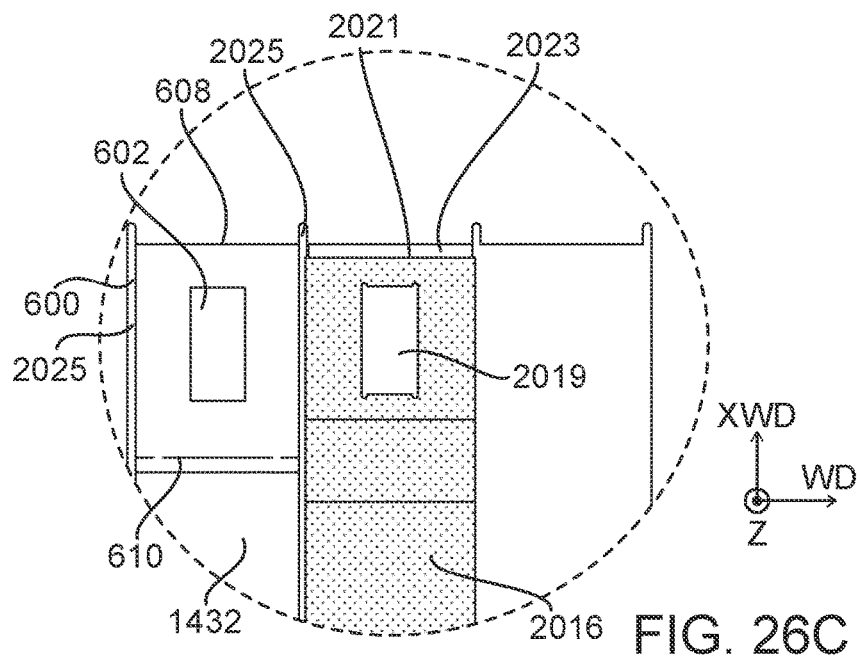
FIG. 26C is a detail view of portion 26C of FIG. 26A.

In embodiments, the punch head 2016 is made of a metal or metal alloy, such as stainless steel, aluminum, titanium, steel, other metals and alloys thereof. In other embodiments, the punch head 2016 may be made from any material that allows the system to function as described herein, such as plastics, carbon fiber, wood, and the like. The punch head should be of sufficient strength and stiffness that it does not deform as it applies the force to the electrode sub-unit 2018. With reference to FIGS. 26A-C, in one embodiment, the punch head 2016 has a punch face 2017 that is sized and shaped to substantially cover the entirety of a surface of the electrode sub-unit 2018 facing the punch face 2017. In one embodiment, punch face 2017 includes fiducial bores 2019 that are sized and shaped to be the same as, or substantially the same as fiducial features 602. Accordingly, the alignment pins 2012 may pass through the fiducial bores 2019 during the punching operations. In one embodiment, the punch head 2016 has a punch face 2017 that is sized in the cross-web direction to be slightly smaller than the electrode sub-unit 2018. For example, in one embodiment, the electrode sub-unit 2018 may have a portion 2023 that extends from 0 to 100 micrometers past distal end 2021 of punch face 2017 in the cross-web direction XWD, as shown for example in FIG. 26C. In one embodiment, the punch face 2017 may be slightly larger than the electrode sub-unit 2018 in the web direction WD, such that the punch face 2017 extends past the lengthwise edges 2025 into the lengthwise edge cuts 600 by from 0 to 100 micrometers in the web direction WD. In one embodiment, the punch face 2017 does not include any sharp cutting edges for cutting the electrode sub-unit 2018, which in some instances may cause contamination of the layers of the electrode sub-unit 2018. Rather, the punch face 2017 has blunt edges and separates the electrode sub-units 2018 from the web using a downward force to rupture perforations, as described herein.

In one embodiment, the punch head 2016 applies a Z-direction force to the electrode sub-unit 2018 which transmits such force to the movable platform 2034, which exerts an opposing force thereto (e.g., by controlling the stepper motor to create a holding torque). In one embodiment, these opposing forces cause a slight compression in the electrode sub-unit that facilitates overcoming the static friction between the alignment pins and the fiducial features 602 of the electrode sub-unit 2018, which facilitates maintaining parallelism of the electrode sub-unit 2018 with an ideal plane that is perpendicular to the alignment pins 2012. In one embodiment, the force exerted by the punch head 2016 to the movable platform 2034 causes the movable platform 2034 to move in the Z-direction a distance equal to the height of the electrode sub-unit 2018, thus rupturing the weakened region along the path formed by lengthwise edge cuts 600 and first perforations 608, and thus ready to accept the next electrode sub-unit 2018. In another embodiment, the movable platform 2034 may be controlled to move away from the punch head 2016 in the Z-direction, for example by use of the stepper motor, a predetermined distance equal to the z-direction dimension of an electrode sub-unit 2018 after each electrode sub-unit 2018 has been punched by punch head 2016. The movable platform 2034 thus facilitates maintaining the electrode sub-units perpendicular to the alignment pins 2012 during the punching operation.

As shown in FIG. 24C, for example, the merged material web 1432 may then advance to place an additional electrode sub-unit 2018 in position to be punched and stacked, and this process may continue until a predetermined number of electrode sub-units 2018 are loaded onto the receiving unit 2010. In the embodiment shown in FIG. 24C there are three stacked electrode sub-units 2018, but it should be appreciated that any number of electrode sub-units may be stacked on receiving unit 2010. In embodiments, the number of electrode sub-units 2018 that are stacked may be in the range of from 1 to 300. In the present embodiment, each electrode sub-unit comprises four layers, but may comprise any number of layers in accordance with the present disclosure.

In one embodiment, prior to initiating a punching operation, the high volume stacking system 2000 verifies that there are no defects (as determined by the electrode defect sensor 1434) in an electrode sub-unit 2018, in the event a defect is detected, the system is controlled to avoid punching and stacking of the defective electrode sub-unit 2018. In one embodiment, where multiple receiving units 2010 and corresponding punch heads 2016 are used, if a defect is found on one of the electrode sub-units 2018, all of the receiving units 2010 and corresponding punch heads 2016 are controlled to skip the punching and stacking operation, and the merged material web 1432 is conveyed forward to a position such that all receiving units 2010 and corresponding punch heads 2016 are aligned under defect-free electrode sub-units 2018.

In one embodiment, in order to separate each of the electrode sub-units 2018 from the merged material web 1432, the punch head 2016 is moved in the Z-direction toward the merged material web 1432, for example to within about 0.15 mm to about 0.50 mm from the surface of the merged material web. The alignment pins 2012 of the receiving jig are controlled to move in the Z-direction toward the opposing surface of the merged material web 1432. Alignment of the alignment pins 2012 and punch head 2016 may be verified using optical sensor 1902. If it is determined that the alignment pins 2012 are not properly aligned with the punch head 2016, one or more of the punch head 2016, receiving unit 2010 or merged material web 1432 may be moved in the web direction WD until satisfactory alignment is achieved. In such embodiment, one or more of receiving unit 2010 and punch head 2016 may be configured for translation in the web direction via a motorized carriage assembly (not shown). Once satisfactory alignment of alignment pins 2012 and punch head 2016 are achieved, the receiving unit is moved in the Z-direction such that the alignment pins 2012 move through the fiducial features 602 and into corresponding punch head holes 2020 in the punch head 2016. In one embodiment, the alignment pins 2012 enter at least 2 mm into the punch head holes 2020. In one embodiment, the punch head holes 2020 are sized and shaped to closely match the outer diameter of the alignment pins 2012 to minimize any shifting or misalignment during the punching and stacking operation.

Next, the punch head 2016 is controlled to move in the Z-direction toward receiving unit 2010, for example at least 5 mm past the opposing surface of the merged material web 1432. As the punch head 2016 moves, the electrode sub-unit 2018 is separated from the merged material web 1432 along a weakened region forming an outer perimeter of the electrode sub-unit 2018. For example, the weakened region may comprise the path along lengthwise edge cuts 600 and first perforations 608 (FIG. 6) of the electrode patterns of each layer. In such embodiments, the first perforations 608 are ruptured, freeing the electrode sub-unit 2018 from the merged material web 1432. The web downstream of such punched-out electrode sub-units 2018 is referred to as spent web 2022. In one embodiment, layers of merged material web 1432 have been placed such that web of anode material from spool 1404 is on top (i.e., to be contacted by punch head 2016). In another embodiment, layers of merged material web 1432 have been placed such that web of cathode material from spool 1402 is on top (i.e., to be contacted by punch head 2016). In another embodiment, layers of merged material web 1432 have been placed such that web of separator material from spool 1406 is on top (i.e., to be contacted by punch head 2016). In some embodiments, it is preferred that either the web of anode material from spool 1404 or the web of cathode material from spool 1402 is contacted by the punch head 2016 because they have higher mass than web of separator material from spool 1406. Accordingly, in such embodiments, the web of anode material from spool 1404 and web of cathode material from spool 1402 are less likely to be pulled back up in the Z-direction away from merged material web 1432 when the punch head 2016 retracts after the punching operation. For example, in embodiments where the web of separator material from spool 1406 is low-mass, it may under certain conditions be drawn up with the punch head 2016 as it retracts due to a vacuum effect. In such embodiments, it is thus desirable to have the merged material web 1432 have its top layer be either web of anode material from spool 1404 or web of cathode material from spool 1402 to avoid such effect.

After the electrode sub-unit has been separated from the merged material web 1432, the punch head 2016 moves in the Z direction away from the receiving unit 2010 and the receiving unit moves in the Z direction away from the punch head 2016. In one embodiment, both the punch head 2016 and the receiving unit 2010 both move simultaneously. In other embodiments, each of the punch head 2016 and the receiving unit 2010 are controlled to move sequentially. In one embodiment, each of the punch head 2016 and the receiving unit 2010 are moved to a distance of about 0.5 mm away from the respective surfaces of the merged material web 1432 in the Z-direction.

Figure 23:
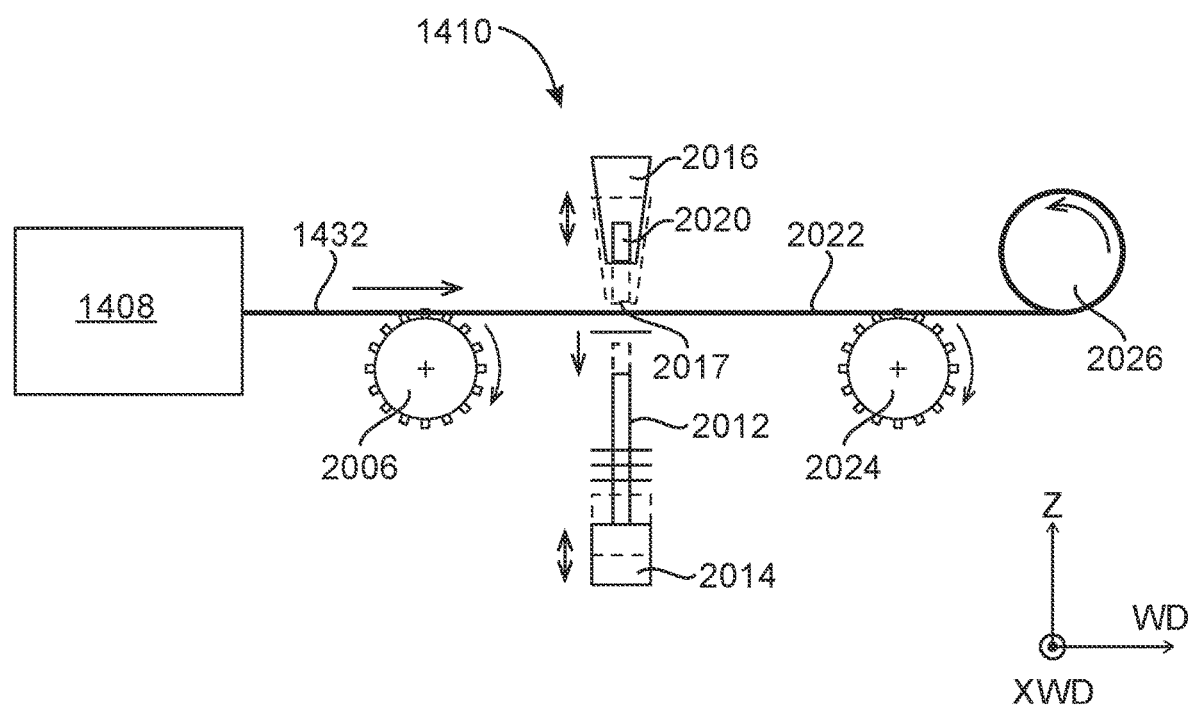
FIG. 23 is a schematic view of an embodiment of a punching and stacking system of the present disclosure.

It should be appreciated that although FIG. 23 illustrates only a single punch head 2016 and receiving unit 2010, that in other embodiments a population of corresponding punch heads 2016 and receiving units 2010 may be used simultaneously to increase the number of electrode sub-units separated from the merged material web 1432 during a unit of time. For example, in one embodiment, such as that shown in FIG. 20, a series of four punch heads 2016 and receiving units 2010 are used. In yet other embodiments, there may be from 1 to 100 each of punch heads 2016 and receiving units 2010 running simultaneously. It is further noted that in some embodiments, the above punching and stacking operations are performed intermittently (i.e., while the merged material web is stopped). However, in other embodiments, the system may be configured such that the punching and stacking operations are continuous, such that the merged material web remains in motion in the web direction WD during the punching and stacking operations.

Figure 25:
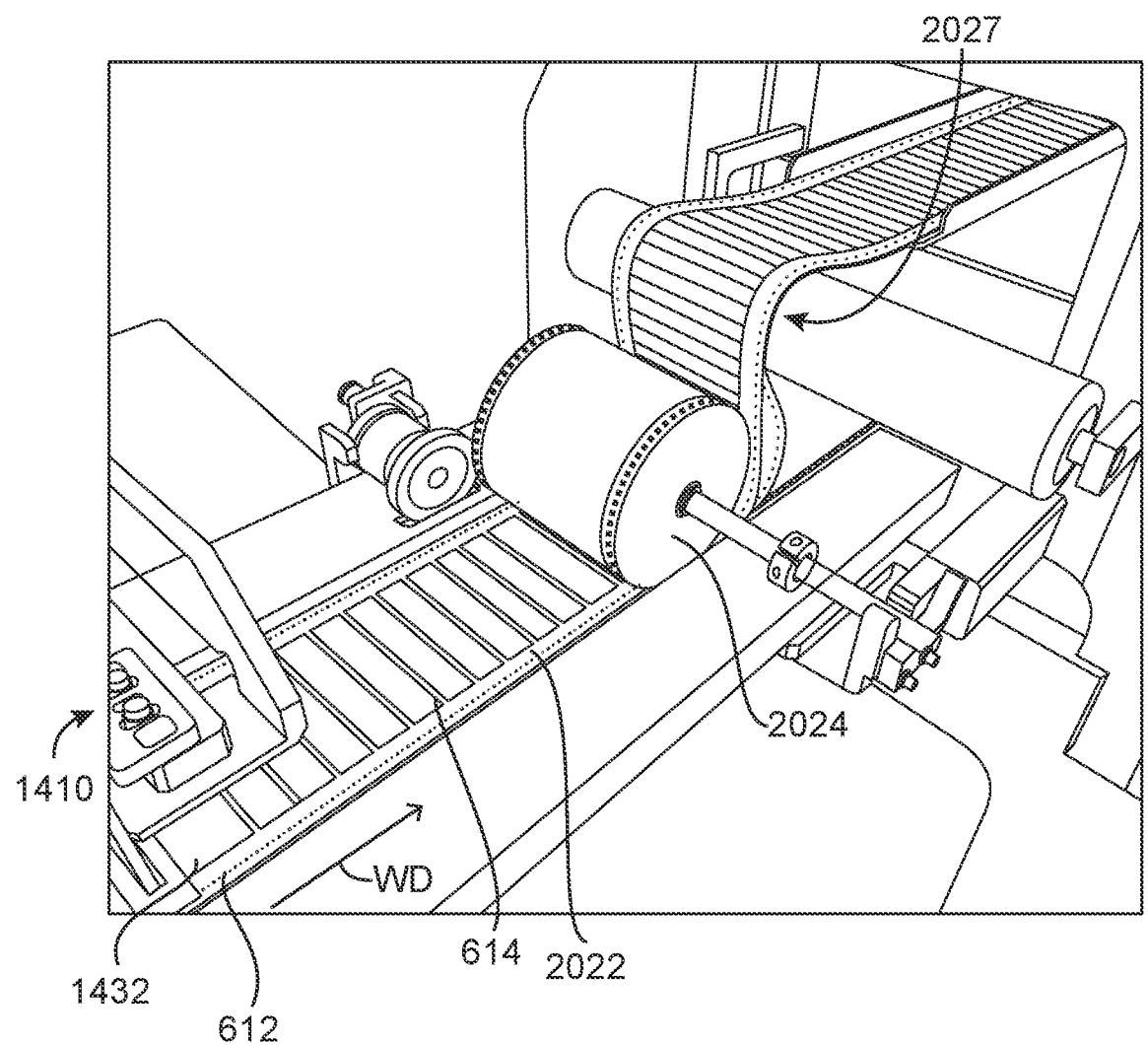
FIG. 25 is an isometric view of a de-merge sprocket of the punching and stacking system of the present disclosure.

After the electrode sub-unit has been separated from the merged material web 1432, the downstream remaining web is referred to as spent web 2022, which is conveyed in the web direction WD using a de-merge sprocket 2024 (FIG. 25) that engages with the tractor holes 612 of the spent web 2022. For example, as shown in FIG. 25, the spent web 2022 includes the portion of the web having tractor holes 612 and tie bars 614. The spent web may also include any unpunched electrode sub-units 2027, that were not punched due to a misalignment or other defect in one or more of the unpunched electrode sub-units 2027. In one embodiment, the spent web 2022 is re-wound onto a spent web take-up roller 2026. The spent web 2022 is thus cleanly removed from the toothed belt 2002, which thus facilitates toothed belt 2002 to progress forward in the web-direction WD, in a continuous loop manner, to receive merged material web 1432 to be processed.

In one embodiment, the high volume stacking system 2000 includes one or more cross-web belt tensioners 2028. The cross-web belt tensioners 2028 are configured to engage with a secondary set of teeth 2032 (FIG. 20A) of the toothed belt 2002. The secondary set of teeth 2032 are located on an opposing side of the toothed belt 2002 from where the sprocket 2006 engages the toothed belt 2002. The cross-web belt tensioners 2028 function to provide a cross-web tension on the merged material web 1432 in the cross-web direction to facilitate alignment and positioning of the fiducial features 602. In one embodiment, the cross-web belt tensioners 2028 include a set of inverted teeth that engage the secondary set of teeth 2032. The cross-web belt tensioners may be affixed to a servo, motor or other motion control device to move the cross-web-belt tensioners 2028 in the cross-web direction XWD. As the cross-web belt tensioners 2028 are moved outwardly (away from a center of the web) in the cross-web direction XWD, the cross-web tension on the merged material web 1432 is increased. Likewise, as the cross-web belt tensioners 2028 are moved inwardly (in a direction toward a center of the web) in the cross-web direction, a reduction in cross-web tension is effected on the merged material web 1432. Each of the cross-web belt tensioners 2028 may be individually controlled to apply a different amount of cross-web tension on the merged material web 1432 at different points along the path of travel of the merged material web 1432. Accordingly, the cross-web belt tensioners 2028 function to facilitate flattening (e.g., de-wrinkling, de-curling, de-sagging, etc.) of the merged material web 1432. In some embodiments a cross-web belt tension within the range of 0 to 50 percent of the rupture strength of outer perforations 608 is provided by the cross-web belt tensioners 2028. In embodiments, the cross-web belt tensioners 2028 are beneficial to prevent misalignment of the fiducial features 602 due to deformation caused by sagging, wrinkling or curving by flattening the merged material web 1432.

In some embodiments, if sufficient down-web tension is applied to the merged material web 1432 by synchronization sprockets 2006, the merged material web 1432 may stretch in the down-web direction, causing the fiducial features 602 to be spaced further apart in the down-web direction than intended. In such embodiments, the toothed belt 2002 is controlled to reduce its speed, which causes a corresponding reduction in the down-web tension on the merged material web 1432 in the web direction WD, or alternatively the toothed belt 2002 may be controlled to increase speed which causes a corresponding increase in the tension on the merged material web 1432 in the web direction WD.

During the punching operation, the electrode sub-unit 2018 is configured to separate from the merged material web 1432 in a predetermined manner defined by the strength of the outer perforations 608 and the inner perforations 610 (FIG. 15A). In one embodiment, the outer perforations have a lower rupture strength (i.e., break easier) than the inner perforations 610. In this embodiment, the electrode sub-unit 2018 will separate from the merged material web along a path defined by the outer perforations 608 and the lengthwise edge cuts 600.

Figure 16C:
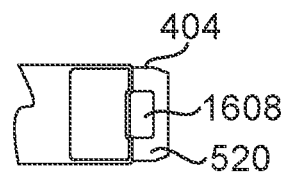
FIG. 16C is a partial top view of the multi-layer stack of FIG. 16A after rupture of a second perforation.
Figure 17:
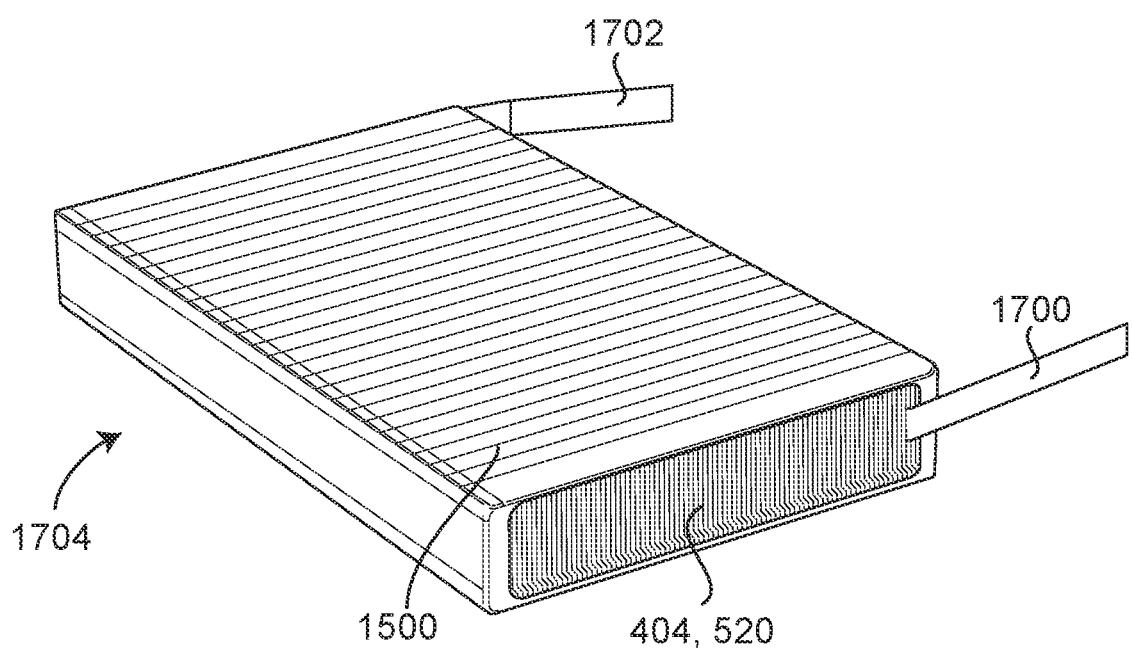
FIG. 17 is an isometric view of a stacked cell according to the current disclosure.
Figure 18A:
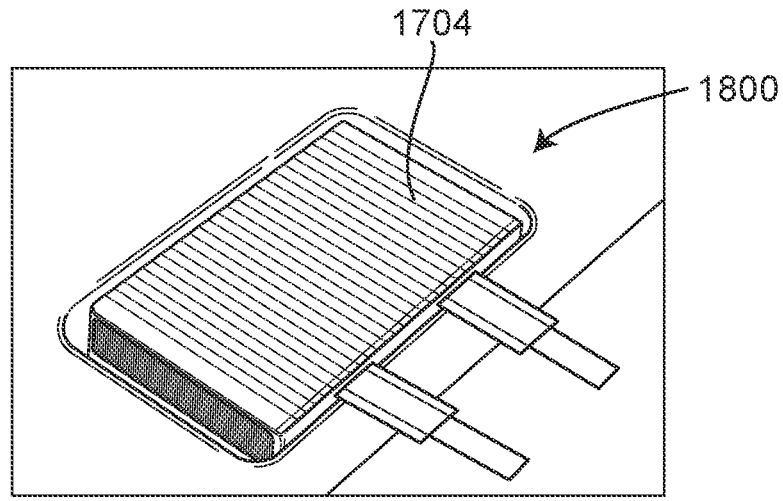
FIGS. 18A and 18B are sequential isometric views of a stacked cell having a battery package placed thereon.
Figure 18B:
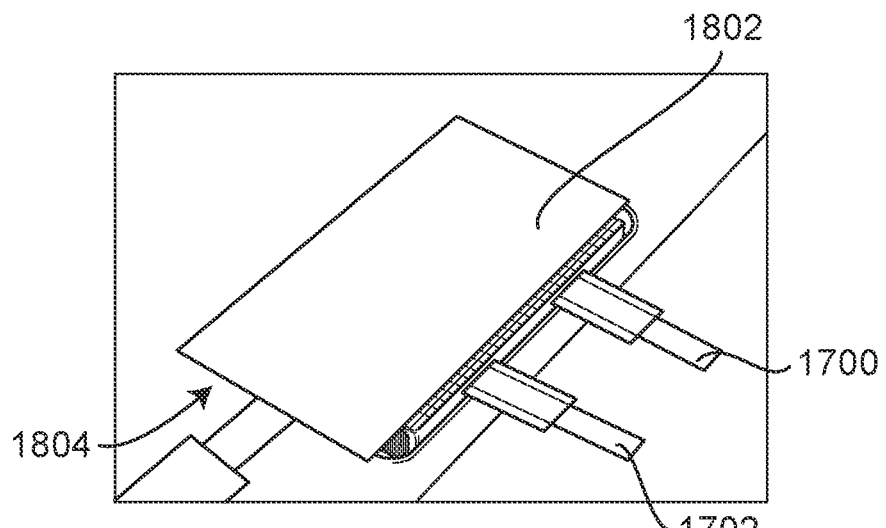

In one embodiment, a predetermined number of electrode sub-units 2018 are stacked on receiving unit 2010 to form a multi-unit electrode stack 2030 (FIG. 24C). It should be appreciated that each of the stacked electrode sub-units 2018 are aligned such that respective fiducial features 602, lengthwise edge cuts 600 and perforations (e.g., first perforation 608 and second perforation 610) are aligned in the web direction WD and cross-web direction XWD. The multi-unit electrode stack 2030 is then placed in a pressurized constraint 1602 having pressure plates 1604, 1606 which apply pressure to the multi-unit electrode stack 2030 in the directions shown by pressure arrows P. The pressure applied to the multi-unit electrode stack 2030 may be adjustable using the user interface 116 to control the pressure P applied by the pressure plates 1604, 1606 to the multi-unit electrode stack 2030. Once a sufficient pressure P has been applied to the multi-unit electrode stack 2030, alignment pins 1600 may be moved in a removal direction R, which causes second perforation 610 to rupture along its length, such that the ablations 404 (e.g., electrode tabs 520) become the outer edges of multi-unit electrode stack 2030, as shown in FIG. 16C.

After the perforations (e.g., first perforation 608 and second perforation 610) have ruptured, the multi-unit electrode stack 2030 proceeds to a tab welding station to weld bus bars 1700 and 1702 to the ablations 404 to form stacked cell 1704. Prior to welding, the bus bars 1700, 1702 are placed through the bus bar openings 1608 of the respective electrode. In one embodiment, once the bus bars 1700, 1702 have been placed through the bus bar openings 1608, the ablations 404 are folded down toward bus bars 1700, 1702 respectively, prior to welding. In this embodiment, bus bar 1700 is a copper bus bar and is welded to the ablations 404 (anode tabs) of the anode current collector layer 506, and bus bar 1702 is an aluminum bus bar and is welded to the ablations 404 (cathode tabs) of the cathode current conductor 510. However, in other embodiments, the bus bars 1700 and 1702 may be any suitable conductive material to allow battery 1804 to function as described herein. The welds may be made using a laser welder, friction welding, ultrasonic welding or any suitable welding method for welding bus bars 1700, 1702 to the electrode tabs 520. In one embodiment, each of the bus bars 1700 and 1702 are in electrical contact with all of the electrode tabs 520 for the anode and cathode, respectively.

Upon formation of the stacked cell 1704, the stacked cell proceeds to a packaging station 1800. At the packaging station 1800, the stacked cell 1704 is coated with an insulating packaging material, such as a multi-layer aluminum polymer material, plastic, or the like, to form a battery package 1802. In one embodiment, the battery package 1802 is evacuated using a vacuum and filled through an opening (not shown) with an electrolyte material. The insulating packaging material may be sealed around stacked cell 1704 using a heat seal, laser weld, adhesive or any suitable sealing method. The bus bars 1700 and 1702 remain exposed, and are not covered by battery package 1802 to allow a user to connect the bus bars to a device to be powered, or to a battery charger. Once the battery package 1802 is placed on stacked cell 1704, it defines a completed battery 1804. In this embodiment, the completed battery is a 3-D lithium ion type battery. In other embodiments, the completed battery may be any battery type suitable for production using the devices and methods described herein.

Figure 6A:
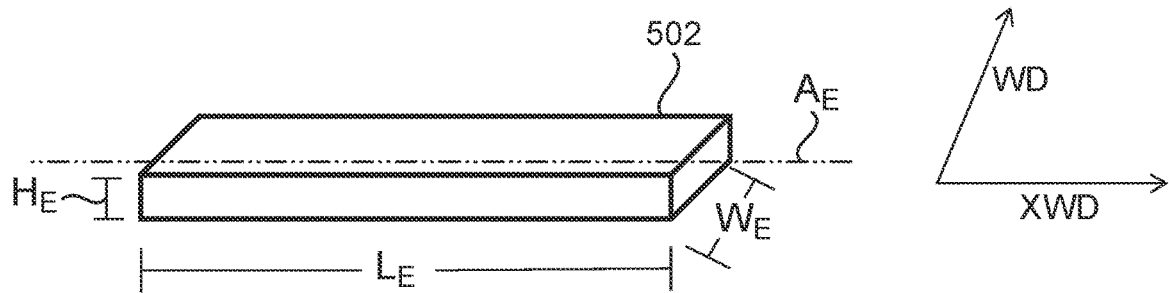
FIG. 6A is a perspective view of a portion of the web of base material as an exemplary negative electrode.

In one embodiment, each member of the anode population has a bottom, a top, and a longitudinal axis $A_E$ (FIG. 7). In one embodiment, the longitudinal axis $A_E$ extends in the cross-web direction XWD from the bottom to the top thereof. In an alternative embodiment, the longitudinal axis $A_E$ extends in the down-web direction WD from the bottom to the top thereof. In one embodiment, a member of the anode population is formed from the web of base material 104 being anode material 502. Additionally, each member of the anode population has a length ($L_E$) (FIG. 6A) measured along the longitudinal axis ($A_E$) of the electrode, a width ($W_E$) measured in the direction in which the alternating sequence of negative electrode structures and positive electrode structures progresses (i.e., the web direction WD), and a height ($H_E$) (FIG. 6A) measured in a direction ("Z-direction") that is orthogonal to each of the directions of measurement of the length ($L_E$) and the width ($W_E$). Each member of the anode population also has a perimeter ($P_E$) that corresponds to the sum of the length(s) of the side(s) of a projection of the electrode in a plane that is normal to its longitudinal axis.

The length ($L_E$) of the members of the anode population members will vary depending upon the energy storage device and its intended use. In general, however, the members of the anode populations will typically have a length ($L_E$) in the range of about 5 mm to about 500 mm. For example, in one such embodiment, the members of the anode population have a length ($L_E$) of about 10 mm to about 250 mm. By way of further example, in one such embodiment the members of the anode population have a length ($L_E$) of about 25 mm to about 100 mm.

The width ($W_E$) of the members of the anode population will also vary depending upon the energy storage device and its intended use. In general, however, each member of the anode population will typically have a width ($W_E$) within the range of about 0.01 mm to 2.5 mm. For example, in one embodiment, the width ($W_E$) of each member of the anode population will be in the range of about 0.025 mm to about 2 mm. By way of further example, in one embodiment, the width ($W_E$) of each member of the anode population will be in the range of about 0.05 mm to about 1 mm.

The height ($H_E$) of the members of the anode population will also vary depending upon the energy storage device and its intended use. In general, however, members of the anode population will typically have a height ($H_E$) within the range of about 0.05 mm to about 10 mm. For example, in one embodiment, the height ($H_E$) of each member of the anode population will be in the range of about 0.05 mm to about 5 mm. By way of further example, in one embodiment, the height ($H_E$) of each member of the anode population will be in the range of about 0.1 mm to about 1 mm. According to one embodiment, the members of the anode population include one or more first electrode members having a first height, and one or more second electrode members having a second height that is other than the first. In yet another embodiment, the different heights for the one or more first electrode members and one or more second electrode members may be selected to accommodate a predetermined shape for an electrode assembly (e.g., multi-layer electrode sub-stack 1500 (FIG. 15)), such as an electrode assembly shape having a different heights along one or more of the longitudinal and/or transverse axis, and/or to provide predetermined performance characteristics for the secondary battery.

In general, members of the anode population have a length ($L_E$) that is substantially greater than each of its width ($W_E$) and its height ($H_E$). For example, in one embodiment, the ratio of $L_E$ to each of $W_E$ and $H_E$ is at least 5:1, respectively (that is, the ratio of $L_E$ to $W_E$ is at least 5:1, respectively and the ratio of $L_E$ to $H_E$ is at least 5:1, respectively), for each member of the anode population. By way of further example, in one embodiment the ratio of $L_E$ to each of $W_E$ and $H_E$ is at least 10:1. By way of further example, in one embodiment, the ratio of $L_E$ to each of $W_E$ and $H_E$ is at least 15:1. By way of further example, in one embodiment, the ratio of $L_E$ to each of $W_E$ and $H_E$ is at least 20:1, for each member of the anode population.

In one embodiment, the ratio of the height ($H_E$) to the width ($W_E$) of the members of the anode population is at least 0.4:1, respectively. For example, in one embodiment, the ratio of $H_E$ to $W_E$ will be at least 2:1, respectively, for each member of the anode population. By way of further example, in one embodiment the ratio of $H_E$ to $W_E$ will be at least 10:1, respectively. By way of further example, in one embodiment the ratio of $H_E$ to $W_E$ will be at least 20:1, respectively. Typically, however, the ratio of $H_E$ to $W_E$ will generally be less than 1,000:1, respectively. For example, in one embodiment the ratio of $H_E$ to $W_E$ will be less than 500:1, respectively. By way of further example, in one embodiment the ratio of $H_E$ to $W_E$ will be less than 100:1, respectively. By way of further example, in one embodiment the ratio of $H_E$ to $W_E$ will be less than 10:1, respectively. By way of further example, in one embodiment the ratio of $H_E$ to $W_E$ will be in the range of about 2:1 to about 100:1, respectively, for each member of the anode population.

Figure 6B:
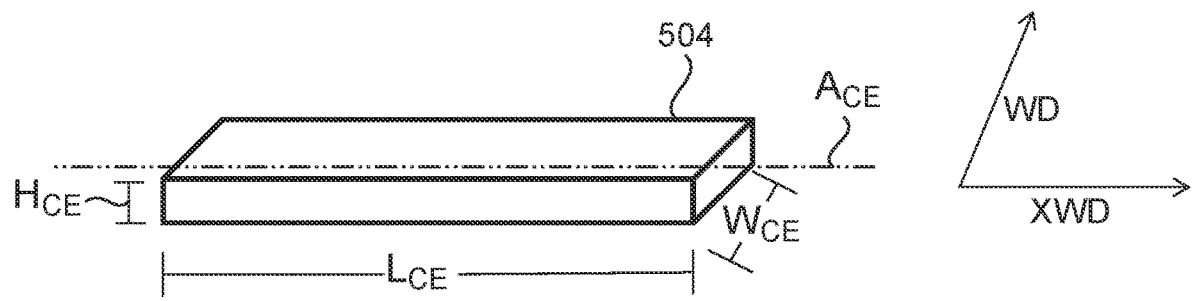
FIG. 6B is a perspective view of a portion of the web of base material as an exemplary positive electrode.

In one embodiment, a member of the cathode population is formed from the web of base material 104 being cathode material 504. Referring now to FIG. 6B, each member of the cathode population has a bottom, a top, and a longitudinal axis ($A_{CE}$) extending from the bottom to the top thereof in the cross-web direction XWD and in a direction generally perpendicular to the direction in which the alternating sequence of negative electrode structures and positive electrode structures progresses. Additionally, each member of the cathode population has a length ($L_{CE}$) measured along the longitudinal axis ($A_{CE}$) which is parallel to the cross-web direction XWD, a width ($W_{CE}$) measured in the down-web direction WD in which the alternating sequence of negative electrode structures and positive electrode structures progresses, and a height ($H_{CE}$) measured in a direction that is perpendicular to each of the directions of measurement of the length ($L_{CE}$) and the width ($W_{CE}$).

The length ($L_{CE}$) of the members of the cathode population will vary depending upon the energy storage device and its intended use. In general, however, each member of the cathode population will typically have a length ($L_{CE}$) in the range of about 5 mm to about 500 mm. For example, in one such embodiment, each member of the cathode population has a length ($L_{CE}$) of about 10 mm to about 250 mm. By way of further example, in one such embodiment each member of the cathode population has a length ($L_{CE}$) of about 25 mm to about 100 mm.

The width ($W_{CE}$) of the members of the cathode population will also vary depending upon the energy storage device and its intended use. In general, however, members of the cathode population will typically have a width ($W_{CE}$) within the range of about 0.01 mm to 2.5 mm. For example, in one embodiment, the width ($W_{CE}$) of each member of the cathode population will be in the range of about 0.025 mm to about 2 mm. By way of further example, in one embodiment, the width ($W_{CE}$) of each member of the cathode population will be in the range of about 0.05 mm to about 1 mm.

The height ($H_{CE}$) of the members of the cathode population will also vary depending upon the energy storage device and its intended use. In general, however, members of the cathode population will typically have a height ($H_{CE}$) within the range of about 0.05 mm to about 10 mm. For example, in one embodiment, the height ($H_{CE}$) of each member of the cathode population will be in the range of about 0.05 mm to about 5 mm. By way of further example, in one embodiment, the height ($H_{CE}$) of each member of the cathode population will be in the range of about 0.1 mm to about 1 mm. According to one embodiment, the members of the cathode population include one or more first cathode members having a first height, and one or more second cathode members having a second height that is other than the first. In yet another embodiment, the different heights for the one or more first cathode members and one or more second cathode members may be selected to accommodate a predetermined shape for an electrode assembly, such as an electrode assembly shape having a different heights along one or more of the longitudinal and/or transverse axis, and/or to provide predetermined performance characteristics for the secondary battery.

In general, each member of the cathode population has a length ($L_{CE}$) that is substantially greater than width ($W_{CE}$) and substantially greater than its height ($H_{CE}$). For example, in one embodiment, the ratio of $L_{CE}$ to each of $W_{CE}$ and $H_{CE}$ is at least 5:1, respectively (that is, the ratio of $L_{CE}$ to $W_{CE}$ is at least 5:1, respectively and the ratio of $L_{CE}$ to $H_{CE}$ is at least 5:1, respectively), for each member of the cathode population. By way of further example, in one embodiment the ratio of $L_{CE}$ to each of $W_{CE}$ and $H_{CE}$ is at least 10:1 for each member of the cathode population. By way of further example, in one embodiment, the ratio of $L_{CE}$ to each of $W_{CE}$ and $H_{CE}$ is at least 15:1 for each member of the cathode population. By way of further example, in one embodiment, the ratio of $L_{CE}$ to each of $W_{CE}$ and $H_{CE}$ is at least 20:1 for each member of the cathode population.

In one embodiment, the ratio of the height ($H_{CE}$) to the width ($W_{CE}$) of the members of the cathode population is at least 0.4:1, respectively. For example, in one embodiment, the ratio of $H_{CE}$ to $W_{CE}$ will be at least 2:1, respectively, for each member of the cathode population. By way of further example, in one embodiment the ratio of $H_{CE}$ to $W_{CE}$ will be at least 10:1, respectively, for each member of the cathode population. By way of further example, in one embodiment the ratio of $H_{CE}$ to $W_{CE}$ will be at least 20:1, respectively, for each member of the cathode population. Typically, however, the ratio of $H_{CE}$ to $W_{CE}$ will generally be less than 1,000:1, respectively, for each member of the anode population. For example, in one embodiment the ratio of $H_{CE}$ to $W_{CE}$ will be less than 500:1, respectively, for each member of the cathode population. By way of further example, in one embodiment the ratio of $H_{CE}$ to $W_{CE}$ will be less than 100:1, respectively. By way of further example, in one embodiment the ratio of $H_{CE}$ to $W_{CE}$ will be less than 10:1, respectively. By way of further example, in one embodiment the ratio of $H_{CE}$ to $W_{CE}$ will be in the range of about 2:1 to about 100:1, respectively, for each member of the cathode population.

In one embodiment, anode current collector 506 also has an electrical conductance that is substantially greater than the electrical conductance of the negative electrode active material layer. For example, in one embodiment the ratio of the electrical conductance of anode current collector 506 to the electrical conductance of the negative electrode active material layer is at least 100:1 when there is an applied current to store energy in the device or an applied load to discharge the device. By way of further example, in some embodiments the ratio of the electrical conductance of anode current collector 506 to the electrical conductance of the negative electrode active material layer is at least 500:1 when there is an applied current to store energy in the device or an applied load to discharge the device. By way of further example, in some embodiments the ratio of the electrical conductance of anode current collector 506 to the electrical conductance of the negative electrode active material layer is at least 1000:1 when there is an applied current to store energy in the device or an applied load to discharge the device. By way of further example, in some embodiments the ratio of the electrical conductance of anode current collector 506 to the electrical conductance of the negative electrode active material layer is at least 5000:1 when there is an applied current to store energy in the device or an applied load to discharge the device. By way of further example, in some embodiments the ratio of the electrical conductance of anode current collector 506 to the electrical conductance of the negative electrode active material layer is at least 10,000:1 when there is an applied current to store energy in the device or an applied load to discharge the device.

In general, the cathode current collector 510 may comprise a metal such as aluminum, carbon, chromium, gold, nickel, NiP, palladium, platinum, rhodium, ruthenium, an alloy of silicon and nickel, titanium, or a combination thereof (see "Current collectors for positive electrodes of lithium-based batteries" by A. H. Whitehead and M. Schreiber, Journal of the Electrochemical Society, 152(11) A2105-A2113 (2005)). By way of further example, in one embodiment, cathode current collector 510 comprises gold or an alloy thereof such as gold silicide. By way of further example, in one embodiment, cathode current collector 510 comprises nickel or an alloy thereof such as nickel silicide.

The following embodiments are provided to illustrate aspects of the disclosure, although the embodiments are not intended to be limiting and other aspects and/or embodiments may also be provided.

Embodiment 1. A process for merging webs for the production of an electrode assembly for a secondary battery, the process comprising: moving a first web of base material along a first web merge path, the first web of base material comprising (i) a population of first components for electrode sub-units, the first components delineated by corresponding weakened patterns, and (ii) a population of first conveying features; moving a second web of base material along a second web merge path, the second web of base material comprising (iii) a population of second components for the electrode sub-units, the second components delineated by corresponding weakened patterns, and (iv) a population of second conveying features; conveying a receiving member in a web merge direction adjacent the first web merge path and the second web merge path, the receiving member comprising a plurality of projections configured to engage with the first conveying features of the first web of base material and the second conveying features of the second web of base material; receiving, at a first web merge location, the first web of base material on the receiving member such that the conveying features of the first web of base material are engaged by at least some of the plurality of projections on the belt; and overlaying, at a second web merge location, the second web of base material on the first web of base material on the receiving member such that the first components are substantially aligned with the second components and the conveying features of the second web of base material are engaged by at least some of the plurality of projections on the belt, the second web merge location being spaced in a down web direction from the first web merge location.

Embodiment 2. The process of Embodiment 1 wherein the first web of base material comprises a web of electrode material and the second web of base material comprises a web of separator material.

Embodiment 3. The process of Embodiment 1 wherein the first web of base material comprises a web of separator material and the second web of base material comprises a web of electrode material.

Embodiment 4. A process for merging webs for the production of an electrode assembly for a secondary battery, the process comprising: moving a first web of base material along a first web merge path, the first web of base material comprising (i) a population of first electrode components for electrode sub-units, the first electrode components delineated by corresponding weakened patterns, and (ii) a population of first conveying features, the first web of base material comprising a web of electrode material; moving a second web of base material along a second web merge path, the second web of base material comprising (iii) a population of separator components delineated by corresponding weakened patterns and (iv) a population of second conveying features, the second web of base material comprising a web of separator material; conveying a receiving member in a web merge direction adjacent the first web merge path and the second web merge path, the receiving member comprising a plurality of projections configured to engage with the first conveying features of the web of electrode material and the second conveying features of the web of separator material; receiving, at a first web merge location, one of the web of the electrode material and the web of separator material on the belt such that the respective conveying features of the web of electrode material or the web of separator material are engaged by at least some of the plurality of projections on the belt; and overlaying, at a second web merge location, the other one of the web of the electrode material and the web of separator material on the received one of the web of the electrode material and the web of separator material such that the respective conveying features of the other one of the web of electrode material or the web of separator material are engaged by at least some of the plurality of projections on the belt and the separator structures substantially align with the first electrode structures, the second web merge location being spaced in a down web direction from the first web merge location.

Embodiment 5. The process set forth in Embodiment 4 wherein the web of electrode material is received at the first web location and the web of separator material is received at the second web location.

Embodiment 6. The process set forth in Embodiment 4 wherein the web of separator material is received at the first web location and the web of electrode material is received at the second web location.

Embodiment 7. The process set forth in any preceding Embodiment wherein the first web merge path comprises a first catenary curve, and the second merge path comprises a second catenary curve.

Embodiment 8. The process set forth in Embodiment 7 further comprising analyzing the first catenary curve and adjusting a speed of the first web of base material traveling along the first web merge path based upon the analysis of the first catenary curve such that the first conveying features align with adjacent ones of the plurality of projections on the receiving member.

Embodiment 9. The process set forth in Embodiment 8 further comprising analyzing the second catenary curve and adjusting a speed of the second web of base material traveling along the second web merge path based on the analysis of the second catenary curve such that the second conveying features align to adjacent ones of the plurality of projections on the receiving member.

Embodiment 10. The process set forth in any preceding Embodiment wherein at least one of the first web merge path and the second web merge path comprises conveying the respective first web of base material or the second web of base material over a merge sprocket having teeth that align with the respective first or second conveying features.

Embodiment 11. The process set forth in any preceding Embodiment wherein moving at least one of the first web of base material and the second web of base material along the respective first web merge path and the second web merge path comprises conveying the first web of base material and/or the second web of base material between a merge sprocket and an inverted tooth sprocket.

Embodiment 12. The process set forth in Embodiment 11, wherein the teeth of the merge sprocket pass through the respective first or second conveying features of the first web of base material and/or the second web of base material and into corresponding indentations in the inverted tooth sprocket.

Embodiment 13. The process set forth in any preceding Embodiment further comprising merging at least one of the first web of base material and the second web of base material at a point where the projections of the receiving member engages with an inverted tooth sprocket.

Embodiment 14. The process set forth in any preceding Embodiment further comprising using a rotating brush to increase the flatness of at least one of the first web of base material and the second web of base material proximal to an initial contact point of the respective web with a merge sprocket.

Embodiment 15. The process according to Embodiment 14 further comprising using a counter-rotating brush that rotates in a direction opposite to the rotating brush, the counter-rotating brush positioned in a cross-web location from the rotating brush.

Embodiment 16. The process set forth in any preceding Embodiment further comprising using a vacuum device to increase the flatness of at least one of the first web of base material and the second web of base material proximal to the initial contact point of the respective web with a merge sprocket.

Embodiment 17. The process set forth in Embodiment 16, the vacuum device comprising a base having a plurality of vacuum holes for suctioning air.

Embodiment 18. The process set forth in any preceding Embodiment further comprising reducing web-direction tension on at least one of the first web of base material and the second web of base material at an initial contact point of the respective first web of base material or the second web of base material to the merge sprocket by controlling an unwind speed of the respective first web of base material or the second web of base material.

Embodiment 19. The process set forth in any preceding Embodiment further comprising using a deionizer to reduce static electrical charge on at least one of the first web of base material or the second web of base material proximal to the initial contact point of the respective first web of base material or the second web of base material to a merge sprocket.

Embodiment 20. The process set forth in Embodiment 17 wherein the deionizer is positioned before at least one of a rotating brush and a vacuum tensioner in the web-direction.

Embodiment 21. The process set forth in any preceding Embodiment further comprising controlling an initial contact point of at least one of the first web of base material and the second web of base material with a merge sprocket to be within 0 to 90 degrees of vertical.

Embodiment 22. The process set forth in any preceding Embodiment further comprising using a cross-web belt tensioner to apply a tension in a cross-web direction to at least one of the first web of base material and the second web of base material.

Embodiment 23. The process set forth in any preceding Embodiment wherein the teeth of the merge sprocket are tapered such that a base of the teeth has a greater cross-sectional area than a distal portion of the projections.

Embodiment 24. The process set forth in any preceding Embodiment wherein the projections of the receiving member are tapered such that a base of the projections has a greater cross-sectional area than a distal portion of the projections.

Embodiment 25. The process set forth in any preceding Embodiment further comprising controlling a cross-web tension of the receiving member such that the projections of the receiving member contact only a portion of the conveying features of at least one of the first web of base material and the second web of base material.

Embodiment 26. The process set forth in any preceding Embodiment further comprising using a sensor to detect defects in at least one of the first web of base material and the second web of base material.

Embodiment 27. The process set forth in Embodiment 26 wherein using the sensor to detect defects occurs prior to merging at least one of the first web of base material and the second web of base material onto the receiving member.

Embodiment 28. The process set forth in Embodiment 26 or 27 further comprising marking the detected defects on at least one of the first web of base material or the second web of base material.

Embodiment 29. The process set forth in any preceding Embodiment further comprising controlling a web-direction tension of at least one of the first web of base material and the second web of base material to be different at an initial contact point to the merge sprocket and a point of transfer to the receiving member.

Embodiment 30. The process set forth in any preceding Embodiment further comprising positioning an inverted tooth roller vertically adjacent the belt at a sufficient distance to allow slack of at least one of the first web of base material and the second web of base material for registration of the first web of base material and/or the second web of base material to the belt.

Embodiment 31. The process set forth in any preceding Embodiment further comprising positioning a subsequent inverted tooth sprocket to have a larger nip distance between the inverted tooth sprocket and the receiving member than a nip distance for prior inverted tooth sprockets to the receiving member.

Embodiment 32. The process set forth in any preceding Embodiment wherein the teeth on the merge sprocket are configured to allow at least one of the first web of base material and the second web of base material to be positioned above a base of the teeth.

Embodiment 33. The process set forth in any preceding Embodiment further comprising (a) moving a third web of base material along a third web merge path, the third web of base material comprising (i) a population of third components for electrode sub-units, the third components delineated by corresponding weakened patterns, and (ii) a population of third conveying features, and (b) overlaying, at a third web merge location, the third web of base material on the second web of base material such that the conveying features of the third web of base material are engaged by at least some of the plurality of projections on the receiving member and the third components substantially align with the second components, the third web merge location being spaced in a down web direction from the first web merge location and the second web merge location.

Embodiment 34. The process of Embodiment 33 wherein the third web of base material comprises a web of counter-electrode material and the second web of base material comprises a web of separator material.

Embodiment 35. The process of Embodiment 33 wherein the third web of base material comprises a web of separator material and the second web of base material comprises a web of electrode material.

Embodiment 36. The process set forth in Embodiment 33, 34, or 35 further comprising moving a fourth web of base material along a fourth web merge path, the fourth web of base material comprising a population of fourth components for electrode sub-units, the fourth components delineated by corresponding weakened patterns, and a population of fourth conveying features, and overlaying, at a fourth web merge location, the fourth web of base material on the third web of base material such that the conveying features of the fourth web of base material are engaged by at least some of the plurality of projections on the receiving member and the fourth components substantially align with the third components, the fourth web merge location being spaced in a down web direction from the first web merge location, the second web merge location, and the third merge location.

Embodiment 37. The process of Embodiment 36 wherein the fourth web of base material comprises a web of counter-electrode material and the third web of base material comprises a web of separator material.

Embodiment 38. The process of Embodiment 36 wherein the fourth web of base material comprises a web of separator material and the third web of base material comprises a web of counter-electrode material.

Embodiment 39. The process set forth in any preceding Embodiment, wherein the receiving member comprises a continuous belt.

Embodiment 40. The process set forth in any preceding Embodiment, wherein the receiving member comprises a plurality of pin-plates.

Embodiment 41. The process set forth in any preceding Embodiment further comprising rotating the merge sprocket in a direction opposite to the inverted tooth sprocket.

Embodiment 42. The process set forth in any preceding Embodiment further comprising using an optical sensor to analyze a respective one of the first or second catenary curve.

Embodiment 43. The process set forth in any preceding Embodiment further comprising, increasing a web-direction tension on a respective one of the first web of base material or the second web of base material if a sag of the catenary curve is outside of a predetermined threshold.

Embodiment 44. The process set forth in any preceding Embodiment, wherein the unwind speed of the first and second web of base materials is keyed to the speed of the receiving member.

Embodiment 45. The process set forth in any preceding Embodiment, wherein the respective first or second catenary curve facilitates self-alignment of the conveying features of the first or second web of base material with the teeth of the merge sprocket.

Embodiment 46. A process for separating an electrode sub-unit from a population of electrode sub-units in a layered arrangement of stacked webs, each electrode sub-unit delineated within the stacked webs by corresponding weakened patterns, the process comprising: positioning the electrode sub-unit of the layered arrangement of stacked webs in a punching position between a receiving unit and a punch head, the receiving unit comprising a base, alignment pins, and a moveable platform, positioning the alignment pins of the receiving unit through fiducial features of the electrode sub-unit, positioning the moveable platform at a predetermined position between a lower surface of the electrode sub-unit and the base of the receiving unit, applying a force to the electrode sub-unit using the punch head, the force having sufficient magnitude to separate the electrode sub-unit from the array of stacked webs along the weakened pattern.

Embodiment 47. The process of Embodiment 46, further comprising receiving the separated electrode sub-unit onto the movable platform.

Embodiment 48. The process of Embodiment 46, further comprising maintaining the receiving unit in a stationary position while applying the force to the electrode sub-unit.

Embodiment 49. The process of Embodiments 46-48, further comprising maintaining the punch head in a stationary position during the positioning the alignment pins of the receiving unit through the fiducial features of the electrode sub-unit.

Embodiment 50. The process of Embodiments 46-49, further comprising maintaining the punch head in a stationary position while moving the alignment pins into corresponding punch head holes formed in the punch head.

Embodiment 51. The process of Embodiments 46-50, wherein separating the electrode sub-unit from the layered arrangement of stacked webs comprises rupturing a first perforation defining a first outer edge of the electrode sub unit and rupturing a second perforation defining a second outer edge of the electrode sub unit.

Embodiment 52. The process of Embodiment 51, wherein the first outer edge and the second outer edge are located on opposing sides of the electrode sub-unit.

Embodiment 53. The process of Embodiments 46-52, further comprising applying a cross-web tension to the electrode sub-unit using the alignment pins.

Embodiment 54. The process of Embodiments 46-53, further comprising contacting only a portion of each fiducial feature of the electrode sub-unit with the alignment pins.

Embodiment 55. The process of Embodiments 46-54, further comprising defining defective electrode sub-units in the population of electrode sub-units, and controlling the punch head to not separate the defective electrode sub-units from the layered arrangement of stacked webs.

Embodiment 56. The process of Embodiments 46-55, further comprising using an optical device to locate the fiducial features of the electrode sub-units.

Embodiment 57. The process of Embodiments 46-56, further comprising marking the layered arrangement of stacked webs to indicate a defective electrode sub-unit.

Embodiment 58. The process of Embodiments 46-57, further comprising applying a compressive force to the electrode sub-unit between the punch head and the receiving unit.

Embodiment 59. The process of Embodiment 58, wherein the compression is sufficient to maintain the electrode sub-unit substantially parallel to a surface of the receiving unit.

Embodiment 60. The process of Embodiments 46-59, further using a vacuum device to flatten the layered arrangement of stacked webs.

Embodiment 61. The process of Embodiments 46-60, further comprising using one or more rotating brushes to flatten the array of stacked webs.

Embodiment 62. The process of Embodiments 46-61, wherein the layered arrangement of stacked webs comprises a web of anode material, a web of cathode material, and a web of separator material disposed between the web of anode material and the web of cathode material.

Embodiment 63. The process of Embodiments 46-62, further comprising applying a cross-web tension to a conveyor belt engaged with conveying features of the array of stacked webs to flatten the web.

Embodiment 64. The process of Embodiments 46-63, further comprising using a 2-axis movement device to move the alignment pins to be in alignment with the fiducial features.

Embodiment 65. The process of Embodiments 46-64, wherein the process further comprises moving the movable platform a distance equal to a thickness of the electrode sub-unit after separating the electrode sub-unit from the layered arrangement of stacked webs.

Embodiment 66. The process of Embodiments 46-65, wherein the electrode sub-unit comprises an anode material, a cathode material and a separator material.

Embodiment 67. The process of Embodiments 46-66, wherein the array of stacked webs downstream of the punch head is an array of spent webs and the process further comprises winding the array of spent webs onto a roller.

Embodiment 68. The process of Embodiments 46-67 wherein between one to three hundred electrode sub-units are stacked onto the receiving unit.

Embodiment 69. A battery assembly including electrode sub-units formed by the process of any prior Embodiment.

Embodiment 70. The process of Embodiments 46-68 further comprising stopping web-direction motion of the layered arrangement of stacked webs during the applying the force.

Embodiment 71. The process of Embodiment 70, wherein the force is applied in a direction substantially perpendicular to both the cross-web and web-directions.

Embodiment 72. The process of Embodiments 46-68, wherein the punch head contacts anode material while applying the force.

Embodiment 73. The process of Embodiments 46-68, wherein the punch head contacts cathode material while applying the force.

Embodiment 74. The process of Embodiments 46-68, wherein the punch head contacts separator material while applying the force.

Embodiment 75. The process of Embodiments 46-68, further comprising applying a cross-web tension to the layered arrangement of stacked webs within the range of 0 to 50 percent of a rupture strength of outer perforations of the weakened pattern.

Embodiment 76. A system for separating an electrode sub-unit from a population of electrode sub-units in an array of stacked webs, the electrode sub-units delineated by corresponding weakened patterns, the system comprising: a receiving unit having at least two alignment pins extending therefrom, the alignment pins being positioned to engage with corresponding fiducial features of the electrode sub-units and facing a first surface of the electrode sub-units; a movable punch head including at least two punch head holes, the punch head holes sized and positioned to accept a corresponding one of the alignment pins, the punch head positioned to face an opposing surface of the electrode sub-units; and a controller configured to cause the punch head to apply a force to the opposing surface of the electrode sub-unit sufficient to separate the electrode sub-unit from the array of stacked webs along the weakened pattern.

Embodiment 77. A system for separating an electrode sub-unit from a population of electrode sub-units in an array of stacked webs, the electrode sub-units delineated by corresponding weakened patterns, the system comprising: a receiving unit having a base and a moveable platform, the moveable platform being selectively positionable at a predetermined position between the array of stacked webs and the base; a movable punch head positioned to face an opposing surface of the electrode sub-units; and a controller configured to cause the punch head to apply a force to the opposing surface of the electrode sub-unit sufficient to separate the electrode sub-unit from the array of stacked webs along the weakened pattern, the moveable platform of the receiving unit being selectively positioned to receive the electrode sub-unit separated from the array of stacked webs.

Embodiment 78. The system set forth in Embodiment 76 or 77 wherein the receiving unit comprises a base, the alignment pins, and the moveable platform.

Embodiment 79. The system set forth in Embodiment 78 wherein the moveable platform is configured to be moved a distance equal to a thickness of the electrode sub-unit.

Embodiment 80. The system set forth in Embodiments 76-79 wherein the controller is configured to move the moveable platform.

Embodiment 81. The system set forth in Embodiments 76-80 wherein the punch head comprises punch head holes for receiving respective ones of the alignment pins.

Embodiment 82. The system set forth in Embodiments 76-81 wherein the alignment pins of the receiving unit are adapted to apply a cross-web tension to the electrode sub-unit.

Embodiment 83. The system set forth in Embodiments 76-82 wherein the alignment pins of the receiving unit are adapted to receive respective fiducial features of the electrode sub-unit.

Embodiment 84. The system set forth in Embodiments 76-83 further comprising a defective detection system for detecting defects in the electrode sub-units.

Embodiment 85. The system set forth in Embodiments 76-84 wherein the controller is configured to operate the punch head to not separate the defective electrode sub-units from the array of stacked webs.

Embodiment 86. The system set forth in Embodiments 76-85 further comprising an optical device for locating fiducial features of the electrode sub-units.

Embodiment 87. The system set forth in Embodiments 76-86 further comprising a marking system for marking the array of stacked webs to indicate a defective electrode sub-unit.

Embodiment 88. The system set forth in Embodiments 76-87 further comprising a vacuum device to flatten the array of stacked webs.

Embodiment 89. The system set forth in Embodiments 76-88 further comprising one or more rotating brushes to flatten the array of stacked webs.

Embodiment 90. The system set forth in Embodiments 76-89 wherein the array of stacked webs comprises a web of anode material, a web of cathode material, and a web of separator material disposed between the web of anode material and the web of cathode material.

Embodiment 91. The system set forth in Embodiments 76-90 wherein the electrode sub-unit comprises an anode material, a cathode material and a separator material.

Embodiment 92. A system for merging webs for the production of an electrode assembly for a secondary battery, the system comprising: a first merging zone configured to move a first web of base material along a first web merge path, the first web of base material comprising a population of first components for electrode sub-units, the first components delineated by corresponding weakened patterns, and a population of first conveying features; a second merging zone configured to move a second web of base material along a second web merge path, the second web of base material comprising a population of second components for the electrode sub-units, the second components delineated by corresponding weakened patterns, and a population of second conveying features; and a receiving member comprising a plurality of projections, the receiving member being disposed adjacent the first web merge path and the second web merge path, the plurality of projections being configured to engage with the first conveying features of the first web of base material and the second conveying features of the second web of base material; the first merging zone being adapted to transfer the first web of base material onto the receiving member at a first web merge location such that the conveying features of the first web of base material are engaged by at least some of the plurality of projections on the belt; and the second merging zone being adapted to transfer the second web of base material onto the receiving member at a second web merge location such that the second components are substantially aligned with the first components and the conveying features of the second web of base material are engaged by at least some of the plurality of projections on the belt, the second merging zone being spaced in a down web direction from the first merging zone.

Embodiment 93. The process of Embodiment 92 wherein the first web of base material comprises a web of electrode material and the second web of base material comprises a web of separator material.

Embodiment 94. The process of Embodiment 92 wherein the first web of base material comprises a web of separator material and the second web of base material comprises a web of electrode material.

Embodiment 95. The system set forth in Embodiment 92-94 wherein the first merging zone comprises a first merge sprocket having teeth for aligning with the conveying features on the first web of base material, and the second merging zone comprises a second merge sprocket having teeth for aligning with the conveying features on the second web of base material.

Embodiment 96. The system set forth in Embodiment 95 wherein the first merging zone comprises a first inverted tooth sprocket, and the second merging zone comprises a second inverted tooth sprocket, each of the first and second inverted tooth sprockets comprising a plurality of indentations configured to engage with the teeth of the first and second merge sprockets, respectively.

Embodiment 97. The system set forth in Embodiment 96 wherein the first inverted tooth sprocket is disposed between the first merge sprocket and the receiving member along the first web merge path, and the second inverted tooth sprocket is disposed between the second merge sprocket and the receiving member along the second web merge path.

Embodiment 98. The system set forth in Embodiment 97 wherein the teeth of the first merge sprocket are positioned to pass through the first conveying features of the first web of base material and into indentations in the first inverted tooth sprocket, and the teeth of the second merge sprocket are positioned to pass through the second conveying features of the second web of base material and into indentations in the second inverted tooth sprocket.

Embodiment 99. The system set forth in Embodiment 97 wherein the first inverted tooth sprocket and the receiving member define a first nip, and the second inverted tooth sprocket and the receiving member define a second nip, the second nip having a greater spacing than the first nip.

Embodiment 100. The system set forth in Embodiments 92-99 wherein the first merge sprocket and the second merge sprocket have a same radius.

Embodiment 101. The system set forth in Embodiment 92-100 wherein the first inverted tooth sprocket and the second inverted tooth sprocket have a same radius.

Embodiment 102. The system set forth in Embodiment 101 wherein the radius of the first and second merge sprocket is larger than the radius of the first and second inverted tooth sprocket.

Embodiment 103. The system set forth in Embodiments 92-102 wherein the first merging zone further comprises a first unwind roller for unwinding a spool of the first web of base material, and the second merging zone further comprises a second unwind roller for unwinding a spool of the second web of base material.

Embodiment 104. The system set forth in Embodiments 92-103 wherein the first web merge path comprises a first catenary curve, and the second merge path comprises a second catenary curve.

Embodiment 105. The system set forth in Embodiment 104 further comprising a sensor for detecting at least one characteristic of the first catenary curve.

Embodiment 106. The system set forth in Embodiment 105 further comprising a sensor for detecting at least one characteristic of the second catenary curve.

Embodiment 107. The system set forth in Embodiments 92-106 further comprising a rotating brush to increase the flatness of at least one of the first web of base material and the second web base material, Embodiment 108. The system set forth in Embodiment 107 wherein the rotating brush is disposed prior to at least one of the first merge sprocket and the second merge sprocket in the web direction.

Embodiment 109. The system set forth in Embodiment 107 further comprising a counter-rotating brush that rotates in a direction opposite to the rotating brush, the counter-rotating brush being positioned in a cross-web location from the rotating brush.

Embodiment 110. The system set forth in Embodiments 92-109 further comprising a vacuum device to increase the flatness of at least one of the first web of base material and the second web of base material.

Embodiment 111. The system set forth in Embodiment 110 wherein the vacuum device comprises a base having a plurality of vacuum holes for suctioning air.

Embodiment 112. The system set forth in Embodiments 90-107 further comprising a deionizer configured to reduce static electrical charge on at least one of the first web of base material or the second web of base material.

Embodiment 113. The system set forth in Embodiment 107-112 wherein the deionizer is positioned before at least one of a rotating brush and a vacuum tensioner in the web-direction.

Embodiment 114. The system set forth in Embodiments 92-113 wherein the teeth of the first merge sprocket and the teeth of the second merge sprocket are tapered such that a base of the teeth has a greater cross-sectional area than a distal portion of the projections.

Embodiment 115. The system set forth in Embodiments 92-114 wherein the projections of the receiving member are tapered such that a base of the projections has a greater cross-sectional area than a distal portion of the projections.

Embodiment 116. The system set forth in Embodiments 92-115 further comprising a sensor for detecting defects in at least one of the first web of base material and the second web of base material.

Embodiment 117. The system set forth in Embodiment 116 wherein the sensor is positioned to detect defects prior to merging at least one of the first web of base material and the second web of base material onto the receiving member.

Embodiment 118. The system set forth in Embodiment 116 or 117 further comprising a marking device for marking the detected defects on at least one of the first web of base material and the second web of base material.

Embodiment 119. The system set forth in Embodiments 92-118 further comprising a third merging zone configured to move a third web of base material along a third web merge path, the third web of base material comprising a population of third components for the electrode sub-units, the third components delineated by corresponding weakened patterns, and a population of third conveying features; and the third merging zone being adapted to transfer the third web of base material onto the receiving member at a third web merge location such that the third components are substantially aligned with the first and second components and the conveying features of the third web of base material are engaged by at least some of the plurality of projections on the belt, the third merging zone being spaced in a down web direction from the first merging zone and the second merging zone.

Embodiment 120. The process of Embodiment 119 wherein the third web of base material comprises a web of counter-electrode material and the second web of base material comprises a web of separator material.

Embodiment 121. The process of Embodiment 119 wherein the third web of base material comprises a web of separator material and the second web of base material comprises a web of electrode material.

Embodiment 122. The system set forth in Embodiments 119-121 further comprising a fourth merging zone configured to move a fourth web of base material along a fourth web merge path, the fourth web of base material comprising a population of fourth components for the electrode sub-units, the fourth components delineated by corresponding weakened patterns, and a population of fourth conveying features; and the fourth merging zone being adapted to transfer the fourth web of base material onto the receiving member at a fourth web merge location such that the fourth components are substantially aligned with the first, second, and third components and the conveying features of the fourth web of base material are engaged by at least some of the plurality of projections on the belt, the fourth merging zone being spaced in a down web direction from the first merging zone, the second merging zone, and the third merging zone.

Embodiment 123. The process of Embodiment 122 wherein the fourth web of base material comprises a web of counter-electrode material and the third web of base material comprises a web of separator material.

Embodiment 124. The process of Embodiment 122 wherein the fourth web of base material comprises a web of separator material and the third web of base material comprises a web of counter-electrode material.

Embodiment 125. The system set forth in Embodiments 92-124 wherein the receiving member comprises a continuous belt.

Embodiment 126. The system set forth Embodiments 92-124 wherein the receiving member comprises a plurality of pin-plates.

Embodiment 127. An electrode sub-unit manufactured using the system set forth in any of Embodiments 92-126 or 129-154.

Embodiment 128. The electrode sub-unit set forth in Embodiment 119 wherein the electrode sub-unit comprises an anode material, a cathode material and a separator material.

Embodiment 129. The process or system set forth in any previous Embodiment wherein the web of electrode material comprises an electrode active material.

Embodiment 130. The process or system set forth in Embodiment 129 wherein the electrode active material is an anodically active material.

Embodiment 131. The process or system set forth in Embodiment 129 wherein the electrode active material is a cathodically active material.

Embodiment 132. The process or system set forth in any previous Embodiment wherein the web of counter-electrode material comprises a counter-electrode active material.

Embodiment 133. The process or system set forth in Embodiment 132 wherein the counter-electrode active material is an anodically active material.

Embodiment 134. The process or system set forth in Embodiment 132 wherein the counter-electrode active material is a cathodically active material.

Embodiment 135. The process or system set forth in any previous Embodiment wherein one of the electrode active material and the counter-electrode material is an anodically active material selected from the group consisting of (a) silicon (Si), germanium (Ge), tin (Sn), lead (Pb), antimony (Sb), bismuth (Bi), zinc (Zn), aluminum (Al), titanium (Ti), nickel (Ni), cobalt (Co), and cadmium (Cd); (b) alloys or intermetallic compounds of Si, Ge, Sn, Pb, Sb, Bi, Zn, Al, Ti, Ni, Co, or Cd with other elements; (c) oxides, carbides, nitrides, sulfides, phosphides, selenides, and tellurides of Si, Ge, Sn, Pb, Sb, Bi, Zn, Al, Ti, Fe, Ni, Co, V, or Cd, and their mixtures, composites, or lithium-containing composites; (d) salts and hydroxides of Sn; (e) lithium titanate, lithium manganate, lithium aluminate, lithium-containing titanium oxide, lithium transition metal oxide, $ZnCo_2O_4$; (f) particles of graphite and carbon; (g) lithium metal, and (h) combinations thereof.

Embodiment 136. The process or system set forth in any previous Embodiment wherein one of the electrode active material and the counter-electrode material is an anodically active material selected from the group consisting of silicon (Si), germanium (Ge), tin (Sn), lead (Pb), antimony (Sb), bismuth (Bi), zinc (Zn), aluminum (Al), titanium (Ti), nickel (Ni), cobalt (Co), and cadmium (Cd).

Embodiment 137. The process or system set forth in any previous Embodiment wherein one of the electrode active material and the counter-electrode material is an anodically active material selected from the group consisting of alloys and intermetallic compounds of Si, Ge, Sn, Pb, Sb, Bi, Zn, Al, Ti, Ni, Co, or Cd with other elements.

Embodiment 138. The process or system set forth in any previous Embodiment wherein one of the electrode active material and the counter-electrode material is an anodically active material selected from the group consisting of oxides, carbides, nitrides, sulfides, phosphides, selenides, and tellurides of Si, Ge, Sn, Pb, Sb, Bi, Zn, Al, Ti, Fe, Ni, Co, V, and Cd.

Embodiment 139. The process or system set forth in any previous Embodiment wherein one of the electrode active material and the counter-electrode material is an anodically active material selected from the group consisting of oxides, carbides, nitrides, sulfides, phosphides, selenides, and tellurides of Si.

Embodiment 140. The process or system set forth in any previous Embodiment wherein one of the electrode active material and the counter-electrode material is an anodically active material selected from the group consisting of silicon and the oxides and carbides of silicon.

Embodiment 141. The process or system set forth in any previous Embodiment wherein one of the electrode active material and the counter-electrode material is anodically active material comprising lithium metal.

Embodiment 142. The process or system set forth in any previous Embodiment wherein one of the electrode active material and the counter-electrode material is an anodically active material selected from the group consisting of graphite and carbon.

Embodiment 143. The process or system set forth in any previous Embodiment wherein the web of separator material comprises a polymer electrolyte.

Embodiment 144. The process or system set forth in any previous Embodiment wherein the web of separator material comprises a solid electrolyte.

Embodiment 145. The process or system set forth in any previous Embodiment wherein the web of separator material comprises a solid electrolyte selected from the group consisting of sulfide-based electrolytes.

Embodiment 146. The process or system set forth in any previous Embodiment wherein the web of separator material comprises a solid electrolyte selected from the group consisting of lithium tin phosphorus sulfide ($Li_{10}SnP_2S_{12}$), lithium phosphorus sulfide ($\beta$-$Li_3PS_4$) and lithium phosphorus sulfur chloride iodide ($Li_6PS_5Cl_{0.9}I_{0.1}$)

Embodiment 147. The process or system set forth in any previous Embodiment wherein the web of separator material comprises an electrolyte separator having top and bottom surfaces and a bulk therebetween, wherein the bulk has a thickness; wherein the top surface or bottom surface length or width is greater than the thickness of the bulk by a factor of ten or more, and the thickness of the bulk is from about 10 nm to about 100 µm; wherein the bulk is characterized by the chemical formula $Li_AL_aBM'_CM''_DZr_EO_F$, wherein $4<A<8.5$, $1.5<B<4$, $0 \leq C \leq 2$, $0 \leq D \leq 2$; $0 \leq E < 2$, $10<F<13$, M' is Al, and M'' is selected from Al, Mo, W, Nb, Sb, Ca, Ba, Sr, Ce, Hf, Rb, and Ta; wherein either the top surface or bottom surface comprises lithium carbonate, lithium hydroxide, lithium oxide, lithium peroxide, a hydrate thereof, an oxide thereof, or a combination thereof Embodiment 148. The process or system set forth in any previous Embodiment wherein the web of separator material comprises a polymer electrolyte selected from the group consisting of PEO-based polymer electrolyte, polymer-ceramic composite electrolyte (solid), polymer-ceramic composite electrolyte, and polymer-ceramic composite electrolyte.

Embodiment 149. The process or system set forth in any previous Embodiment wherein the web of separator material comprises a solid electrolyte selected from the group consisting of oxide based electrolytes.

Embodiment 150. The process or system set forth in any previous Embodiment wherein the web of separator material comprises a solid electrolyte selected from the group consisting of lithium lanthanum titanate ($Li_{0.34}La_{0.56}TiO_3$), Al-doped lithium lanthanum zirconate ($Li_{6.24}La_3Zr_2Al_{0.24}O_{11.98}$), Ta-doped lithium lanthanum zirconate ($Li_{6.4}La_3Zr_{1.4}Ta_{0.6}O_{12}$) and lithium aluminum titanium phosphate ($Li_{1.4}Al_{0.4}Ti_{1.6}(PO_4)_3$).

Embodiment 151. The process or system set forth in any previous Embodiment wherein one of the electrode active material and the counter-electrode material is a cathodically active material selected from the group consisting of intercalation chemistry positive electrodes and conversion chemistry positive electrodes.

Embodiment 152. The process or system set forth in any previous Embodiment wherein one of the electrode active material and the counter-electrode material is a cathodically active material comprising an intercalation chemistry positive electrode material.

Embodiment 153. The process or system set forth in any previous Embodiment wherein one of the electrode active material and the counter-electrode material is a cathodically active material comprising a conversion chemistry positive electrode active material.

Embodiment 154. The process or system set forth in any previous Embodiment wherein one of the electrode active material and the counter-electrode material is a cathodically active material selected from the group consisting of S (or Li2S in the lithiated state), LiF, Fe, Cu, Ni, FeF2, FeOdF3.2d, FeF3, CoF3, CoF2, CuF2, NiF2, where $0 \leq d \leq 0.5$.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. An apparatus for merging webs for production of an electrode assembly for a secondary battery, the apparatus comprising:
   a first web of base material wound on a first spool, the first web of base material comprising a population of first components for electrode sub-units, each of the first components being delineated by corresponding weakened patterns;
   a second web of base material wound on a second spool, the second web of base material comprising a population of second components for the electrode sub-units, each of the second components being delineated by corresponding weakened patterns;
   a first rotating assembly configured to move the first web of base material along a first web merge path and thereby unwind the first web of base material from the first spool, the first rotating assembly being configured to control a tension of the first web of base material in a down web direction along a first portion of the first web merge path located between the first spool and the first rotating assembly, the first rotating assembly being configured such that the first web of base material has a first catenary curve along the first portion of the first web merge path;
   a second rotating assembly configured to move the second web of base material along a second web merge path and thereby unwind the second web of base material from the second spool, the second rotating assembly being configured to control a tension of the second web of base material in a down web direction along a first portion of the second web merge path located between the second spool and the second rotating assembly, the second rotating assembly being configured such that the second web of base material has a second catenary curve along the first portion of the second web merge path; and
   a receiving member configured to receive the first web of base material along the first web merge path at a first web merge location and the second web of base material along the second web merge path at a second web merge location downstream from the first web merge location such that the second web of base material overlays the first web of base material.

2. The apparatus of claim 1, wherein (a) the first web of base material comprises a web of electrode material and (b) the second web of base material comprises a web of separator material.

3. The apparatus of claim 1, further comprising (a) a first sensor for detecting at least one characteristic of the first catenary curve, and (b) a second sensor for detecting at least one characteristic of the second catenary curve.

4. The apparatus of claim 1, wherein: (a) the first web of base material comprises a population of first conveying features; (b) the second web of base material comprises a population of second conveying features; and (c) the receiving member comprises a plurality of projections configured to engage with (i) the first conveying features of the first web of base material and (ii) the second conveying features of the second web of base material.

5. The apparatus of claim 4, wherein (a) the first rotating assembly comprises a first merge sprocket having teeth for aligning with the first conveying features on the first web of base material, and (b) the second rotating assembly comprises a second merge sprocket having teeth for aligning with the second conveying features on the second web of base material.

6. The apparatus of claim 5, wherein (a) the first rotating assembly comprises a first inverted tooth sprocket, and (b) the second rotating assembly comprises a second inverted tooth sprocket, each of the first inverted tooth sprocket and the second inverted tooth sprocket, comprises a plurality of indentations configured to engage respectively with the teeth of the first merge sprocket and of the second merge sprocket-sprocket.

7. The apparatus of claim 6, wherein (a) the first inverted tooth sprocket and the receiving member define a first nip, and (b) the second inverted tooth sprocket and the receiving member define a second nip, the second nip having a greater spacing than the first nip.

8. The apparatus of claim 7, wherein (a) the first nip is sized to control the tension of the first web of base material in the down web direction along a second portion of the first web merge path located between the first inverted tooth sprocket and the receiving member, and (b) the second nip is sized to control the tension of the second web of base material in the down web direction along a second portion of the second web merge path located between the second inverted tooth sprocket and the receiving member.

9. An apparatus for merging webs for production of an electrode assembly for a secondary battery, the apparatus comprising:
   a first web of base material wound on a first spool, the first web of base material comprising a population of first components for electrode sub-units, each of the first components being delineated by corresponding weakened patterns, the first spool comprising a first unwind roller for unwinding the first web of base material;
   a second web of base material wound on a second spool, the second web of base material comprising a population of second components for the electrode sub-units, each of the second components being delineated by corresponding weakened patterns, the second spool comprising a second unwind roller for unwinding the second web of base material;
   a first rotating assembly configured to move the first web of base material along a first web merge path and thereby unwind the first web of base material from the first spool, the first rotating assembly being configured to control tension of the first web of base material in a down web direction along a first portion of the first web merge path located between the first spool and the first rotating assembly;
   a second rotating assembly configured to move the second web of base material along a second web merge path and thereby unwind the second web of base material from the second spool, the second rotating assembly being configured to control a tension of the second web of base material in a down web direction along a first portion of the second web merge path located between the second spool and the second rotating assembly, (i) the first unwind roller and the first rotating assembly being configured such that the first web of base material has a first catenary curve along the first portion of the first web merge path and/or (ii) the second unwind roller and the second rotating assembly being configured such that the second web of base material has a second catenary curve along the first portion of the second web merge path; and a receiving member configured to receive the first web of base material along the first web merge path at a first web merge location and the second web of base material along the second web merge path at a second web merge location downstream from the first web merge location such that the second web of base material overlays the first web of base material, the receiving member being spaced from the first rotating assembly to define a first nip that forms a second portion of the first web merge path located between the first rotating assembly and the receiving member, the receiving member being spaced from the second rotating assembly to define a second nip that forms a second portion of the second web merge path located between the second rotating assembly and the receiving member, the second nip having a greater spacing than the first nip.

10. The apparatus of claim 9, wherein (a) the first nip is sized to control the tension of the first web of base material in the down web direction along the second portion of the first web merge path, and (b) the second nip is sized to control the tension of the second web of base material in the down web direction along the second portion of the second web merge path.

11. The apparatus of claim 9, further comprising a vacuum device to increase flatness of at least one of the first web of base material and the second web of base material, the vacuum device comprising a base having a plurality of vacuum holes for suctioning air.

12. The apparatus of claim 9, further comprising a deionizer configured to reduce static electrical charge on at least one of the first web of base material and the second web of base material.

13. The apparatus of claim 9, further comprising a rotating brush to increase a flatness of at least one of the first web of base material and the second web of base material, the rotating brush being disposed prior to at least one of the first rotating assembly and the second rotating assembly.

14. The apparatus of claim 13, further comprising a counter-rotating brush that rotates in a direction opposite to the rotating brush, the counter-rotating brush being positioned in a cross-web location from the rotating brush.

15. The apparatus of claim 9, further comprising a sensor for detecting defects in at least one of the first web of base material and the second web of base material, the sensor being positioned to detect defects prior to at least one of the first web merge location and the second web merge location.

16. The apparatus of claim 15, further comprising a marking device for marking detected defects on at least one of the first web of base material and the second web of base material.

17. An apparatus for merging webs for production of an electrode assembly for a secondary battery, the apparatus comprising:

a first web of base material wound on a first spool, the first web of base material comprising a population of first components for electrode sub-units, each of the first components being delineated by both corresponding weakened patterns and a population of first tractor holes;

a second web of base material wound on a second spool, the second web of base material comprising a population of second components for the electrode sub-units, each of the second components being delineated by both corresponding weakened patterns and a population of second tractor holes;

a first rotating assembly comprising a first merge sprocket having teeth for engaging the first tractor holes on the first web of base material, the first rotating assembly configured to move the first web of base material along a first web merge path and thereby unwind the first web of base material from the first spool, the teeth of the first merge sprocket being sized and shaped to control a tension of the first web of base material in a cross-web direction, the first rotating assembly being configured to control a tension of the first web of base material in a down web direction along a first portion of the first web merge path located between the first spool and the first rotating assembly;

a second rotating assembly comprising a second merge sprocket having teeth for engaging the second tractor holes on the second web of base material, the second rotating assembly configured to move the second web of base material along a second web merge path and thereby unwind the second web of base material from the second spool, the teeth of the second merge sprocket being sized and shaped to control a tension of the second web of base material in a cross-web direction, the second rotating assembly being configured to control a tension of the second web of base material in a down web direction along a first portion of the second web merge path located between the second spool and the second rotating assembly, (I) the first rotating assembly being configured such that the first web of base material has a first catenary curve along the first portion of the first web merge path, and the second rotating assembly being configured such that the second web of base material has a second catenary curve along the first portion of the second web merge path, (II) a first unwind roller and the first rotating assembly are configured such that the first web of base material has a first catenary curve along the first portion of the first web merge path, (III) a second unwind roller and the second rotating assembly are configured such that the second web of base material has a second catenary curve along the first portion of the second web merge path, or (IV) any combination of (I), (II), and (III); and a receiving member comprising a plurality of projections, the receiving member being disposed adjacent the first web merge path and the second web merge path, the plurality of projections being configured to engage with the first tractor holes of the first web of base material at a first web merge location and the second tractor holes of the second web of base material at a second web merge location downstream from the first web merge location such that the second web of base material overlays the first web of base material.

18. The apparatus of claim 17, wherein the plurality of projections are configured to engage with (a) the first tractor holes of the first web of base material at the first web merge location and (b) the second tractor holes of the second web of base material at the second web merge location downstream from the first web merge location, such that the second components of the second web of base material are substantially aligned with the first components of the first web of base material.

19. The apparatus of claim 17, wherein each member of the plurality of projections of the receiving member is tapered such that a base of each member of the plurality of projections has a greater cross-sectional area than a distal portion.

20. The apparatus of claim 17, wherein the teeth comprise the teeth of the first merge sprocket and the teeth of the second merge sprocket, the teeth being tapered such that a base of the teeth has a greater cross-sectional area than a distal portion of the teeth.

21. The apparatus of claim 17, wherein the first rotating assembly comprises a first inverted tooth sprocket, and the second rotating assembly comprises a second inverted tooth sprocket, each of the first inverted tooth sprocket and the second inverted tooth sprocket comprises a plurality of indentations configured to respectively engage with the teeth of the first merge sprocket and the second merge sprocket.

22. The apparatus of claim 21, wherein the teeth of the first merge sprocket are positioned to pass (a) through the first tractor holes of the first web of base material and (b) into the indentations in the first inverted tooth sprocket, and the teeth of the second merge sprocket are positioned to pass (c) through the second tractor holes of the second web of base material and (d) into the indentations in the second inverted tooth sprocket.

23. The apparatus of claim 21, wherein (A) the first inverted tooth sprocket is disposed between (a) the first merge sprocket and (b) the receiving member, along the first web merge path, and (B) the second inverted tooth sprocket is disposed between (c) the second merge sprocket and (d) the receiving member, along the second web merge path.

24. The apparatus of claim 21, wherein (a) the first inverted tooth sprocket has a radius that is smaller than a radius of the first merge sprocket, and (b) the second inverted tooth sprocket has a radius that is smaller than a radius of the second merge sprocket.

25. The apparatus of claim 24, wherein the radius of the first merge sprocket is the same as the radius of the second merge sprocket.

26. The apparatus of claim 24, wherein the radius of the first inverted tooth sprocket is the same as the radius of the second inverted tooth sprocket.

* * * * *